(12) United States Patent
Furukawa et al.

(10) Patent No.: US 7,974,405 B2
(45) Date of Patent: Jul. 5, 2011

(54) METHOD AND DEVICE FOR CALCULATING A FUNCTION FROM A LARGE NUMBER OF INPUTS

(75) Inventors: Jun Furukawa, Tokyo (JP); Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1165 days.

(21) Appl. No.: 10/587,308

(22) PCT Filed: Jan. 26, 2005

(86) PCT No.: PCT/JP2005/001437
§ 371 (c)(1),
(2), (4) Date: Feb. 26, 2007

(87) PCT Pub. No.: WO2005/071640
PCT Pub. Date: Aug. 4, 2005

(65) Prior Publication Data
US 2007/0156796 A1    Jul. 5, 2007

(30) Foreign Application Priority Data

Jan. 26, 2004  (JP) ................. 2004-016881

(51) Int. Cl.
*G06F 15/16* (2006.01)
*H04L 9/00* (2006.01)
*H04L 9/28* (2006.01)

(52) U.S. Cl. .............. 380/28; 380/30; 708/1; 708/2; 708/104

(58) Field of Classification Search .............. None
See application file for complete search history.

(56) References Cited

U.S. PATENT DOCUMENTS

| | | | |
|---|---|---|---|
| 6,195,433 B1 * | 2/2001 | Vanstone et al. | 380/285 |
| 6,792,533 B2 * | 9/2004 | Jablon | 713/171 |
| 6,950,948 B2 * | 9/2005 | Neff | 705/12 |

(Continued)

FOREIGN PATENT DOCUMENTS

JP      2002-207483      7/2000

(Continued)

OTHER PUBLICATIONS

Beaver, Donald, et al., "The Round Complexity of Secure Protocols," Annual ACM Symposium on Theory of Computing 22, pp. 503-513, 1990.

(Continued)

*Primary Examiner* — Kambiz Zand
*Assistant Examiner* — William S Powers
(74) *Attorney, Agent, or Firm* — Scully, Scott, Murphy & Presser, P.C.

(57) ABSTRACT

In an input process, a circuit and an input bit to the circuit are inputted to a plurality of computers. Firstly, one computer performs calculation and transmits the calculation result to another computer of the computers. Next, the another computer which has received the calculation result performs the next calculation. Thus, calculation is performed by one computer after another. When all the computers have performed calculation once, the last computer which has performed calculation transmits the calculation result to the first computer which has performed calculation. After this, calculation is performed by one computer after another and the calculation result is transmitted to the next computer, thereby repeating the calculation of each cycle. Thus, it is possible to realize calculation of a value of a given function by using a device including a plurality of computers, with a simpler configuration.

4 Claims, 17 Drawing Sheets

U.S. PATENT DOCUMENTS

| | | | |
|---|---|---|---|
| 2001/0024501 A1* | 9/2001 | Furukawa | 380/28 |
| 2002/0181702 A1* | 12/2002 | Furukawa | 380/28 |
| 2004/0025019 A1* | 2/2004 | Watanabe et al. | 713/168 |

FOREIGN PATENT DOCUMENTS

| | | |
|---|---|---|
| JP | 2002-237810 | 8/2002 |

OTHER PUBLICATIONS

Ishai, Yuval, et al., "Randomizing Polynomials: A new Representation with Applications to Round-Efficient Secure Computation," IEEE Symposium on Foundations of Computer Science 2000, pp. 294-304.

* cited by examiner

METHOD AND DEVICE FOR CALCULATING A FUNCTION FROM A LARGE NUMBER OF INPUTS

TECHNICAL FIELD

The present invention relates to a method of calculating, when inputs for a given function are dispersed and held in a plurality of devices, an output of this function while these devices are working together, and more particularly to a method and system for performing a calculation by a fixed number of times irrespective of a function in which the number of times for each device to perform communication with another device is given.

BACKGROUND ART

As a prior art regarding a method of calculating, when inputs for a given function are dispersed and held in a plurality of devices, an output of this function while these devices are working together, a method is proposed by Beaver, Micali, and Rogaway in paper "D. Beaver, S. Micali, and P. Rogaway, 'The round complexity of secure protocols', Annual ACM Symposium on Theory of Computing 22, pages 503-513, 1990". This paper is hereinafter referred to as Non-patent Document 1.

The technology disclosed in Non-patent Document 1 relates to a method of calculating, when the number of calculators $u_\alpha$ who are connected to one another via a network is $\lambda$, each of the calculators has a secret input $x_\alpha$, and an arbitrary function g is given, an output $g(x_1, \ldots, \lambda)$ while the calculators work together, wherein the secret of each of the calculators is not leaked beyond $g(x_1, \ldots, x_\lambda)$ and the number of times for performing communication necessary for the calculation with is a fixed number. The technology disclosed in Non-patent Document 1 will be described with reference to FIGS. 1, 2 and 19.

[Garbled Circuit]

[Syntax]

A circuit f includes m logic gates. Each gate is denoted by symbols $G_1, \ldots, G_l, \ldots, G_m$. As shown in FIG. 19, each gate has two inputs and one output. Each output may be input to a plurality of gates. An output line of $G_k$ is generally input to a plurality of gates but all signals flowing through the line have the same value of 0 or 1. Then, all line output from the gate $G_k$ are referred to as $w_k$. The number of line input to the circuit f is n, which is expressed as follows.

$\{wk\}k=m+1, \ldots, m+n$. Then, $w_1, \ldots, w_l$ denote the output of the circuit f.

The number of calculators is $\lambda$, and a set of the calculators is expressed as follows.

$\{u^{(\alpha)}\}_{\alpha=1,\ldots,\lambda}$

The number of bits input by $u^{(\alpha)}$ to the circuit f is $I_\alpha$.

With respect to $(\Sigma_{\alpha=1}^\lambda I_\alpha=\lambda)$. $k=m+1, \ldots, m+n$ where the sum of those bits is set as n, a bit input to each $w_k$ is represented by $b_k$, and each of the bits is allocated to $u^{(\alpha)}$ by the number of $I_\alpha$ in the following manner. That is, $u^{(\alpha)}$ determines the following set $\{b_k \in \{0,1\}\} k=m+\Sigma_{\ominus=1}^{\alpha-1} I_\beta+1, \ldots, m+\Sigma_{\beta=1}^\alpha I_\beta$ When outputs of the gates $G_i$ and $G_j$ are input to the gate $G_k$, a relation between the output $b_j$ of $G_j$ and the output $b_k$ of $G_k$ is represented as follows.

$b_k = b_i \otimes G[k]^{b_j}$

Then, $\square$ denotes exclusive OR of the bit and • denotes a character string sequences.

t denotes a safety variable, and G, H, and F denote pseudorandom number generating devices for output character strings of $t\lambda$ bits.

[Construction]

A protocol is roughly divided into three processes which are (1) an input process 402, (2) a parallel construction process 400 of a garbled circuit based on a calculation performed by a large number of people, and (3) a result output process 401 for performing an input disclosure and a circuit calculation.

The input process 402 is performed in the following manner. Information on a circuit for performing the calculation, information on another calculator, and input data of each device are input to each device.

The parallel construction process 400 of the garbled circuit is performed in the following manner. In a procedure of this process, as shown in FIG. 2, a phase 502 in which $\lambda$ computers 501 individually performs the calculation and a phase 503 in which all the computers perform communication with one another are alternately performed. Then, the number of performing the repetition is set as a fixed number 504, and whatever function is desired to be calculated, the following process can be completed. Also, in each communication phase, each of the computers transmits data to all of the other computers. In order to generate the data transmitted at this time, transmission data of other computers in the same communication phase of this transmission should not be needed. That is, when there is a transmission which should wait for data of other computers, the communication phase in which this transmission is performed is counted as a different communication phase from the communication phase in which data is waited for.

[1] In cooperation with one another, the calculators uniquely and randomly generate a set of character strings of bits and a set of bits so that these sets are secretly dispersed to all the calculators.

$\{s^\alpha k's^\alpha k \in R\{0,1\}^t\}k=1, \ldots, m+n; \alpha=1, \ldots, \lambda$ $\{\rho k \in R\{0,1)\}\}$ Wherein $S_k := s_k^1 \cdot s_k^2 \cdot \ldots \cdot s_k^\lambda$ $S'_k := s'^1_k \cdot s'^2_k \cdot \ldots \cdot s'^\lambda_k$.

Regarding $\{S_k\}, \{\rho_k\}$, if $\lambda_k \square b_k = 0$, in the calculation phase of the circuit, $S_k$ is made public, and if $\lambda_k \square b_k = 1$, $S'_k$ is made public.

[2] For each of the calculators $u_\alpha$, the following data is revealed.

$\{s^\alpha k\}k=1, \ldots, m+n$

[3] With respect to $k=1, \ldots, m+n$, each of the calculators $u_\alpha$ calculates the following character strings of $t\lambda$ bits.

$g^\alpha k = G(s^\alpha k)$ $g'^\alpha k = G(s'^\alpha k)$ $h^\alpha k = H(s^\alpha k)$ $h'^\alpha k = H(s'^\alpha k)$ $f^\alpha k = F(s^\alpha k)$ $f'^\alpha k = F(s'^\alpha k)$ Then, each of the calculators $u_\alpha$ commits the following data to prove to the other calculators that these values are calculated correctly.

$\{g^\alpha k', g'^\alpha k', h^\alpha k', h'^\alpha k', f^\alpha k', f'^\alpha k'\}k$

[4] With respect to k=1, ..., m+n, the calculators secretly perform the following calculation in a dispersed manner.

$$\sigma_k^1 \cdot \ldots \sigma_k^\lambda = S_k \text{ if } \lambda_k \square b_k = 0$$

$$\sigma_k^1 \cdot \ldots \sigma_k^\lambda = S'_k \text{ if } \lambda_k \square b_k = 1$$

[5] In cooperation with one another, with respect to k=1, ..., m+n, the calculators secretly perform the following calculation in a dispersed manner.

$$A_k = g_l^1 \square \ldots \square g_l^\lambda \square g_l^1 \square \ldots \square g_j^\lambda \square S_k \text{ if } \rho_l \otimes_{G[k]}$$
$$\rho_j = \rho_k$$

$$A_k = g_l^1 \square \ldots \square g_l^\lambda \square g_l^1 \square \ldots \square g_j^\lambda \square S'_k \text{ if } \rho_l \otimes_{G[k]}$$
$$\rho_j \ne \rho_k$$

$$B_k = h_l^1 \square \ldots \square h_l^\lambda \square g'_j^1 \square \ldots \square g'^\lambda_j \square S_k \text{ if } \rho_l \otimes_{G[k]}$$
$$\rho_l = \rho_k$$

$$B_k = h_l^1 \square \ldots \square h_l^\lambda \square g'_j^1 \square \ldots \square g'^\lambda_j \square S'_k \text{ if } \rho_l \otimes_{G[k]}$$
$$\rho'_j \ne \rho_k$$

$$C_k = g'^1_l \square \ldots \square g'^\lambda_l \square h_j^1 \square \ldots \square h_j^\lambda \square S_k \text{ if } \rho'_j \otimes_{G[k]}$$
$$\rho_l = \rho_k$$

$$C_k = g'^1_l \square \ldots \square g'^\lambda_l \square h_j^1 \square \ldots \square h_j^\lambda \square S'_k \text{ if } \rho'_j \otimes_{G[k]}$$
$$\rho_l \ne \rho_k$$

$$D_k = h'^1_l \square \ldots \square h'^\lambda_l \square g'^1_j \square \ldots \square g'^\lambda_j \square S_k \text{ if } \rho'_l \otimes_{G[k]}$$
$$\rho'_j = \rho_k$$

$$D_k = h'^1_l \square \ldots \square h'^\lambda_l \square g'^1_j \square \ldots \square g'^\lambda_j \square S'_k \text{ if } \rho'_l \otimes_{G[k]}$$
$$\rho'_j \ne \rho_k$$

It should be noted that a signal input to the gate $G_k$ is outputs of the gate $G_l$ and the gate $G_j$. This state is shown in FIG. 19. The disclosure of the input and the generation of the circuit in the result output process 401 are performed as follows.

[1] The calculators reveal the following data.

$$\{\rho_k\}_{k=1,\ldots,J}$$

$$\{f_k^\alpha\}_{k=1,\ldots,m+n;\alpha=1,\ldots,\lambda}$$

$$\{\sigma_k^1 \bullet \ldots \bullet \sigma_k^\lambda\}_{k=1,\ldots,m+n}$$

$$\{A_k, B_k, C_k, D_k\}_{k=1,\ldots,m+n}$$

[2] With respect to k=1, ..., m+n, in an order from k which is closer to the input of the circuit, from $S_l$ or $S'_l$, and $S_j$ or $S'_j$, $S^*_k$ is obtained as follows. This refers to $S_k$ or $S'_k$.

$S_k^* = A_k \square g_l^1 \square \ldots \square g_l^\lambda \square g_l^1 \square \ldots \square g_j^\lambda$ if $S_l, S^j$ are processed
$S_k^* = B_k \square h_l^1 \square \ldots \square h_l^\lambda \square g'^1_j \square \ldots \square g'^\lambda_j$ if $S_l, S_j$, are processed
$S_k^* = C_k \square g'^1_l \square \ldots \square g'^\lambda_l \square h_j^1 \square \ldots \square h_j^\lambda$ if $S'_l, S_j$ are processed
$S_k^* = D_k \square h'^1_l \square \ldots \square h'^\lambda_l \square g'^1_j \square \ldots \square g'^\lambda_j$ if $S'_l, S'_j$, are processed

[3] With respect to all of α=1, ..., λ; k=1, ..., m+n, by checking the following, $S^*_k = S_k$ or $S^*_k = S'_k$ is confirmed.

$$f^\alpha_{ke} = F(s^\alpha_k),$$

$$f^\alpha = F(s'^\alpha_k)$$

[4] With respect to k=1, ..., m+n, when all the calculators obtain $S_k$, $\rho_k + b_k = 0$ is established, and when all the calculators obtain $S'_k$, $\rho_k + b_k = 1$ is established, thereby finding out $b_k$.

As other prior art for such a method as described in the section of Technical Field, there is a method proposed by Ishai and Kushilevitz in paper "Y. Ishai and E. Kushilevitz, 'Randomizing Polynomials: A new Representation with Applications to Round-Efficient Secure Computation', IEEE Symposium on Foundations of Computer Science 2000, pages 294-304". Hereafter, this paper is referred to as Non-patent Document 2. The prior art of Non-patent Document 2 will be described with reference to FIGS. 3 and 4.

[Randomizing Polynomial]

Non-patent Document 2 proposes a method of expressing a given function by a low order polynomial on the finite field. In particular, Non-patent Document 2 demonstrates that an arbitrary function can be expressed by a third polynomial. Evaluation of a low order polynomial can be performed by performing a round by a fixed number of times. In general, the function can be expressed in various forms such as a circuit.

A blanching problem described next can be expressed by a general function. A blanching problem BP=(G, φ, s, t) is referred to a mod-p blanching problem. G=(V, E) is a directed graph. φ is a labeling function for labeling one of 1, $x^1_i$, and the negation $x^0_i$ to each of the sides. Then, s and t are special apexes.

When an input $x = (x_1, \ldots, x_n)$ is given, from the labeling function φ, a partial graph Gx of G is given. A value of a Boolean function f calculated by is f(x)=0 when a remainder obtained through division of the number of routes connecting s with t in $G_x$ by p is 0, and otherwise the value is f(x)=1. The magnitude of BP is set as the number of the apexes of G.

The magnitude of BP is set as I. When a I\timesI adjacency matrix of the partial graph Gx is expressed as Hx, the number of routes connecting s-t is obtained as follows.

$$(I + H_x + H_x^2 + \cdot s)_{st} = ((1 - H_x)^{-1})_{st} \bmod p$$

$$= det M_x / det(I - H_x) \} \bmod p$$

Wherein $M_x$ is a matrix obtained by excluding a row s and a column t from the matrix (I−Hx). Therefore, the following data is found out.

$$f(x) = 0 \Leftrightarrow \text{rank}(M_x) = I - 1$$

$$f(x) = 0 \Leftrightarrow \text{rank}(M_x) = I$$

Then, $M_x$ includes an at most first order component with respect to x.

[Calculation Method]

A method of obtaining f(x) by using the randomizing polynomial method when the Boolean function f is given and the input is distributed to a plurality of calculators.

As shown in FIG. 3,

[1] Information on a function to be calculated, information on another calculator, and input data of each device are input to each device (605).

[2] BP is constructed which corresponds to f (600).

[3] The following processes are performed in parallel by the sufficient number of times.

[Process]

As shown in FIG. 4,

All the calculators disperse each component to uniquely and randomly generate I×I matrices $R_1$, $R_2$ (603) for calculating $R_1 M_x R_2$ which is a product of three matrices $R_1, M_x, R_2$ (604).

Each component is an at most third expression of components of $R_1, R_2, x$.

[4] From all the values of rank$R_1 M_x R_2$, it is presumed whether or not rank of $M_x$ is I. When the probability that rank of $M_x$ is I is high, 1 is output, and otherwise 0 is output (602).

In the above-mentioned method, when rank $(M_x)$=rank $(M'_x)$, distributions of $R_1 M_x R_2$ and $R_1 M'_x R_2$ become the same, a new matter is not leaked other than f(x) with respect to x.

Furthermore, when rank $(M_x)$=I with respect to any I, the probability of rank $(R_1M_xR_2)$=I is larger than 0.08. Thus, the number of times for performing the process of Item 2 does not rely on I.

[Calculation Amount and Communication Amount]

In the method using the garbled circuit, the calculation with respect to each gate is individually performed, and the entire calculation amount and communication amount are proportional to the number of gates. t-n threshold dispersion (proportional to $2t^2$. The calculation in the t-n threshold dispersion refers to a calculation method in which the secret is dispersed to n calculators. Among the calculators, unless t calculators gather the data which each of them knows by itself, it is impossible to find out the dispersed secret or meaningful data in the middle of the calculation.

In the method using the randomizing polynomial, in the case where the t-n threshold dispersion is performed, the round number becomes 2(3) in proportion to $t^2$ and the square of the magnitude of BP.

The communication amount and calculation amount in the randomizing polynomial method are proportional to the at most first order of the number of gates. Moreover, a coefficient of the highest order is substantially lower than that of the randomizing polynomial method and therefore efficient.

However, here, particular attention is paid to the case where t>n/2 is satisfied in the t–n threshold dispersion and a third party demands the verification of the calculation validity. In such a case, it is obviously applicable to extend the above-mentioned method. The result of the extension shows that the entire communication amount and calculation amount in the method using the garbled circuit are proportional to the number of gates and t3. When method using the randomizing polynomial is used, the communication amount and calculation amount are proportional to 1.5-th power of the number of gates. When the number of gates is larger, the method is not efficient.

A first problem resides in that the method of Non-patent Document 1 requires an enormous calculation amount of each calculator and an enormous calculation amount of a verifier who verifies the calculation validity.

This is because as each calculator needs to calculate the output of the pseudorandom number generating device, it is necessary to prove the calculation correctness while the calculation result is hidden.

A second problem resides in that the method of Non-patent Document 2 also requires an enormous calculation amount of each calculator and an enormous calculation amount of the verifier who verifies the calculation validity.

This is because the calculation amount performed by each calculator is in proportion to 1.5-th power of the number of gates in the case of expressing the function by the circuit and often the number of gates is extremely large. Thus the entire calculation amount becomes enormous.

DISCLOSURE OF INVENTION

An object of the present invention provides is to provide a method and system for performing a calculation by fixed times irrespective of a function in which the number of computers is suppressed to be proportional to the number of gates even when the number of gates is larger, the computers do not need to calculate outputs of pseudorandom number generating devices whose calculation validity should be proved, and the number of performing communication by the computer becomes a fixed number irrespective of a function.

According to an aspect of the present invention, there is provided a method of calculating a value of a given function by using an apparatus that includes a plurality of computers, including:

an input process; and an output process, characterized in that the input process inputs a circuit and an input bit to the circuit to the plurality of computers, and one of the computers firstly performs calculation and transmits the calculation result to another computer and the another computer which has received the calculation result performs the next calculation such that calculation is performed by one computer after another, and when all the computers have performed calculation once, the last computer which has performed calculation transmits the calculation result to the first computer which has performed calculation, and after this, calculation is performed by one computer after another and the calculation result is transmitted to the next computer such that the calculation of each cycle is repeated.

According to another aspect of the present invention, there is provided a method of calculating a value of a given function by using an apparatus that includes a plurality of computers, including:

an input process;

an ElGamal cipher text preparation process;

a sequential substitution reencryption process; and a result output process, characterized in that the input process includes an information input step of inputting to the plurality of computers information on a circuit including a plurality of gates and information on the plurality of computers, and a dispersion input step of inputting to each of the computers each one of plural pieces of partial data which are obtained by dispersing input data of the function into plural pieces by the number of the computers, the ElGamal cipher text preparation process includes an ElGamal cipher text preparation step of generating a set of ElGamal cipher texts in which at least one of the computers corresponds to the gate of the circuit that realizes the given function, the sequential substitution reencryption process includes a step of allowing each of the computers to perform a substitution reencryption process one after another, and the substitution reencryption process includes a cipher text obtaining step of allowing the computer in this turn to receive the set of ElGamal cipher texts from the computer in the previous turn, a cipher text substitution and reencryption step of changing an order of the set of cipher texts received in the cipher text obtaining step for substitution and subjecting those cipher texts to reencryption, and a step of disclosing the data generated in the cipher text substitution and reencryption step to at least the computer in the next order, and the result output process includes a partial decryption step of deciphering or partially deciphering a part of the cipher texts generated in the cipher text substitution and reencryption step, a decryption step of deciphering a cipher text that enciphers data corresponding to the input to the circuit in the cipher texts generated in the cipher text substitution and reencryption step, and an evaluation step of evaluating an output of the circuit by using the data deciphered in the decryption step and the data partially deciphered in the partial decryption step.

In this case, the following construction may be adopted that the set of ElGamal cipher texts corresponding to each of the gates is a set of ElGamal cipher texts of a secret key generated corresponding to each of the gate by each of the computers, and a public key used for generating the ElGamal cipher texts is a sum of public keys corresponding to gates for generating two signals input to this gate.

Furthermore, the following construction may be adopted that the input process further includes a step of inputting an area variable of an ElGamal encryption method to each of the computers, the ElGamal cipher text preparation process further includes a gate secret key generating step of generating a secret key of the ElGamal cipher texts corresponding to each of the gates of the circuit by each of the computers, each of the computers performs:

a gate public key generating step of generating a gate public key corresponding to the secret key generated in the gate secret key generating step, a gate public key validity proof generating step of generating a gate public key validity proof for the public key generated in the gate public key generating step, a gate public key validity proof disclosing step of disclosing the gate public key validity proof generated in the gate public key validity proof generating step, an input gate secret key generating step of generating a secret key of the ElGamal cipher texts corresponding to a gate where an input is directly made to the circuit of the gates of the circuit, an input gate public key generating step of generating an input gate public key corresponding to the secret key generated in the input gate secret key generating step, an input gate public key validity proof generating step of generating a validity proof for the public key generated in the input gate public key generating step, an input gate public key validity proof disclosing step of disclosing the input public key validity proof generated in the input gate public key validity proof generating step, a gate public key obtaining step of obtaining gate public keys generated by other respective computers, a gate public key integration step of integrating the gate public keys obtained in the gate public key obtaining step, a gate public key encryption step of enciphering the gate secret key generated by this computer with the gate public key integrated in the gate public key integration step, a gate secret key cipher text disclosing step of disclosing a gate secret key cipher text generated in the gate public key encryption step, a gate secret key cipher text validity proof generating step of generating a validity proof for the gate secret key cipher text, a gate secret key cipher text validity proof disclosing step of disclosing the gate secret key cipher text validity proof generated in the gate secret key cipher text validity proof generating step, an input cipher text generating step of generating a cipher text corresponding to a part of the input of the circuit input to each of the computers, an input cipher text validity proof generating step of generating a validity proof for the cipher text corresponding to the part of the input of the circuit generated in the input cipher text generating step, an input cipher text validity proof disclosing step of disclosing the proof generated in the input cipher text validity proof generating step, and an output cipher text generating step of generating and disclosing a cipher text corresponding to an output of the gate, the sequential substitution reencryption process includes:

a gate secret key cipher text substitution and reencryption step of changing an order of a set of the gate secret key cipher texts with one substitution randomly selected on the basis of a predetermined permitted substitution method for reencryption, an input cipher text substitution and reencryption step of changing an order of a set of the input cipher texts with one substitution randomly selected on the basis of a predetermined permitted substitution method for reencryption, an output cipher text substitution and reencryption step of changing an order of a set of the output cipher texts with one substitution randomly selected on the basis of a predetermined permitted substitution method for reencryption, and a gate secret key cipher text, input cipher text, and output cipher text substitution and reencryption validity proof generating and disclosing step of generating and disclosing validity proofs for the substitution and reencryption performed in the gate secret key cipher text substitution and reencryption step, the input cipher text substitution and reencryption step, and the output cipher text substitution and reencryption step, the partial decryption step of the result output process includes:

a gate secret key partial decryption step of partially deciphering the gate secret key cipher texts by mutually performing communication and calculation by the computers, an input cipher text partial decryption step of partially deciphering the input cipher texts by mutually performing communication and calculation by the computers, an output cipher text partial decryption step of partially deciphering the output cipher texts by mutually performing communication and calculation by the computers, and a gate secret key, input cipher text, and output cipher text partial decryption step validity proof generating and disclosing step of generating and disclosing the validity proofs for the partial decryption performed in the gate secret key partial decryption step, the input cipher text partial decryption step, and the output cipher text partial decryption step, and the calculation method further includes a step of verifying various validity proofs disclosed by other computers.

According to the present invention, there is provided a calculation system for evaluating a function, including:

a plurality of computers, communication means for performing communication with the plurality of computers, input process means, ElGamal cipher text preparation means, sequential substitution reencryption means, and result output means, characterized in that the input means inputs information on a circuit whose output is desired to be obtained, information on the plurality of computers, and information on which part of an input to the circuit each of the computers has, the ElGamal cipher text preparation means prepares ElGamal cipher texts for generating a set of ElGamal cipher texts corresponding to gates of the circuit that realizes the given function, the sequential substitution reencryption means includes cipher text obtaining means for allowing the computer in this turn to receive the set of ElGamal cipher texts from the computer in the previous turn, cipher text substitution and reencryption means for changing an order of the set of cipher texts received by the cipher text obtaining means for substitution and subjecting those cipher texts to reencryption, and means for disclosing the data generated by the cipher text substitution and reencryption means to at least the computer in the next order, and the result output means includes partial decryption means for deciphering or partially deciphering a part of the cipher texts generated by the cipher text substitution and reencryption means, decryption means for deciphering encryption related to itself of a cipher text that enciphers data corresponding to the input to the circuit in the cipher texts generated by the cipher text substitution and reencryption means, and evaluation means for evaluating an output of the circuit while using the data deciphered by the decryption means by the plurality of computers and the data partially deciphered by the partial decryption means by the plurality of computers.

According to another aspect of the present invention, there is provided a calculation system, including a plurality of computers, input means, and output means, in which one of the computers firstly, performs calculation and transmits the calculation result to another computer and the another computer which has received the calculation result performs the next calculation such that calculation is performed by one computer after another, and when all the computers have performed calculation once, the last computer which has performed calculation transmits the calculation result to the first computer which has performed calculation, and after this, calculation is performed by one computer after another and the calculation result is transmitted to the next computer such that the calculation of each cycle is repeated, characterized in that the input means inputs information on a circuit and a part of input bits to the circuit to the computer, the calculation of the zero-th cycle is performed before the first computer performs the calculation of the first cycle, the plurality of computers include data obtaining means for obtaining transmitted data used in the calculation of each cycle, validity proof verifying means, signature text verifying means, first computer special calculating means performed by the first computer, random number generating means for performing random number generation, a main calculation calculating means for performing a main calculation, validity proof generating means for proving a validity for a calculation performed in the main calculation, signature means, and data transmission means, the transmitted data includes data transmitted from other computer, data main body, a validity proof for the data main body, and a signature text, the signature text includes data including a signature text corresponding to a combination of the data transmitted from the other computer, the data main body, and the validity proof for the data main body, the validity proof verifying means verifies a validity proof in the transmitted data the signature text verifying means verifies the signature text in the transmitted data, the main calculation calculates the random number generated by the random number generating means, the signature means generates a signature text for a combination of the transmitted data, the data main body that is the calculation result calculated in the main calculation, and the validity proof generated by the validity proof generating means, and the data transmission means transmits a combination of the transmitted data, the data main body that is the calculation result calculated in the main calculation, the validity proof generated by the validity proof generating means, and the signature text generated by the signature means.

In this case, the following construction may be adopted that a data main body of the transmitted data and the data main body that is the calculation result calculated in the main calculation include a combination of multiple sequence alignment ElGamal cipher texts on a true value group ring and extended multiple sequence alignment ElGamal cipher texts on the true value group ring in the calculation of the first cycle.

Furthermore, the following construction may be adopted that the calculation of each cycle includes calculation means for the first cycle and calculation means of cycles subsequent to the first cycle, the calculation means generates the combination of the multiple sequence alignment ElGamal cipher texts on the true value group ring and the extended multiple sequence alignment ElGamal cipher texts on the true value group ring with the calculation means of the zero-th cycle and includes reencryption public key generating means for generating a public key used for reencryption by the calculation means of the first cycle, data conversion means for converting the transmitted data, secret key conversion means, and random number conversion means, the data conversion means is adapted to convert the combination of the cipher texts that are the data main body with another combination of multiple sequence alignment ElGamal cipher texts on the true value group ring and extended multiple sequence alignment ElGamal cipher texts on the true value group ring, the secret key conversion means converts the secret key used for the combination of the cipher texts that are the calculation result of the data conversion means with a secret key corresponding to the public key generated by the reencryption public key generating means, the calculation result of the secret key conversion means includes a combination of multiple sequence alignment ElGamal cipher texts on the true value group ring and extended multiple sequence alignment ElGamal cipher texts on the true value group ring, the random number conversion means is adapted to convert a random number used for the combination of the cipher texts that are the calculation results of the data conversion means, and the calculation result of the random number conversion means includes a combination of multiple sequence alignment ElGamal cipher texts on the true value group ring and extended multiple sequence alignment ElGamal cipher texts on the true value group ring.

Furthermore, the following construction may be adopted that the calculation means of the cycles subsequent to the first cycle includes of the calculation means of the second cycles and the calculation means of cycles subsequent to the second cycle, the data main body of the transmitted data and the data main body calculated in the main calculation include a combination of multiple sequence alignment ElGamal cipher texts on the true value group ring and extended multiple sequence alignment ElGamal cipher texts on the true value group ring in the second calculation, and the calculation means of the second cycles cipher text conversion means for converting the data main body of the transmitted data to generate an ElGamal cipher text or an ellipse curve ElGamal cipher text and partial decryption means for partially deciphering the cipher texts of the data main body of the transmitted data.

Moreover, the calculation means of the cycles subsequent to the second cycle only includes the calculation means of the third cycle, the calculation means of the third cycle of the main calculation means outputs the transmitted data as it is, and the validity proof generating means outputs a null string.

According to the method of calculating the function from the large number of inputs, while the ElGamal encryption method is used, the devices including the means for generating a correspondence table of the gate input and output whose values are concealed and the respective inputs subsequently operates so that orders of the correspondence tables including the set of the ElGamal cipher texts are shuffled as shown in FIG. 5. With the adoption of such a construction, it is possible to achieve the object of the present invention by calculating the output of the function with respect to the inputs that are distributed to the respective devices.

Effect of the Invention

The first effect resides in that the calculation amount of the respective devices and the communication amount are remained to be only in proportion to the number of gates of the circuit, which is efficient.

This is because the correspondence table of the gate input and output is generated with the ElGamal cipher text for each gate, and any random number generating device is not used, thereby making it easier to prove the validity for the calculation on the correspondence table to the third party.

The second effect resides in that the number of times for the respective calculation devices to perform the communication with another calculation device is remained to be a fixed number irrespective of the number of gates of the circuit to be calculated, which is efficient.

This is because it is necessary to perform the operation for making the correspondence relation of the correspondence tables of the input and output of the respective gates unknown to all the calculation devices, but this operation is realized by the operation of shuffling the correspondence relations in orders by the respective calculation devices.

BEST MODE FOR CARRYING OUT THE INVENTION

Next, embodiments of the present invention will be described with reference to the drawings.

First Embodiment

A first embodiment of the present invention will be described with reference to FIGS. 6 to 13.

[Preparation]
[System Configuration]

Figure 11:
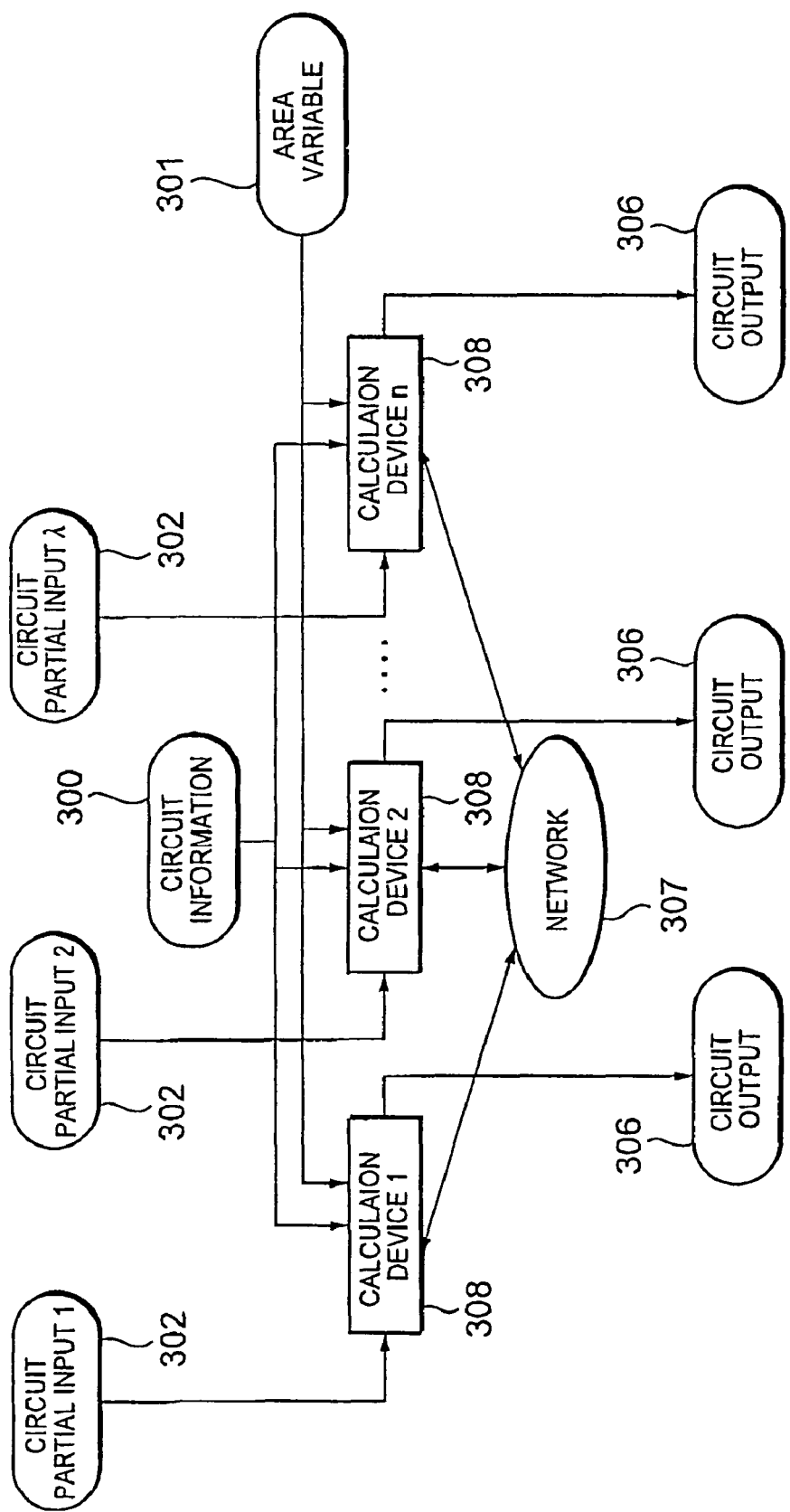
FIG. 11 is a block diagram showing a construction in the specific example of the operation according to the best mode for carrying out the first invention.

As shown in FIG. 11, $\lambda$ calculation devices 308 respectively include communication means 307. Hereinafter, the calculation devices are called as follows in turn.

$$\{u^{(\alpha)}\}_{\alpha=1,\ldots,\lambda}$$

The number of the calculation devices, a relation with a subscript character a which corresponds to the respective calculation devices, and the like are referred to as system configuration information.

[Circuit Information]

In a description described later, circuit information is input to the respective calculation devices expressed as follows.

$$\{u^{(\alpha)}\}_{\alpha=1,\ldots,\lambda}$$

This circuit information will be described.

First, a circuit expressed by input circuit information is denoted by f. The circuit f is a circuit including m logical gates. The respective gates are referred to as $G_1, \ldots, G_l, \ldots, G_m$. Herein, the respective gates have 2 inputs and 1 output. If the circuit is not formed by such gates, the respective gates are replaced by an equivalent circuit including a plurality of 2-input 1-output gates. This replacement method is already known, so the description will be omitted. A wiring for transmitting a signal from one gate of the circuit to an input of another gate transmits a signal which corresponds to 0 or 1. An output wiring of G [k] is denoted by $w_{(k)}$. The number of wirings to be input to the circuit f is set as n, and this is set as $\{w_{[k]}\}_{k=m+1,\ldots,m+n}$. The wiring may be blanched in a midway to be input to two or more gates. The wiring [k] is adapted to transmit the same signal even in the case of blanching, and the blanched wirings are collectively referred to as $w_{[k]}$. Symbols $w_{[1]}, \ldots, w_{[l]}$ denote outputs of the circuit f. All of the wirings of the circuit are either a gate output wiring or a circuit input wiring. Thus, the wirings $\{w_{[k]}\}_{k=1,\ldots,m+n}$ are all the wirings.

When the outputs of the gates $G_i$ and $G_j$ are input to the gate $G_k$, that is, when the wirings $w_{[l]}$ and $w_{[J]}$ are input to the gate $G_k$, and the wiring $w_k$ is connected as the wiring for the output of $G_k$, a relation among the output b ⌈i⌉ of the gate $G_l$, the output b ⌈j⌉ of the gate $G_j$, and the output b ⌈k⌉ of the gate $G_k$, is set as follows.

$$b_{[k]} = b^{[i]} \otimes G_{[k]} b_{[J]}$$

Then, the calculation device $u^{(\alpha)}$ has a part of the signal to be input to the circuit f. The calculation device knows the signal propagated to a part of the wirings $\{w_{(k)}\}_{k=m+1,\ldots,m+n}$.

When the number of bits to be input to the circuit f by the calculation device $u^{(\alpha)}$ is $I_\alpha$, and the inputs of the all the calculation devices are gathered, the inputs constitute all the inputs to the circuit. That is, the following expression is obtained.

$$\Sigma_{\alpha=1}^\lambda I_\alpha = \lambda$$

With regard to $k=m+1, \ldots, m+n$, bits that are input to the respective wirings $w_{[k]}$ are set as b[k] and the respective bits are allocated by $I_\alpha$ each for the calculation device $u^{(\alpha)}$. In other words, the calculation device $u^{(\alpha)}$ determines the set described below.

$$\{b_{[k]} \in \{0,1\}\} k = m + \Sigma_{\beta=1}^{\alpha-1} I_\beta + 1, \ldots, m + \Sigma = 1^\alpha I_\beta$$

Even when the allocation of the circuit numbers is changed, the circuit is not changed fundamentally. Therefore, even when the inputs are allocated in the above-mentioned manner, the generality is not impaired.

The m gates $G_1, \ldots, G_m$, the calculation $\otimes_{G[k]}$ performed at the respective gates, the wirings $\{w_{[k]}\}_{k=m+1,\ldots,m+n}$ connected to the respective gates, and the allocation of the input wirings $\{I_\alpha\}_{\alpha=,\ldots,\lambda}$ with respect to the calculation devices are referred to as circuit information 300.

[Group Used for the Calculation]

In this embodiment, the calculation on an ellipse curve is utilized, so this group will be described. However, the group is not necessarily essential for carrying out the present invention. As a substitution of this group, a commutative multiplicative group such as a calculation on a prime field may be used.

Hereinafter, reference symbol E denotes an ellipse curve whose order is a prime factor q, reference symbol E denotes O an infinite distance of the ellipse curve E, and reference symbol G(≠O) denotes a point on the ellipse curve E. The prime factor q is set sufficiently large to be cryptologically secure. A mapping from the point of the ellipse curve E onto Z/qZ is expressed by φ. The mapping φ whose Image space is sufficiently large is selected. As an example of the mapping φ, one of the values of the coordinate on the ellipse curve E is used, or the like. When reference symbol h denotes a member and reference symbol G denotes a point on the ellipse curve E, a point multiplied by h is expressed as [h]G.

[Notation]

A character written on a right shoulder is a superscript but the character is not an order representing a power. In addition, □ represents an exclusive OR of the bit.

[Input Processes 203, 312]

Figure 1:
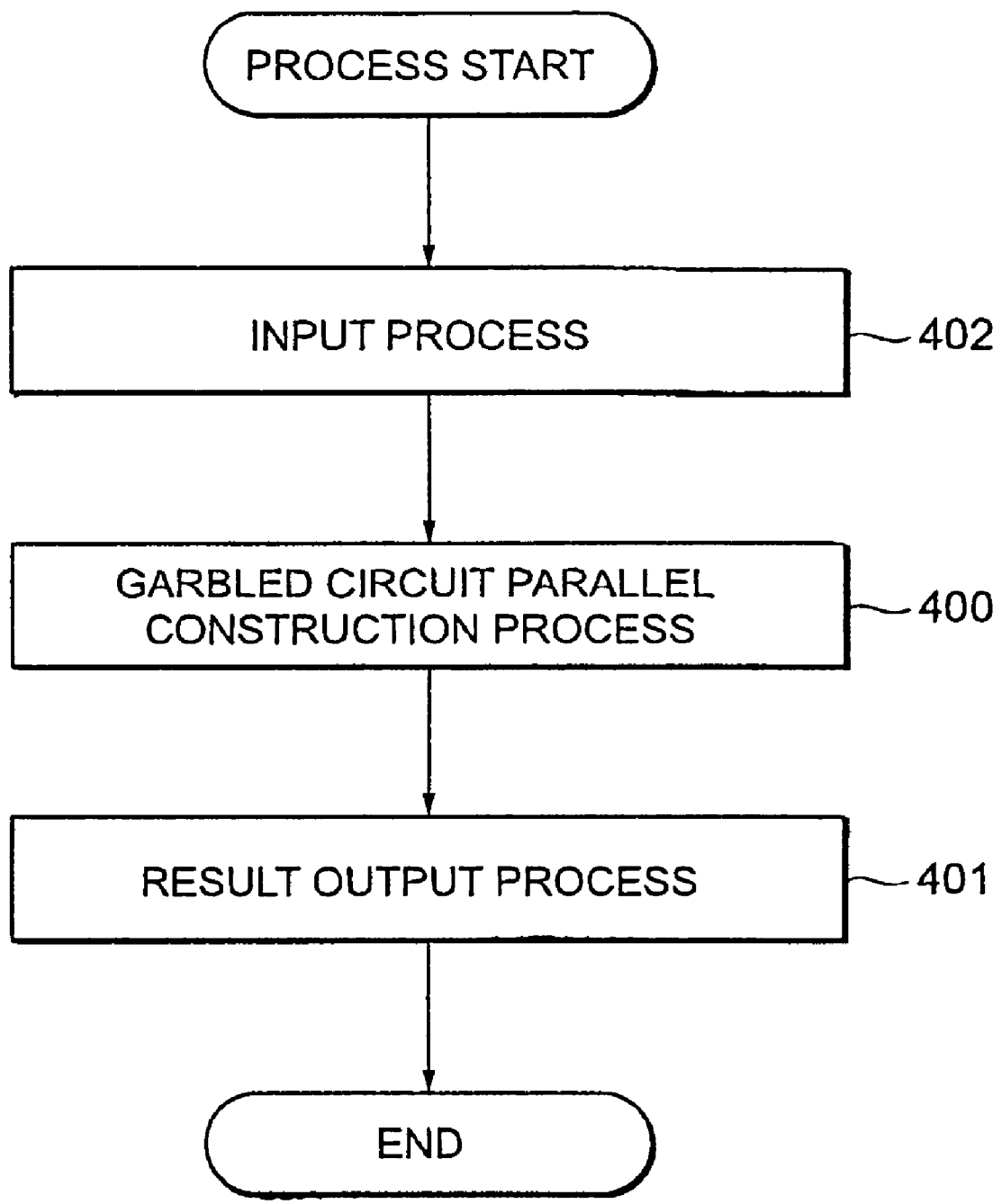
FIG. 1 is a flowchart for describing a prior art of Non-patent Document 1.
Figure 2:
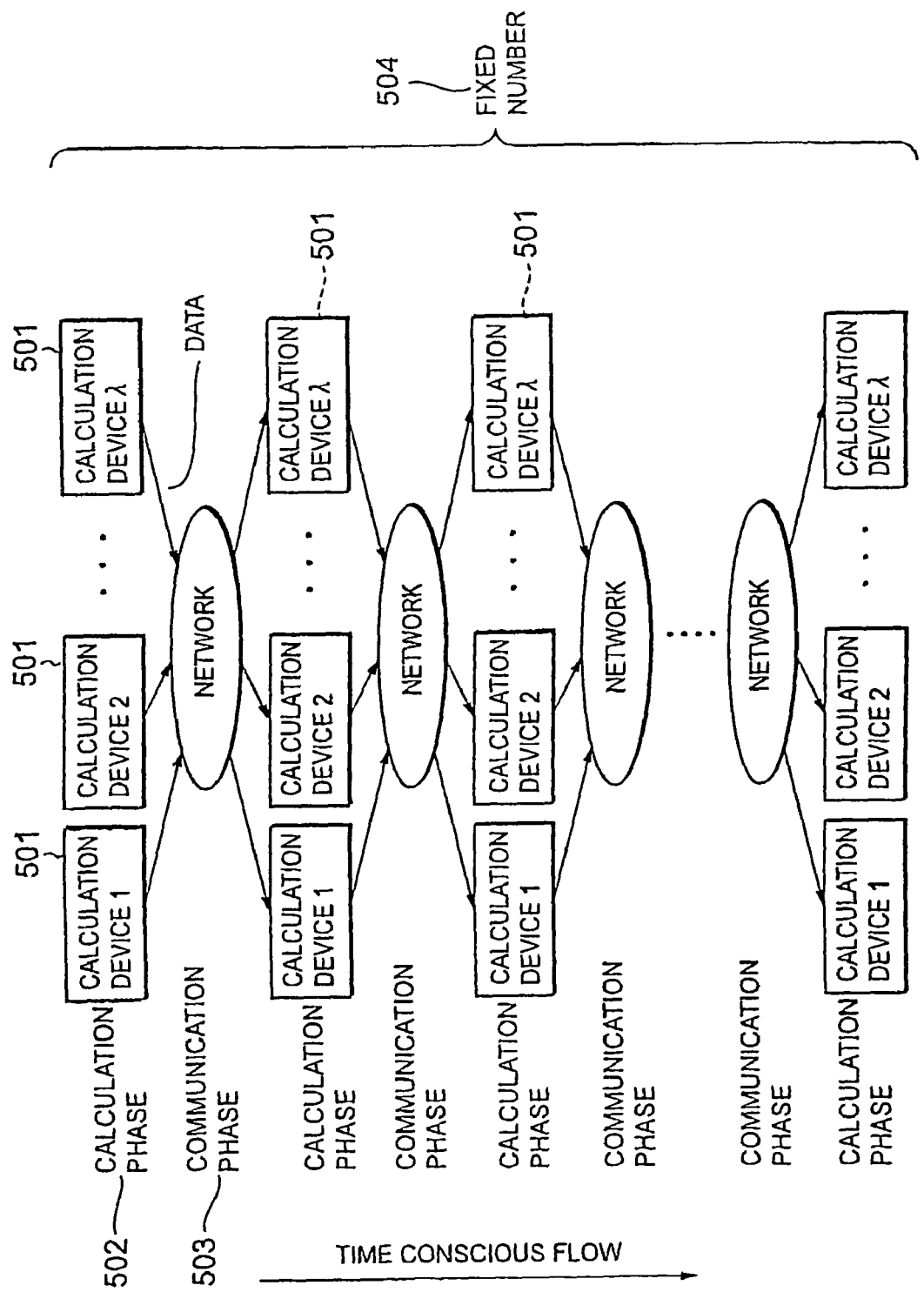
FIG. 2 is a drawing showing a relation between a calculation phase and a communication phase in a garbled circuit parallel construction process according to the prior art of Non-patent Document 1 in which calculation devices to which the same numerals are given are described several times but are the identical devices which operate in a different time, and the time flows from the top to the bottom in the drawing.
Figure 3:
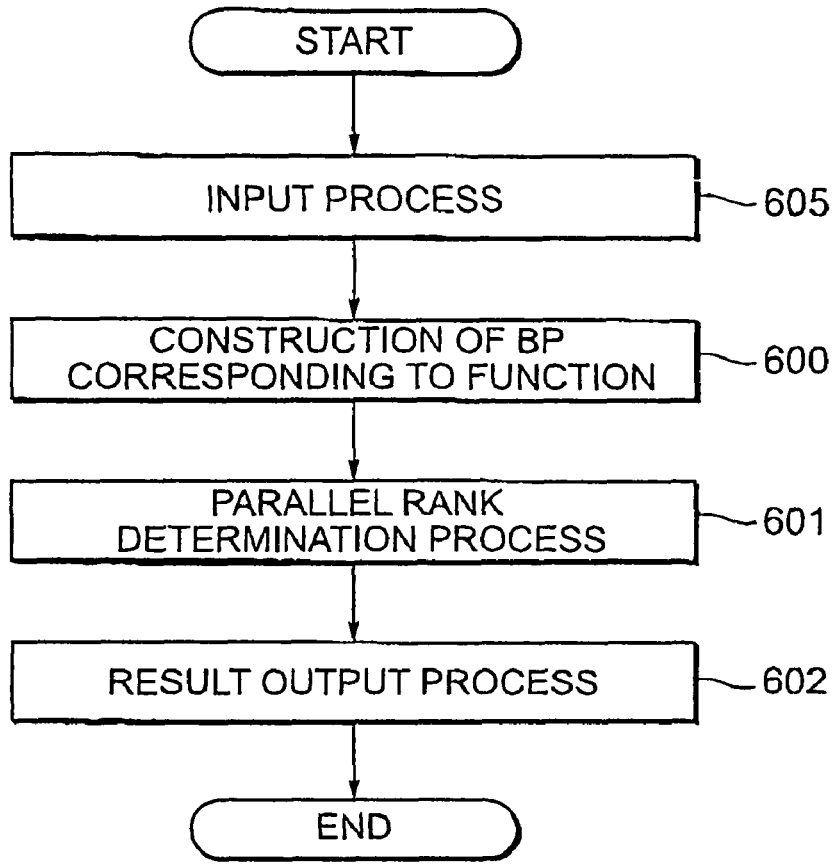
FIG. 3 is a flowchart for describing a prior art of Non-patent Document 2.
Figure 4:
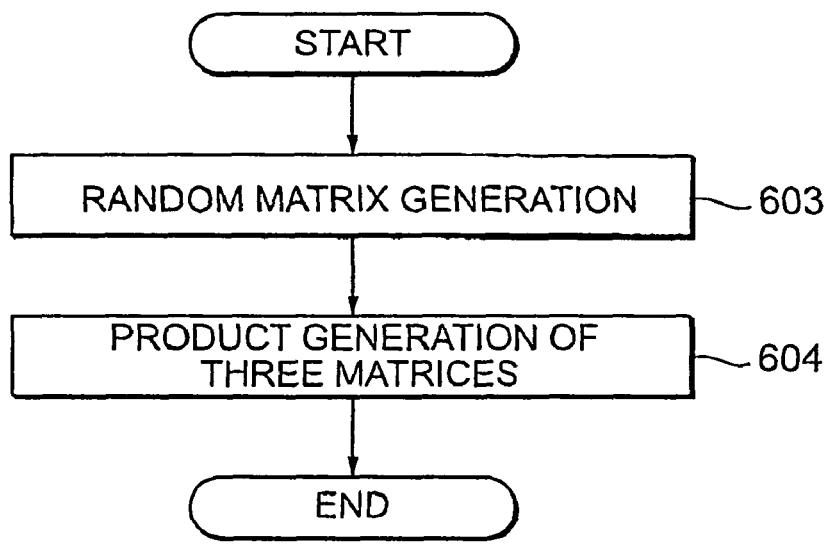
FIG. 4 is a flowchart for describing only one process out of processes performed in parallel plural times in a parallel rank determination process in the flowchart of FIG. 3 that describes the prior art of Non-patent Document 2.
Figure 5:
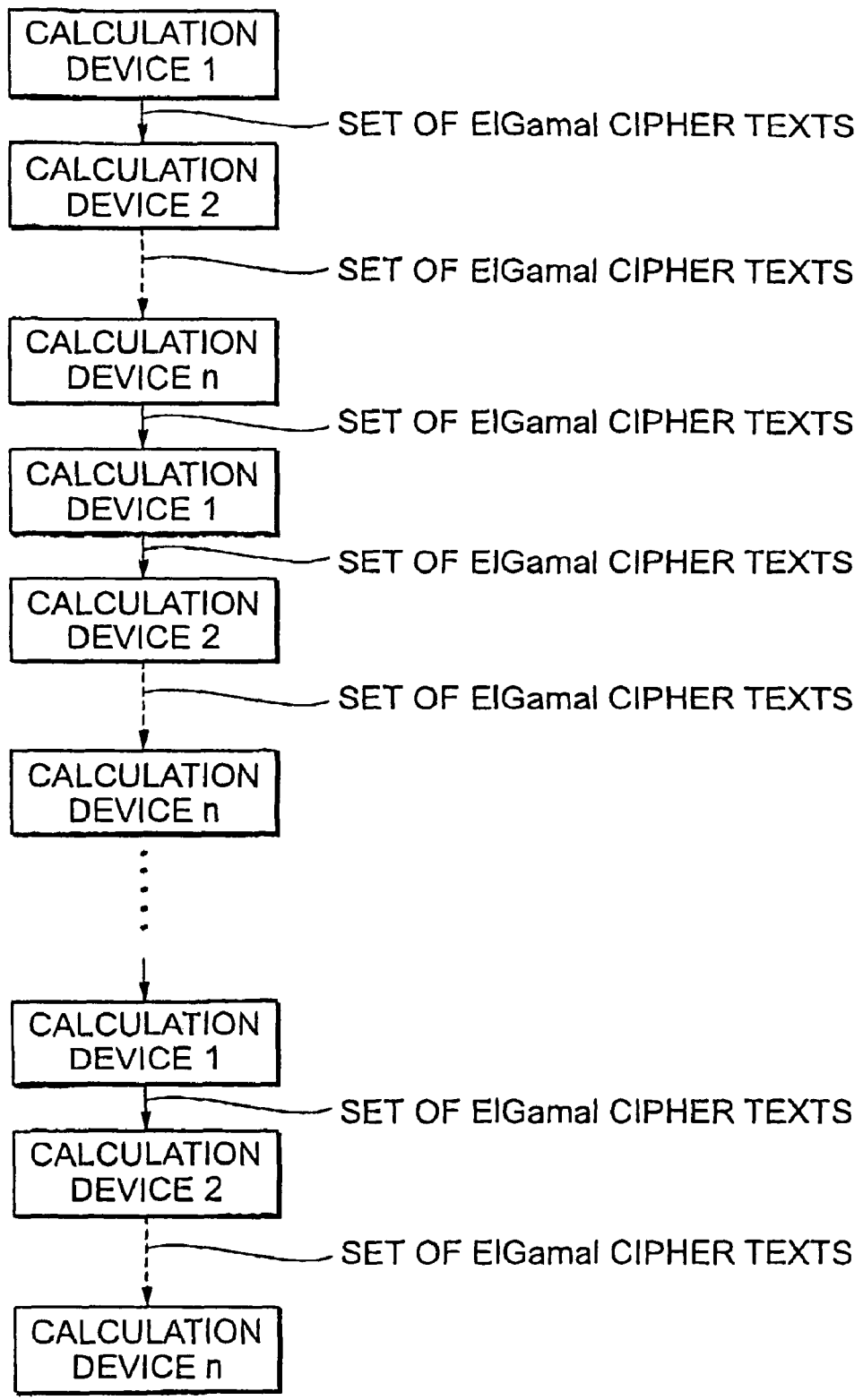
FIG. 5 is a block diagram showing a calculation process flow devised to solve the problems of the conventional method by the technology proposed in this application.
Figure 6:
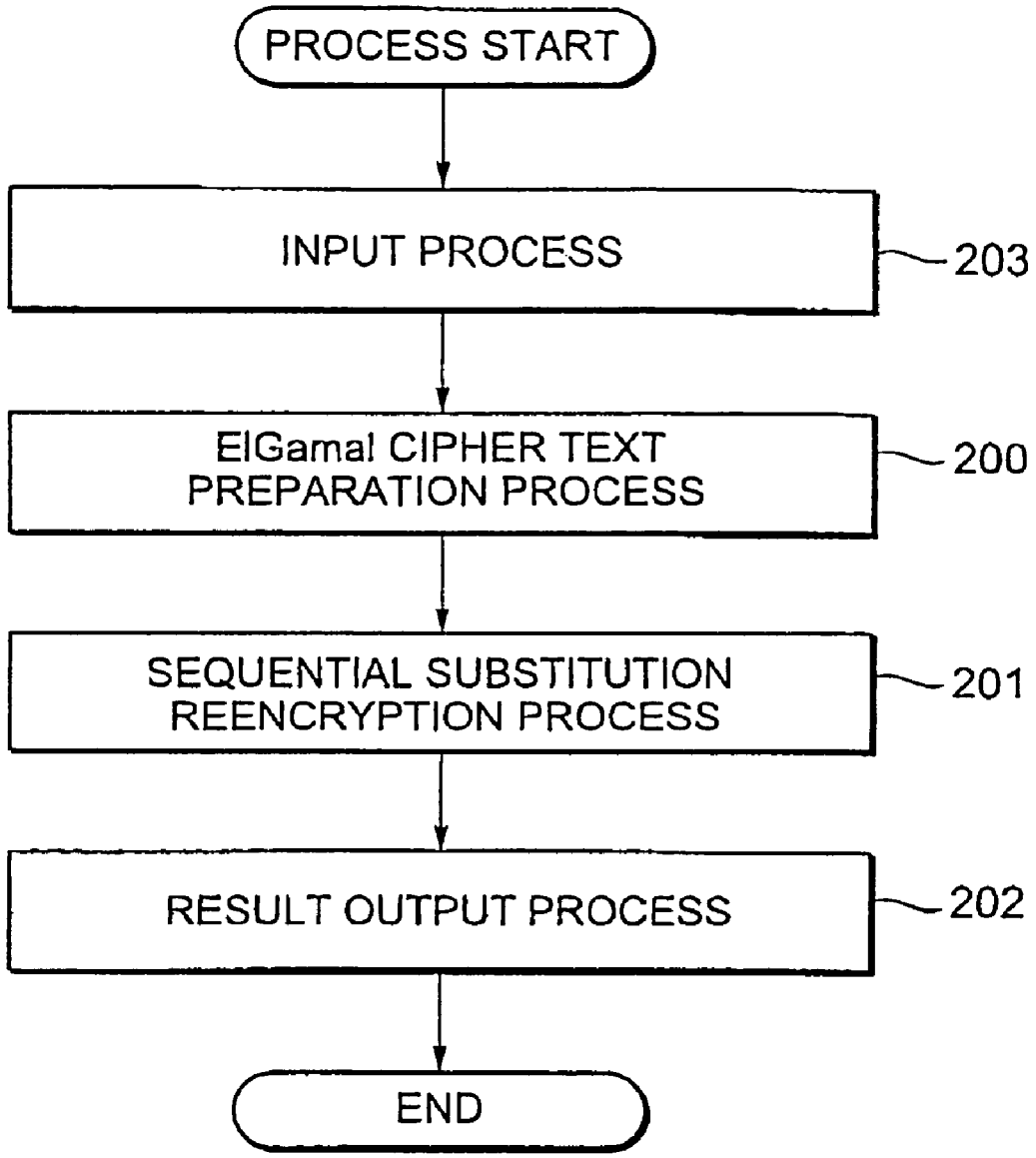
FIG. 6 is a flowchart showing a specific example of an operation of a best mode for carrying out a first invention.

When the process is started, as shown in FIG. 6, first of all, an input process 203 is performed. The input process 203 will be described with reference to FIGS. 12 and 13 which show the detail of the process.

In an ElGamal cipher text preparation process, by using information public means and public information obtaining means, disclosure and obtainment of data are both performed (309).

[Determination of Area Variables]

The calculation determines E, G, and φ. In addition, a method of using a hash function or the like determines a point H on the ellipse curve which no one can find out the original Z/qZ of in which H=[h]G is satisfied. These values E, H, G, and φ are referred to area variables 301. These values are all stored in the calculation device in advance (Step 100 of FIG. 13).

[Input of Circuit Information and Circuit Part Input]

Figure 13:
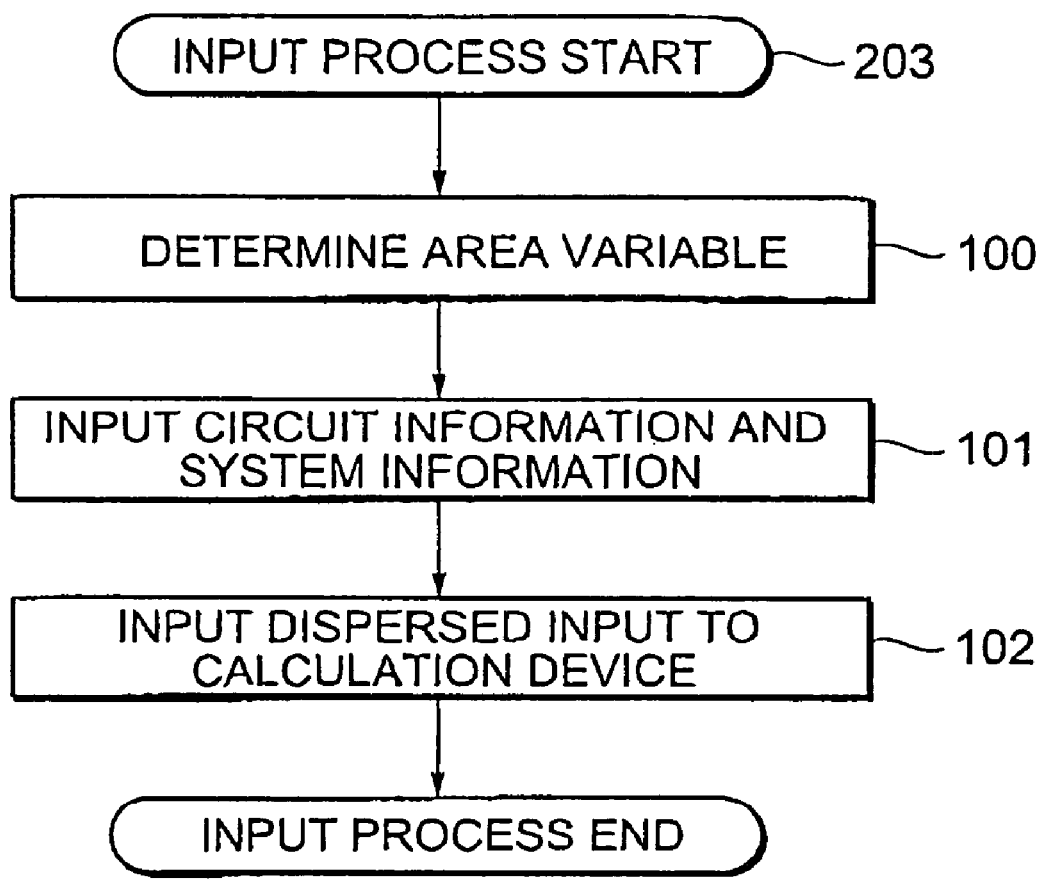
FIG. 13 is a flowchart showing a detail of an input process in the specific example of the operation according to the best mode for carrying out the first invention.

Information of the circuit f and system configuration information are input to all of the calculation devices (Step 101 of FIG. 13).

To the respective calculation devices $\{u^{(\alpha)}\}_{\alpha=1,\ldots,\lambda}$, the following partial input dispersed to the circuit is input (Step 102 of FIG. 13).

$$\{b_{[k]} \in \{0,1\}\} k = m + \Sigma_{\beta=1}^{\alpha-1} I_{\beta+1}, \ldots, m + \Sigma_{\beta=1}^\alpha I_\beta$$

[ElGamal Cipher Text Preparation Processes 200, 203]
[Setting of Secret Key and Public Key for Each Gate]

Next, as shown in FIG. 6, an ElGamal cipher text preparation process 200 is performed. The ElGamal cipher text preparation process 200 will be described with reference to FIGS. 7 and 8 which show the detail of the process.

The respective calculation devices $u^{(\alpha)}$ uniquely and randomly generate gate secret keys described below for all $k=1,\ldots,m+n$ and all $b \in \{0,1\}$ (Step 103 of FIG. 7).

$$X^{(\alpha)b}_{[k]} \in_R E$$

$$z^{(\alpha)} \in_R Z/qZ$$

The respective calculation devices $u^{(\alpha)}$ generate the following data for all $k=1,\ldots,m+n$ and all $b \in \{0,1\}$.

$$x^{(\alpha)b}_{[k]} = \phi(X^{(\alpha)b}_{[k]})$$

Figure 7:
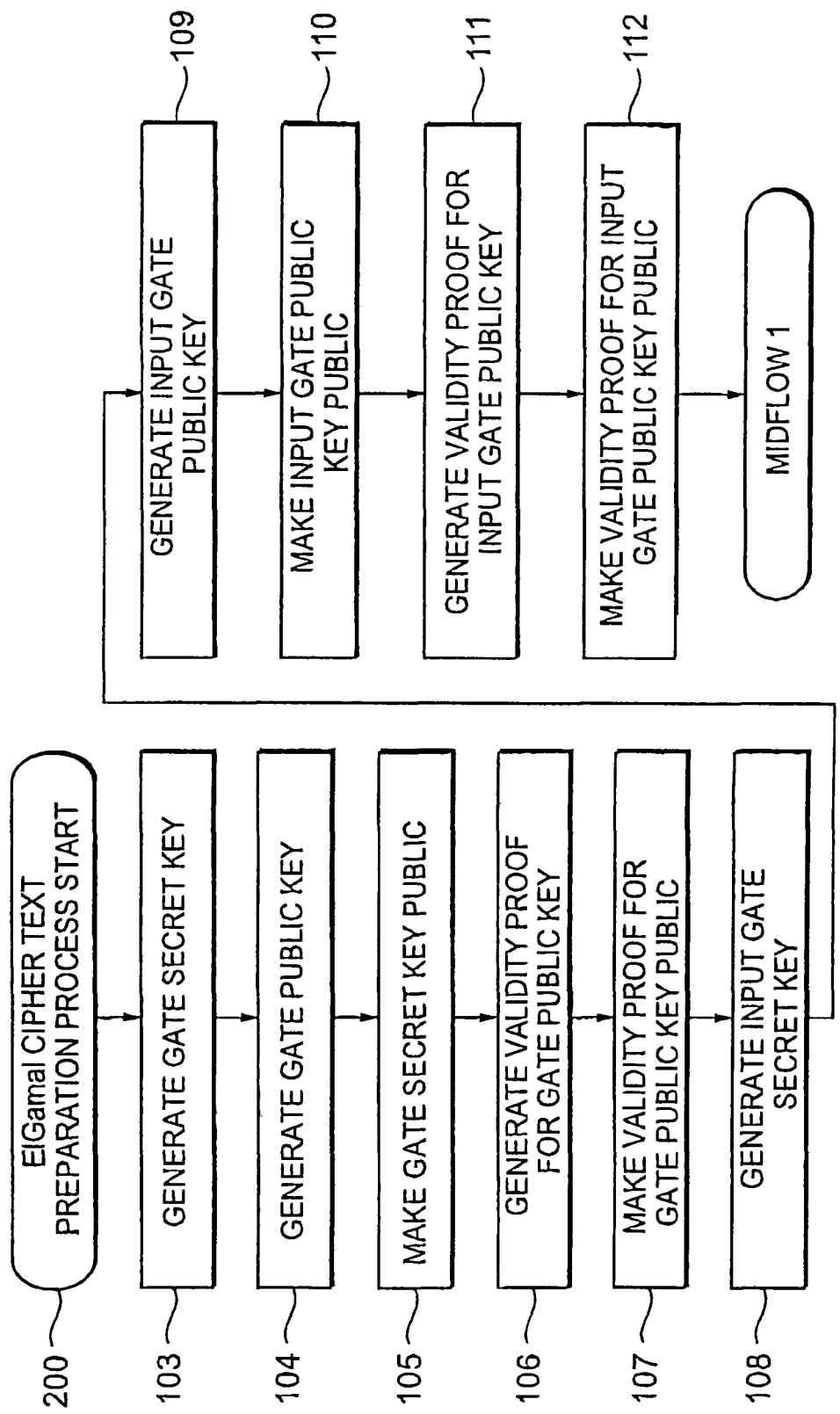
FIG. 7 is a flowchart showing a detail of the first half of an ElGamal cipher text preparation process in the specific example of the operation according to the best mode for carrying out the first invention.

Then, the respective calculation devices $u^{(\alpha)}$ generate gate public keys for all $k=1,\ldots,m+n$ and all $b \in \{0,1\}$ (Step 104 of FIG. 7).

$$Y^{(\alpha)b}_{[k]} = [x^{(\alpha)b}_{[k]}]G$$

$$Z^{(\alpha)} = [z^{(\alpha)}]G$$

After that, the respective calculation devices $u_\alpha$ use information public devices to make public the gate public keys generated by themselves (Step 105 of FIG. 7). Hereinafter, in the first embodiment, to make public means that the information public device is used to make something public.

In addition, with respect to each $Y^{(\alpha)b}_{[k]}, Z^{(\alpha)}$, while following a method A described separately, the respective calculation devices $u_\alpha$ generate the proof of having knowledge of $x^{(\alpha)b}_{[k]}, z^{(\alpha)}$ as the validity proof for the gate public key (Step 106 of FIG. 7) and make the proof public (Step 107 of FIG. 7).

[Setting of Input Public Key]

The respective calculation devices $u_\alpha$ generate input gate secret keys for all of the below.

$$k = m + 1 + \Sigma_{\beta=1}^{\alpha-1} I_\beta, \ldots, m + \Sigma_{\beta=1}^\alpha I_\beta$$

The respective calculation devices $u_\alpha$ use the input $b\lceil k\rceil \in \{0,1\}$ to uniquely and randomly generate input gate secret keys described below (Step 108 of FIG. 7).

$$x^{-b[k]}{}_{[k]} \in_R Z/qZ$$

The respective calculation devices $u_\alpha$ generate input gate public keys described below (Step 109 of FIG. 7).

$$Y^{-b[k]}{}_{[k]} = [x^{-b[k]}{}_{[k]}]G$$

$$Y^{-b[k]\square 1}{}_{[k]} = H - Y^{-b[k]}{}_{[k]}$$

With respect to all $k=m+1+\Sigma_{\beta=1}^{\alpha-1} I_\beta, \ldots, m+\Sigma_{\beta=1}^{\alpha} I_\beta$ and all $b \in \{0,1\}$, the respective calculation devices $u_\alpha$ make $Y^{-b}{}_{[k]}$ as the input gate public key of the calculation devices (Step 110 of FIG. 7).

In addition, regarding each k, while following a method B described separately, the respective calculation devices $u_\alpha$ generate the proof of having knowledge described below with respect to $b\lceil k\rceil=0$ or $b\lceil k\rceil=1$ as the validity proof for the input gate public key (Step 111 of FIG. 7) and make the proof public (Step 112 of FIG. 7).

$$Y^{-b[k]}{}_{[k]} = [x^{-b[r]}{}_{[k]}]G \text{ which is meant by } x^{-b[k]}{}_{[k]}$$

[Processing Related to Gate]

All the calculation devices $\{u_\alpha\}$ use the public information obtaining means to obtain the gate public key expresses as follows (Step 113 of FIG. 8).

$$\{Y^{(\alpha)b}{}_{[k]}, Z^{(\alpha)}\}_{\alpha=1,\ldots,\lambda}$$

With respect to all $k=1, \ldots, m$ and all $b \in \{0,1\}$, the calculation devices $\{u_\alpha\}$ integrate the gate public key as expressed below by themselves (Step 114 of FIG. 8).

$$Y^b{}_{[k]} = \Sigma_{\alpha=1}^{\lambda} Y^{(\alpha)b}{}_{[k]}$$

$$Z = \Sigma_{\alpha=1}^{\lambda} Z^{(\alpha)}$$

With respect to all $k=1, \ldots, m$ and all $b \in \{0,1\}$, all the calculation devices $\{u_\alpha\}$ uniquely and randomly generate the following data.

$$r^{(\alpha)\epsilon}{}_k \in_R Z/qZ$$

Then, with respect to all $k=1, \ldots, m$ and all $b, c, \epsilon \in \{0,1\}$ $k=1$, encryption is performed through the ellipse ElGamal encryption method, thereby generating a cipher text of the gate secret key described below (Step 115 of FIG. 8) and making the text public (Step 116 of FIG. 8).

$$(C^{(\alpha)bc\epsilon}{}_{[k]}, D^{(\alpha)bc\epsilon}{}_{[k]}) = ([r^{(\alpha)\epsilon}{}_{[k]}]G, X^{(\alpha)\epsilon}{}_{[k]} + [r^{(\alpha)\epsilon}{}_{[k]}](Y^b{}_{[i]} + Y^c{}_{[j]} + Z))$$

It should be noted that the wirings $w[i]$ and $w[j]$ are input to the gate $G[k]$.

Figure 8:
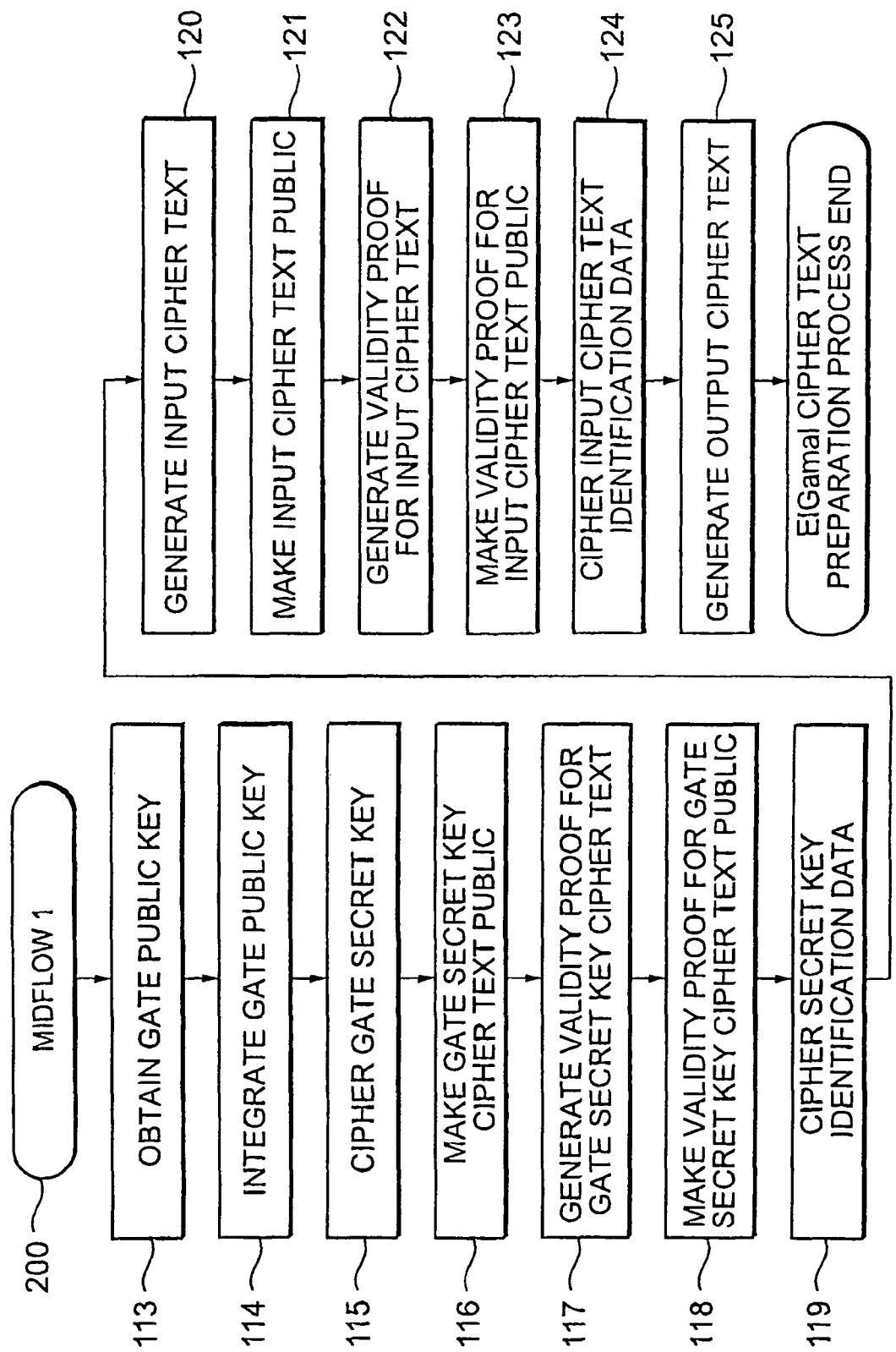
FIG. 8 is a flowchart showing a detail of the latter half of the ElGamal cipher text preparation process in the specific example of the operation according to the best mode for carrying out the first invention.

In addition, the proof in that the decryption results of the ellipse ElGamal cipher texts $(C^{(\alpha)bc0}{}_{[k]}, D^{(\alpha)bc0}{}_{[k]})$ with respect to all k and all $b,c \in \{0,1\}$ are identical to each other and the decryption results of the ellipse ElGamal cipher texts $(C^{(\alpha)bc1}{}_{[k]}, D^{(\alpha)bc1}{}_{[k]})$ with respect to all k and all $b,c \in \{0,1\}$ are identical to each other is generated as the validity proof for the gate secret key cipher texts by using a method C described separately (Step 117 of FIG. 8) and the proof is made public (Step 118 of FIG. 8).

With respect to all $k=1, \ldots, m$ and all $b,c,\mu,\nu,\zeta \in \{0,1\}$, all the calculation devices $\{u_\alpha\}$ generate secret key identification data cipher texts described below by themselves (Step 119 of FIG. 8).

$$(A^{(0)bc}{}_{[k]\mu,\nu,\xi}, B^{(0)bc}{}_{[k]\mu,\nu,\xi}) = O, [\epsilon]G$$

$$\{(C^{(0)\alpha bc}{}_{[k]\mu,\nu,\xi}, D^{(0)\alpha bc}{}_{[k]\mu,\nu,\xi})\}_{\alpha=1,\ldots,\lambda} = \{(C^{(\alpha)bc\epsilon}{}_{[k]}, D^{(\alpha)bc\epsilon}{}_{[k]})\}_{\alpha=1,\ldots,\lambda}$$

wherein $\epsilon = ((b \square \mu) \otimes G[k](c \square \nu)) \square \xi$.

[Processing Related to Input Wiring]

With respect to all $k=m+1, \ldots, m+n$ and all $\epsilon \in \{0,1\}$, all the calculation devices $\{u_\alpha\}$ uniquely and randomly generate the following data.

$$r^{-(\alpha)\epsilon}{}_k \in_R Z/qZ$$

Then, with respect to all $k=m+1, \ldots, m+n$ and all b, $\epsilon \in \{0,1\}$, all the calculation devices but $\{u_\alpha\}$ use the ellipse ElGamal encryption method to generate input cipher texts described below (Step 120 of FIG. 8) and make the texts public (Step 121 of FIG. 8).

$$(C^{(\alpha)bc\epsilon}{}_{[k]}, D^{(\alpha)bc\epsilon}{}_{[k]}) = ([r^{-(\alpha)\epsilon}{}_{[k]}]G, X^{(\alpha)\epsilon}{}_{[k]} + [r^{-(\alpha)\epsilon}{}_{[k]}](Y^{-b}{}_{[k]} + Z))$$

In addition, the proof in that the decryption results of the ellipse ElGamal cipher texts $(C^{(\alpha)bc0}{}_{[k]}, D^{(\alpha)b0}{}_{[k]})$ with respect to all k and all $b \in \{0,1\}$ are identical to each other and the decryption results of the ellipse ElGamal cipher texts $(C^{(\alpha)b1}{}_{[k]}, D^{(\alpha)b1}{}_{[k]})$ with respect to all k and all $b \in \{0,1\}$ are identical to each other is generated as the validity proof for the gate secret key cipher texts by using a method D described separately (Step 122 of FIG. 8) and the proof is made public (Step 123 of FIG. 8).

With respect to all $k=m+1, \ldots, m+n$ and all $b, \xi \in \{0,1\}$, all the calculation devices $\{u_\alpha\}$ generate input secret key identification data cipher texts described below (Step 124 of FIG. 8).

$$(A^{(0)b}{}_{[k]\xi}, B^{(0)b}{}_{[k]\xi}) = (O, [\epsilon]G)$$

$$\{(C^{(0)\alpha b}{}_{[k]\xi}, D^{(0)\alpha b}{}_{[k]\xi})\}_{\alpha=1,\ldots,\lambda} = \{(C^{(\alpha)b\epsilon}{}_{[k]}, D^{(\alpha)b\epsilon}{}_{[k]})\}_{\alpha=1,\ldots,\lambda}$$

wherein $\epsilon = b \square \xi$

[Process Related to Output Wiring]

With respect to all the wirings $k=1, \ldots, l$ and all b, $\epsilon \in \{0,1\}$, all the calculation devices $\{u_\alpha\}$ generate output cipher texts described below (Step 125 of FIG. 8).

$$(A^{\dagger(0)b}{}_{[k]\xi}, B^{\dagger(0)b}{}_{[k]\xi}), \& = \& (O, [\epsilon]G)$$

wherein $\epsilon = b \square \xi$

[Sequential Substitution Reencryption Process 201—Substitution and Reencryption of Gate Cipher Texts]

Next, a sequential substitution reencryption process 201 is performed as shown in FIG. 6. The sequential substitution reencryption process 201 will be described with reference to FIGS. 9 and 12 which show the detail of the process.

Figure 9:
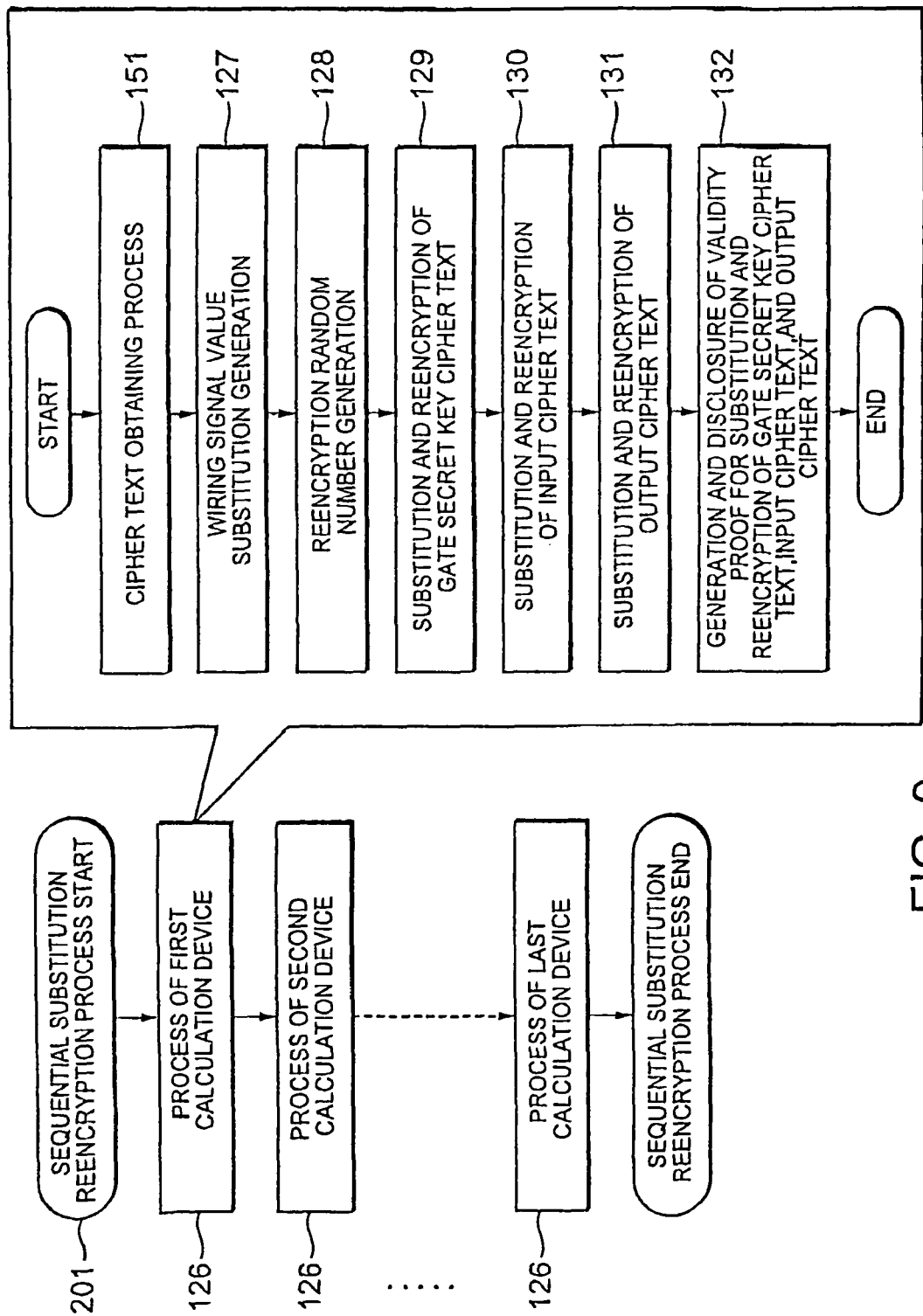
FIG. 9 is a flowchart showing a detail of the first half of a sequential substitution reencryption process in the specific example of the operation according to the best mode for carrying out the first invention in which processes of the flowchart shown in a balloon on the right hand side.

With respect to $\alpha=1, \ldots, \lambda$, the calculation devices perform the following process (denoted by reference numeral 304 of FIG. 12) in turn (Step 126 of FIG. 9). In this process, first of all, the respective calculation devices use the public information obtaining means to obtain necessary data (denoted by reference numeral 310 of FIG. 12) Next, the generated data is made public by using the information public means (denoted by reference numeral 311 of FIG. 12). The order of the $\lambda$ calculation devices is determined. In order that each of the calculation devices obtains the data, all of the other calculation devices in earlier turn before the calculation device need to finish the data disclosure.

[Cipher Text Obtaining Process]

The following are obtained in Step 151 of FIG. 9.

$$A^{(\alpha-1)bc}{}_{[k]\mu,\nu,\xi}, B^{(\alpha-1)bc}{}_{[k]\mu,\nu,\xi}, C^{(\alpha-1)\beta bc}{}_{[k]\mu,\nu,\xi}, D^{(\alpha-1)\beta bc}{}_{[k]\mu,\nu,\xi}$$

with respect to $k=1, \ldots, m$, all $\beta=1, \ldots, \lambda$, and all b, c, $\mu$, $\nu$, $\xi \in \{0,1\}$, $$A^{(\alpha-1)b}{}_{[k]\xi}, B^{(\alpha-1)b}{}_{[k]\xi}, C^{(\alpha-1)\beta b}{}_{[k]\xi}, D^{(\alpha-1)\beta b}{}_{[k]\xi}$$ with respect to all $k=m+1, \ldots, m+n$, all $\beta=1, \ldots, \lambda$, and all $b, \xi \in \{0,1\}$, and $A^{\dagger(\alpha-1)b}{}_{[k]\xi}, B^{\dagger(\alpha-1)b}{}_{[k]\xi}$ with respect to all $k=1, \ldots, l$, and all b, $\xi \in \{0,1\}$.

[Wiring Signal Value and Substitution Generation]

The calculation devices $u_\alpha$ uniquely and randomly generate substitutions $\{\pi(k) \in R\{0,1\}\}k=1,\ldots m+n$ of the signal values of the respective wirings (Step 127 of FIG. 9).

[Random Number Generation for Reencryption]

The calculation devices $u_\alpha$ uniquely and randomly generate random numbers described below which are used for gate secret key reencryption (Step 128 of FIG. 9).

$\{s^{(\alpha)bc}_{[k]\mu,\nu,\xi}\}_{k=1,\ldots,m;b,c,\mu,\nu,\xi \in R\{0,1\}}$ $\{t^{(\alpha)\beta bc}_{[k]\mu,\nu,\xi}\}k=1,\ldots,m;\beta=1,\ldots,\beta;b,c,\mu,\nu,\xi \in R\{0,1\}$ $\{s^{(\alpha)b}_{[k]\xi}\}_{k=m+1,\ldots,m+n;b,\xi \in R[0,1]}$ $[t^{(\alpha)\beta b}_{[k]\xi}]_{k=m+1,\ldots,m+n; \beta=1,\ldots,\lambda; b,\xi \in R[0,1]}$ $[s^{\dagger b}_{[k]\xi}]_{k=1,\ldots,I;b,\xi \in R\{0,1\}}$

[Substitution and Reencryption of Gate Secret Key Cipher Texts]

With respect to all $k=1,\ldots,m$ and all $b, c, \mu, \nu, \xi \in \{0,1\}$, the following data is generated by substituting the gate secret key for reencryption (Step 129 of FIG. 9).

$A^{(\alpha)bc}_{[k]\mu,\nu,\xi} = A^{(\alpha-1)bc}_{[k]\mu \Box \pi(i),\nu \Box \pi(j),\xi \Box \pi(k)} + [s^{(\alpha)bc}_{[k]\mu,\nu,\xi}]G$ $B^{(\alpha)bc}_{[k]\mu,\nu,\epsilon} = B^{(\alpha-1)bc}_{[k]\mu \Box \pi(i),\nu \Box \pi(j),\xi \Box \pi(k)} + [s^{(\alpha)bc}_{[k]\mu,\nu,\xi}](Y^b_{[i]} + Y^c_{[j]} + Z)$ $C^{(\alpha)\beta bc}_{[k]\mu,\nu,\xi} = C^{(\alpha-1)\beta bc}_{[k]\mu \Box \pi(i),\nu \Box \pi(j),\xi \Box \pi(k)} + [t^{(\alpha)\beta bc}_{[k]\mu,\nu,\xi}]G$ $D^{(\alpha)\beta bc}_{[k]\mu,\nu,\xi} = D^{(\alpha-1)\beta bc}_{[k]\mu \Box \pi(i),\nu \Box \pi(j),\xi \Box \pi(k)} + [t^{(\alpha)bc}_{[k]\mu,\nu,\xi}](Y^b_{[i]} + Y^D_{[j]} + Z)$

[Substitution and Reencryption of Input Cipher Texts]

With respect to all $k=m+1,\ldots,m+n$, all $\beta=1,\ldots,\lambda$, and all $b,\xi \in \{0,1\}$, the following data is generated by substituting the input cipher texts for reencryption (Step 130 of FIG. 9).

$A^{(\alpha)b}_{[k]\xi} = A^{(\alpha-1)b}_{[k]\xi \Box \pi(k)} + [s^{(\alpha)b}_{[k]\xi}]G$ $B^{(\alpha)b}_{[k]\xi} = B^{(\alpha-1)b}_{[k]\xi \Box \pi(k)} + [s^{(\alpha)b}_{[k]\xi}](Y^{-b}_{[k]} + Z)$ $C^{(\alpha)b}_{[k]\xi} = C^{(\alpha-1)\beta b}_{[k]\xi \Box \pi(k)} + [t^{(\alpha)b}_{[k]\xi}]G$ $D^{(\alpha)\beta b}_{[k]\xi} = D^{(\alpha-1)\beta b}_{[k]\xi \Box \pi(k)} + [t^{(\alpha)b}_{[k]\xi}](Y^{-b}_{[k]} + Z)$

[Substitution and Reencryption of Output Cipher Texts]

With respect to all $k=1,\ldots,I$ and all $b, \xi \in \{0,1\}$, the following data is generated by substituting the output cipher texts for reencryption (Step 131 of FIG. 9).

$A^{\dagger(\alpha)b}_{[k]\xi} = A^{\dagger(\alpha-1)b}_{[k]\xi \Box \pi(k)} + [s^{\dagger b}_{[k]\xi}]G$ $B^{\dagger(\alpha)b}_{[k]\xi} = B^{\dagger(\alpha-1)b}_{[k]\xi \Box \pi(k)} + [s^{\dagger b}_{[k]\xi}](Y^b_{[k]} + Z)$

[Validity Proof for Substitution and Reencryption]

$\{A^{(\alpha)bc}_{[k]\mu,\nu,\xi}, B^{(\alpha)bc}_{[k]\mu,\nu,\xi}, C^{(\alpha)\beta bc}_{[k]\mu,\nu,\xi}, D^{(\alpha)\beta bc}_{[k]\mu,\nu,\xi}\}$ with respect to all $k=1,\ldots,m$, all $\beta=1,\ldots,\lambda$, and all $b,c,\mu,\nu,\xi \in \{0,1\}$, $\{A^{(\alpha)b}_{[k]\xi}, B^{(\alpha)b}_{[k]\xi}, C^{(\alpha)\beta b}_{[k]\xi}, D^{(\alpha)\beta b}_{[k]\xi}\}$ with respect to all $k=m+1,\ldots,m+n$, all $\beta=1,\ldots,\lambda$, and all $b,\xi \in \{0,1\}$, and $A^{\dagger(\alpha)b}_{[k]\xi}, B^{\dagger(\alpha)b}_{[k]\xi}$ with respect to all $k=1,\ldots,I$ and all $b, \xi \in \{0,1\}$ are transmitted to the calculation device $u_{\alpha+1}$.

In addition, the proof in that the above-mentioned process is appropriately performed is generated as the validity proof for the substitution and the reencryption regarding the gate secret key cipher texts, the input cipher texts, and the output cipher texts in accordance with a method E described separately and the proof is made public (Step 132 of FIG. 9).

[Result Output Processes 202, 305]

Next, as shown in FIG. 6, a result output process 202 is performed. The process will be described with reference to FIGS. 10 to 12 which show the detail of the process.

Figure 12:
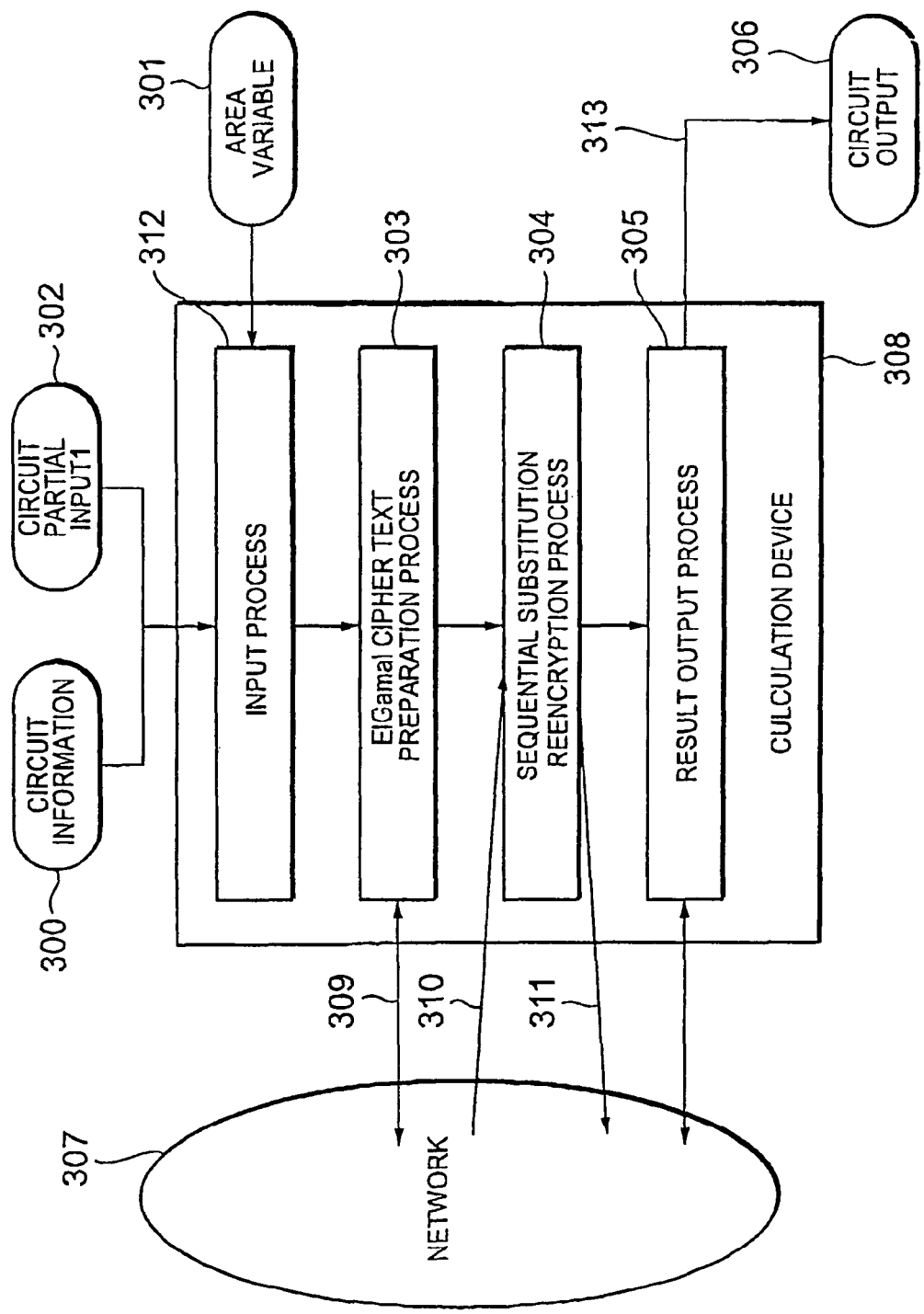
FIG. 12 is a block diagram showing a construction of the calculation device constituting the best mode for carrying out the first invention.

In the result output process 202, the information public means and public information obtaining means are used to perform both the disclosure and obtainment of the data (Step 312 of FIG. 12). Finally, the outputs of their own circuits are output (denoted by reference numeral 313 of FIG. 12).

[Partial Decryption of Gate Cipher Texts]

All the calculation devices $\{u_\alpha\}_{\alpha=1,\ldots,\lambda}$ partially decipher the gate secret key as described below with respect to all $k=1,\ldots,m, b, c \in \{0,1\}, \beta=1,\ldots,\lambda$ and make the result public (Step 134 of FIG. 10).

$A^{\ddagger(\lambda)abc}_{[k]000} = [Z^{(\alpha)}]^{(\lambda)bc}_{[k]000}$ $C^{\ddagger(\lambda)a\beta bc}_{[k]000} = [Z^{(\alpha)}]C^{(\lambda)\beta bc}_{[k]000}$ All the calculation devices $\{u_\alpha\}_{\alpha=1,\ldots,\lambda}$ partially decipher the input cipher texts as described below with respect to all $k=m+1,\ldots,m+n, b \in \{0,1\}, \beta=1,\ldots,\lambda$ and make the result public (Step 135 of FIG. 10).

$A^{\ddagger(\lambda)\alpha b}_{[k]0} = [Z^{(\alpha)}]A^{(\lambda)b}_{[k]0}$ $C^{\ddagger(\lambda)\alpha\beta b}_{[k]0} = [Z^{(\alpha)}]C^{(\lambda)\beta b}_{[k]0}$ All the calculation devices $\{u_\alpha\}_{\alpha=1,\ldots,\lambda}$ partially decipher the output cipher texts as described below with respect to all $k=1,\ldots,I, b \in \{0,1\}$ and make the result public (Step 136 of FIG. 10).

Figure 10:
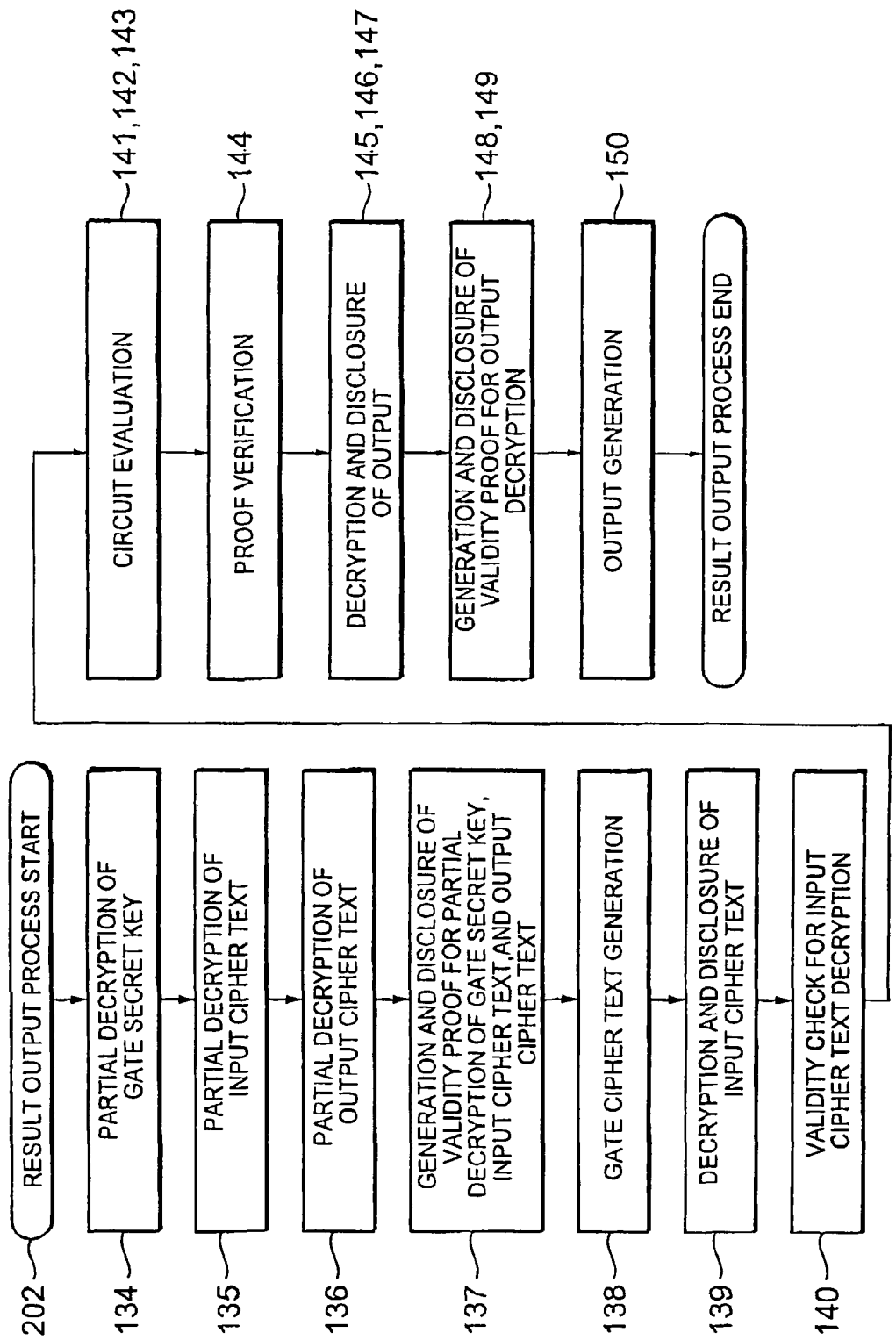
FIG. 10 is a flowchart showing a detail of a result output process in the specific example of the operation according to the best mode for carrying out the first invention.

$A^{\dagger\ddagger(\lambda)\alpha b}_{[k]0} = [Z^{(\alpha)}]A^{\dagger(\lambda)b}_{[k]0}$ In addition, the proof in that the above-mentioned process is appropriately performed is generated as the validity proof for the partial decryption regarding the gate secret key cipher texts, the input cipher texts, and the output cipher texts in accordance with a method F described separately and the proof is made public (Step 137 of FIG. 10).

[Gate Cipher Text Generation]

Furthermore, all the calculation devices generate the following data as the gate cipher texts with respect to all $k=1,\ldots,m$, all $\alpha=1,\ldots,\lambda$, and all $b,c,\in \{0,1\}$.

$A^{bc}_{[k]} = A^{(\lambda)bc}_{[k]000}$ $B^{bc}_{[k]} = B^{(\lambda)bc}_{[k]000} - \Sigma_{\alpha=1}^{\lambda} A^{\ddagger(\lambda)abc}_{[k]000}$ $C^{abc}_{[k]} = C^{(\lambda)abc}_{[k]000}$ $D^{abc}_{[k]} = D^{(\lambda)abc}_{[k]000} - \Sigma_{\alpha=1}^{\lambda} C^{\ddagger(\lambda)\alpha\beta bc}_{[k]000}$ All the calculation devices generate the following data as the gate cipher texts with respect to all $k=m+1,\ldots,m+n$, all $\alpha=1,\ldots,\lambda$, and all $b \in \{0,1\}$.

$A^b_{[k]} = A^{(\lambda)b}_{[k]0}$ $B^b_{[k]} = B^{(\lambda)b}_{[k]0} - \Sigma_{\alpha=1}^{\lambda} A^{\ddagger(\lambda)\alpha b}_{[k]0}$ $C^{\alpha b}_{[k]} = C^{(\lambda)\alpha b}_{[k]0}$ $D^{\alpha b}_{[k]} = D^{(\lambda)\alpha b}_{[k]0} - \Sigma_{\alpha=1}^{\lambda} C^{\ddagger(\lambda)\alpha\beta b}_{[k]0}$ Then, all the calculation devices generate the following data as the gate cipher texts with respect to all $k=1,\ldots,I$ and all $b \in \{0,1\}$ (Step 138 of FIG. 10).

$A^{\dagger b}_{[k]} = A^{\dagger(\lambda)b}_{[k]0}$ $B^{\dagger b}_{[k]} = B^{\dagger(\lambda)b}_{[k]0} - A^{\dagger\ddagger(\lambda)\alpha b}_{[k]0}$

[Decryption of Inputs]

The calculation devices $u^{(\alpha)}$ generate the following data with respect to all $k=m+1+\Sigma_{Y=1}^{\alpha-1} I_Y, \ldots, m+\Sigma_{Y=1}^{\alpha} I_Y$ and all $\beta=1, \ldots, \lambda$ without disclosing $b\lceil k \rceil$ and make the data public (Step 139 of FIG. 10).

$$G^{\flat}{}_{[k]}=B^{b[k]}{}_{[k]}-[x^{-b[k]}{}_{[k]}]A^{b[k]}{}_{[k]}$$

$$X^{\iota(\beta)}{}_{[k]}=D^{\beta[k]}{}_{[k]}-[x^{-b[k]}{}_{[k]}]C^{\beta b[k]}{}_{[k]}$$

$$x^{\iota(\beta)}{}_{[k]}=\phi(x^{\iota(\beta)}{}_{[k]})$$

The data made public is referred to as data deciphered from the input cipher texts.

All calculation devices $u_\alpha$ checks the following data with respect to all $k=m+1, \ldots, m+n$ and all $\beta=1, \ldots, \lambda$ to check the validity of the input cipher text decryption (Step 140 of FIG. 10).

$$Y^{(\beta)\epsilon[k]}{}_{[k]=[x}{}^{\iota(\beta)}{}_{[k]]}G$$

wherein if $G^{\flat}{}_{[k]}=0$, $\epsilon_k=0$, and if $G^{\flat}{}_{[k]}=G$, $\epsilon_k=1$.

[Circuit Evaluation]

With respect to all the gates $G_{k k=1, \ldots, m}$, all the calculation devices $u_\alpha$ find out outputs on the basis of the inputs in an appropriate order in the following manner (Step 141 of FIG. 10). This is the process for the circuit evaluation. It should be noted that outputs of the gates $G_i$ and $G_j$ are input to the gate $G_k$.

The following data is obtained with respect to $\beta=1, \ldots, \lambda$ (Step 142 of FIG. 10).

$$G^{\flat}{}_{[k]}=B^{b[i]b[j]}{}_{[k]}-\Sigma_{\gamma=1}\lambda(x^{(\gamma)b[i]}{}_{[k]+x}{}^{(\gamma)b[j]}{}_{[k]})A^{b[i]b[j]}{}_{[k]}$$

$$x^{\iota(\beta)}{}_{[k]}=D^{\beta b[i]b[j]}{}_{[k]}-[\Sigma_{\gamma=1}\lambda(x^{(\gamma)b[i]}{}_{[k]}+x^{(\gamma)b[j]}{}_{[k]})]C^{\beta b[i]b[j]}{}_{[k]}$$

$$x^{\iota(\beta)}{}_{[k]}=\phi(x^{\iota(\beta)}{}_{[k]})$$

With respect to all $\beta=1, \ldots, \lambda$, $Y^{(\beta)\epsilon[k]}{}_{[k]=[x}{}^{\iota(\beta)}{}_{[k]]}G$ is checked (Step 143 of FIG. 10). It should be noted that if $G^{\flat}{}_{[k]}=0$, $\epsilon_k=0$, and if $G^{\flat}{}_{[k]}=G$. $\epsilon_k=1$.

With respect to $k$ to which the above-mentioned process is performed, $b\lceil k \rceil=\epsilon_k$ is set.

[Output Evaluation]

The proofs made public up to this process are verified by a verifier (Step 144 of FIG. 10). If the verifier accepts all the proof texts, in other words, if no violations are found, the following process for the output deciphering and disclosure is performed.

With respect to $k=1, \ldots, I$, all the calculation devices $u_\alpha$ obtain the following data (Step 145 of FIG. 10).

$$G^{\dagger}{}_{[k]}=B^{\dagger b[k]}{}_{[k]}-[\Sigma_{\gamma=1}\lambda(x^{(\gamma)b[k]}{}_{[k]})A^{\dagger b[k]}{}_{[k]}$$

With respect to $k=1, \ldots, I$, all the calculation devices $\{u_\alpha\}_{\alpha=1}, \ldots, \lambda$ generate the following data (Step 146 of FIG. 10).

$$A^{\dagger\ddagger}{}_{[k]=[z}{}^{(\alpha)}{}_]A^{\dagger b[k]}{}_{[k]}$$

Then, the data is made public (Step 147 of FIG. 10).

In addition, the validity proof for this calculation is generated as the validity proof for the output deciphering in accordance with a method G described separately (Step 148 of FIG. 10) and the validity proof is made public (Step 149 of FIG. 10).

The respective calculation devices $u_\alpha$ find out a circuit output (denoted by reference numeral 306 of FIG. 11) on the basis of the following data (Step 150 of FIG. 10).

$$G\Leftrightarrow_{[k]=G}{}^{\dagger}{}_{[k]}-\Sigma_{Y=1}{}^{\lambda}A^{\dagger\ddagger}{}_{[k]}$$

With respect to $k=1, \ldots, I$, if $G\Leftrightarrow_{[k]}=0$, $b\lceil k \rceil=0$, and if $G\Leftrightarrow_{[k]}=G$, $b\lceil k \rceil=1$.

[Separately Described Processes]

[Separate Description A]

With respect to all $k-1, \ldots, m+n$ and $b\in\{0,1\}$, the certifier (calculator) $u_\alpha$ uniquely and randomly generate the following data.

$$x^{\prime(\alpha)b}{}_{[k]\in R}Z\backslash qZ$$

$$z^{\prime(\alpha)}{}_{[k]\in R}Z\backslash qZ$$

$$Y^{\prime(\alpha)b}{}_{[k]\in}[x^{\prime(\alpha)b}{}_{[k]}]G$$

$$Z^{\prime(\alpha)}=[z^{\prime(\alpha)}]G$$

Further, the following data is generated.

$$\theta=\text{Hash}(E,G,\{Y^{\prime(\alpha)b}{}_{[k]}\}_{k=1,\ldots,m+n;b=0,1},$$
$$Z^{\prime(\alpha)}, [Y^{\prime(\alpha)b}{}_{[k]}]_{k=1\ldots m+n;b=0,1}, Z^{\prime(\alpha)})\bmod q$$

Then, with respect to all $k=1, \ldots, m+n$ and $b\in\{0,1\}$, the following data is generated.

$$x^{\prime\prime(\alpha)b}{}_{[k]}=\theta x^{(\alpha)b}{}_{[k]}+x^{\prime(\alpha)b}{}_{[k]} \bmod q$$

$$z^{\prime\prime(\alpha)}=\theta z^{(\alpha)}+z^{\prime(\alpha)} \bmod q$$

The certifier sets the following data as the proof with respect to all $k=1, \ldots, m+n$ and $b\in\{0,1\}$.

$$Y^{\prime(\alpha)b}{}_{[k]}, Z^{\prime(\alpha)}, z^{\prime\prime(\alpha)b}{}_{[k]}, z^{\prime\prime(\alpha)}$$

The verification method for the above-mentioned proof is as follows. The verifier calculates the first expression to check the second and third expressions described below.

$$\theta=\text{Hash}(E,G,\{Y^{(\alpha)b}{}_{[k]}\}_{k=1\ldots m+n;b=0,1},$$
$$Z^{(\alpha)}, [Y^{\prime(\alpha)b}{}_{[k]}]_{k=1,\ldots,m+n;b=0,1}, Z^{\prime(\alpha)})\bmod q$$

$$[x^{\prime\prime(\alpha)b}{}_{[k]}]G=[\theta]Y^{(\alpha)b}{}_{[k]}+Y^{\prime(\alpha)b}{}_{[k]}$$

$$[z^{\prime\prime(\alpha)}]G=\theta z^{(\alpha)}+Z^{\prime(\alpha)}$$

[Separate Description B]

Each certifier (calculator) $u^{(\alpha)}$ uniquely and randomly generates the following data with respect to all $k=m+1+\Sigma_{\beta=1}^{\alpha-1} I_\beta, \ldots, m+\Sigma_{\beta=1}^{\alpha} I_\beta$ for the selected $b\lceil k \rceil\in\{0,1\}$.

$$x^{-b[k]}{}_{[k]\in R}Z/qZ$$

Then, the following data is generated.

$$Y^{-b[]}{}_{[k]=[x}{}^{-b[k]}{}_{[k]]}G$$

Moreover, the following data is randomly generated.

$$\theta^{b[k]\square 1}{}_{[k]\in R}Z/qZ$$

$$x^{-b[k]\square 1}{}_{[k]\in R}Z/qZ$$

After that, the following data is randomly generated.

$$Y^{-b[k]\square 1}{}_{[k]}=[x^{-b[k]\square 1}{}_{[k]}]G-[\theta^{b[k]\square 1}{}_{[k]}]Y^{-b[k]\square 1}{}_{[k]}$$

The certifier $u_\alpha$ generates the following data with respect to all $k=m+1+\Sigma_{\beta=1}^{\alpha-1} I_\beta, \ldots, m+\Sigma_{\beta=1}^{\alpha} I_\beta$.

$$\theta_{[k]}=\text{Hash}(E,G, [Y^{-b}{}_{[k]}, Y^{-b}{}_{[k]}]b=0,1) \bmod q$$

$$\theta^{b[k]}{}_{[k]}=\theta_{[k]}-\theta^{b[k]\square 1}{}_{[k] \bmod q}$$

Furthermore the following data is generated.

$$x^{-b[k]}{}_{[k]}=\theta^{b[k]}{}_{[k]}x^{-b[k]}{}_{[k]}+x^{-b[k]}{}_{[k] \bmod q}$$

The certifier $u_\alpha$ sets the following data as the proof with respect to all $k=m+1+\Sigma_{=1}^{\alpha-1} I_\beta, \ldots, m+\Sigma_{\beta=1}^{\alpha} I_\beta, b=0,1$.

$$Y^{-b}{}_{[k]}, \theta^0{}_{[k]}, x^{-b}{}_{[k]}$$

The verification method for the above-mentioned proof is as follows.

With respect to all $k=m+1+\Sigma_{\beta=1}^{\alpha-1} I_\beta, \ldots, m+\Sigma_{\beta=1}^{\alpha} I_\beta$, $b=0,1$, the verifier generates the following data.

$$\theta_{[k]} = Hash(E,G,[Y^{-b}_{[k]}, Y^{-'b}_{[k]}]_{b=0,1}) \bmod q$$

$$\theta^1_{[k]} = \theta_{[k]} - \theta^0_{[k]} \bmod q$$

With respect to all $k=m+1+\Sigma_{\beta=1}^{\alpha-1} I_\beta, \ldots, m+\Sigma_{\beta=1}^{\alpha} I_\beta$, $b=0,1$ it is checked whether the following expressions are established.

$$[x^{-b}_{[k]}]G = [\theta^b_{[k]}]Y^{-b}_{[k]} + Y^{-'b}_{[k]}$$

$$Y^0_{[k]} + Y^{-1}_{[k]} = H$$

[Separate Description C]

The certifier (calculator) $u_\alpha$ uniquely and randomly generates the following data with respect to all $k=1, \ldots, m$ and all $\epsilon=0,1$.

$$r'^{(\alpha)\epsilon 0}_{[k]} \in Z/qZ$$

Then, the following data is generated.

$$F^{(\alpha)\epsilon 0}_{[k]} = [r'^{(\alpha)\epsilon 0}_{[k]}]G$$

$$F^{(\alpha)\epsilon 1}_{[k]} = [r'^{(\alpha)\epsilon 1}_{[k]}](Y^1_{[l]} - Y^0_{[l]})$$

$$F^{(\alpha)\epsilon 2}_{[k]} = [r'^{(\alpha)\epsilon 2}_{[k]}](Y^1_{[l]} - Y^0_{[l]})$$

Furthermore, the following data is generated.

$$\theta^{(\alpha)}_{[k]} = Hash(E,G,\{C^{(\alpha)bc\epsilon}_{[k]}, D^{(\alpha)bc\epsilon}_{[k]}\}_{k=1,\ldots,m;b,c,\epsilon=0,1}, \{F^{(\alpha)\epsilon 0}_{[k]}, F^{(\alpha)\epsilon 1}_{[k]}, F^{(\alpha)\epsilon 2}_{[k]}\}_{k=1,\ldots,m;\epsilon=0,1})$$

Next, the following data is generated.

$$r''^{(\alpha)\epsilon}_{[k]} = \theta^{(\alpha)}_{[k]} r^{(\alpha)\epsilon}_{[k]} + r'^{(\alpha)\epsilon}_{[k]} \bmod q$$

The certifier sets the following data as the proof for $k=1, \ldots, m$ and $\epsilon=0,1$.

$$F^{(\alpha)\epsilon 0}_{[k]}, F^{(\alpha)\epsilon 1}_{[k]}, F^{(\alpha)\epsilon 2}_{[k]}, r''^{(\alpha)\epsilon}_{[k]}$$

The verification method for the above-mentioned proof is as follows.

The verifier first checks whether the $C^{(\alpha)bc\epsilon}_{[k]}$ are the same value with respect to each of $\epsilon=0,1$ and $k=1, \ldots, m$ for all $b,c=0,1$.

Next, the following data is generated.

$$\theta^{(\alpha)}_{[k]} = Hash(E,G,[C^{(\alpha)bc\epsilon}_{[k]}, D^{(\alpha)bc\epsilon}_{[k]}]_{k=1,\ldots,m;b,c,\epsilon=0,1}, \{F^{(\alpha)\epsilon 0}_{[k]}, F^{(\alpha)\epsilon 1}_{[k]}, F^{(\alpha)\epsilon 2}_{[k]}\}_{k=1,\ldots,m;\epsilon=0,1})$$

Next, it is checked whether or not the following expressions are established with respect to all $k=1, \ldots, m$ and $\epsilon=0,1$.

$$[r''^{(\alpha)\epsilon}_{[k]}]G = [\theta^{(\alpha)}_{[k]}]C^{(\alpha)00\epsilon}_{[k]} + F^{(\alpha)\epsilon 0}_{[k]}$$

$$[r''^{(\alpha)\epsilon}_{[k]}](Y^1_{[l]} - Y^0_{[l]}) = [\theta^{(\alpha)}_{[k]}](D^{(\alpha)01\epsilon}_{[k]} - D^{(\alpha)00\epsilon}_{[k]}) + F^{(\alpha)\epsilon 2}_{[k]}$$

$$[r''^{(\alpha)\epsilon}_{[k]}](Y^1_{[l]} - Y^0_{[l]}) = [\theta^{(\alpha)}_{[k]}](D^{(\alpha)00\epsilon}_{[k]}) + F^{(\alpha)\epsilon 1}_{[k]}$$

[Separate Description D]

With respect to all $k=m+1, \ldots, m+n$ and all $b,\epsilon=0,1$, the certifier (calculator) $u\alpha$ uniquely and randomly generates $r'^{(\alpha)b}_{[k]} \in Z/qZ$. Then, the following data is generated.

$$F^{(\alpha)\epsilon 0}_{[k]} = [r'^{(\alpha)\epsilon}_{[k]}]G$$

$$F^{(\alpha)\epsilon 1}_{[k]} = [r'^{(\alpha)\epsilon}_{[k]}](Y^1_{[k]} - Y^0_{[k]})$$

Furthermore, with respect to all $k=m+1, \ldots, m+n$, the following data is generated.

$$\theta^{(\alpha)}_{[k]} = Hash(E,G,[C^{(\alpha)b\epsilon}_{[k]}, D^{(\alpha)b\epsilon}_{[k]}, F^{(\alpha)b\epsilon}_{[k]}]_{k=m+1,\ldots,m+n;b,\epsilon=0,1})$$

Next, with respect to all $k=m+1, \ldots, m+n$ and all $b,\epsilon=0,1$, the following data is generated.

$$r''^{(\alpha)\epsilon}_{[k]} = \theta^{(\alpha)}_{[k]} r^{(\alpha)\epsilon}_{[k]} + r'^{(\alpha)\epsilon}_{[k]} \bmod q$$

The certifier sets the following data as the proof with respect to $k=m+1, \ldots, m+n$ and $\epsilon=0,1$.

$$F^{(\alpha)\epsilon 0}_{[k]}, F^{(\alpha)\epsilon 1}_{[k]}, r''^{(\alpha)\epsilon}_{[k]}$$

The verification method for the abovementioned proof is as follows. First of all, the verifier checks whether or not the values of $C^{(\alpha)bc}_{[k]}$ are the same with respect to each of $\epsilon=0,1$ and $k=1, \ldots, m$ for all $b=0,1$ Next, the following data is generated.

$$\theta^{(\alpha)}_{[k]} = Hash(E,G,[C^{(\alpha)b\epsilon}_{[k]}, D^{(\alpha)b\epsilon}_{[k]}, F^{(\alpha)b\epsilon}_{[k]}]_{k=m+1,\ldots,m+n;b,\epsilon=0,1})$$

Then, it is checked whether or not the following expressions are established with respect to all $k=m+1, \ldots, m+n$ and all $\epsilon=0,1$.

$$[r''^{(\alpha)\epsilon}_{[k]}]G = [\theta^{(\alpha)}_{[k]}]C^{(\alpha)0\epsilon}_{[k]} + F^{(\alpha)\epsilon 0}_{[k]}$$

$$[r''^{(\alpha)\epsilon}_{[k]}](Y^{-1}_{[l]} - Y^0_{[l]}) = [\theta^{(\alpha)}_{[k]}](D^{(\alpha)1\epsilon}_{[k]} - D^{(\alpha)0\epsilon}_{[k]}) + F^{(\alpha)\epsilon 1}_{[k]}$$

[Separate Description E]

With respect to $\alpha=1, \ldots, \lambda$, the calculator $u_\alpha$ performs the following process in turn.

The calculator $u_\alpha$ performs uniquely and randomly selects the following data from $Z/qZ$.

$$[\sigma^{(\alpha-h)bc}_{[k]\mu,\nu,\xi}, \tau^{(\alpha-h)\beta bc}_{[k]\mu,\nu,\xi}] k=1\ldots,m; \beta=1,\ldots,\lambda; h=2/3,1/3,0; b,c,\mu,\nu,\xi \in [0,1]$$

wherein $$\Sigma_{h=0,1/3,2/3} \sigma^{(\alpha-h)bc}_{[k]\mu,\nu,\xi} = s^{(\alpha)bc}_{[k]\mu,\nu,\xi} \bmod q$$

$$\Sigma_{h=0,1/3,2/3} \tau^{(\alpha-h)\beta bc}_{[k]\mu,\nu,\xi} = t^{(\alpha)\beta bc}_{[k]\mu,\nu,\xi} \bmod q$$

The calculator $u_\alpha$ generates the following data with respect to all $k=1, \ldots, m$, and all $b, c, \mu, \nu, \xi \in \{0,1\}$.

$$A^{(\alpha-2/3)bc}_{[k]\mu,\nu,\xi} = A^{(\alpha-1)bc}_{[k]\mu \square \pi(i),\nu,\xi} + [\sigma^{(\alpha-2/3)bc}_{[k]\mu,\nu,\xi}]G$$

$$B^{(\alpha-2/3)bc}_{[k]\mu,\nu,\xi} = B^{(\alpha-1)bc}_{[k]\mu \square \pi(i),\nu,\xi} + [\sigma^{(\alpha-2/3)bc}_{[k]\mu,\nu,\xi}](Y^b_{[l]} + Y^c_{[l]} + Z)$$

$$C^{(\alpha-2/3)\beta bc}_{[k]\mu,\nu,\xi} = C^{(\alpha-1)\beta bc}_{[k]\mu \square \pi(i),\nu,\xi} + [\tau^{(\alpha-2/3)\beta bc}_{[k]\mu,\nu,\xi}]G$$

$$D^{(\alpha-2/3)\beta bc}_{[k]\mu,\nu,\xi} = D^{(\alpha-1)\beta bc}_{[k]\mu \square \pi(i),\nu,\xi} + [\tau^{(\alpha-2/3)\beta bc}_{[k]\mu,\nu,\xi}](Y^b_{[l]} + Y^c_{[l]} + Z)$$

$$A^{(\alpha-1/3)bc}_{[k]\mu,\nu,\xi} = A^{(\alpha-2/3)bc}_{[k]\mu,\nu \square \pi(j),\xi} + [\sigma^{(\alpha-1/3)bc}_{[k]\mu,\nu,\xi}]G$$

$$B^{(\alpha-1/3)bc}_{[k]\mu,\nu,\xi} = B^{(\alpha-2/3)bc}_{[k]\mu,\nu \square \pi(j),\xi} + [\sigma(\alpha-1/3)bc_{[k]\mu,\nu,\xi}](Y^b_{[l]} + Y^c_{[l]} + Z)$$

$$C^{(\alpha-1/3)\beta bc}_{[k]\mu,\nu,\xi} = C^{(\alpha-2/3)\beta bc}_{[k]\mu,\nu \square \pi(j),\xi} + [\tau^{(\alpha-1/3)\beta bc}_{[k]\mu,\nu,\xi}]G$$

$$D^{(\alpha-1/3)\beta bc}_{[k]\mu,\nu,\xi} = D^{(\alpha-2/3)\beta bc}_{[k]\mu,\nu \square \pi(j),\xi} + [\tau^{(\alpha-1/3)\beta bc}_{[k]\mu,\nu,\xi}](Y^b_{[l]} + Y^c_{[l]} + Z)$$

$$A^{(\alpha)bc}_{[k]\mu,\nu,\xi} = A^{(\alpha-1/3)bc}_{[k]\mu,\nu \square \pi(j),\xi} + [\sigma^{(\alpha)bc}_{[k]\mu,\nu,\xi}]G$$

$$B^{(\alpha)bc}_{[k]\mu,\nu,\xi} = B^{(\alpha-1/3)bc}_{[k]\mu,\nu \square \pi(j),\xi} + [\sigma^{(\alpha)bc}_{[k]\mu,\nu,\xi}](Y^b_{[l]} + Y^c_{[l]} + Z)$$

$$C^{(\alpha)\beta bc}{}_{[k]\mu,\nu,\xi} = C^{(\alpha-1/3)\beta bc}{}_{[k]\mu,\nu\square\pi(j),\xi} + [\tau^{(\alpha)\beta bc}{}_{[k]\mu,\nu,\xi}]G$$

$$D^{(\alpha)\beta bc}{}_{[k]\mu,\nu,\xi} = D^{(\alpha-1/3)\beta bc}{}_{[k]\mu,\nu\square\pi(j),\xi} + [\tau^{(\alpha)\beta bc}{}_{[k]\mu,\nu,\xi}](Y^b{}_{[i]} + Y^c{}_{[j]} + Z)$$

Next, the calculator $u_\alpha$ uniquely and randomly selects the following data from $Z/qZ$ with respect to all $k=1,\ldots,m$, all $\beta=1$, all $h=2/3, 1/3, 0$, and all $b, c, \mu,\nu,\xi\in\{0,1\}$.

$$\sigma''{}^{(\alpha-h)bc}{}_{[k]\mu,\nu,\xi}, \tau''{}^{(\alpha-h)\beta bc}{}_{[k]\mu,\nu,\xi}$$

Next, the calculator $U_\alpha$ generates the following data with respect to all $k=1,\ldots,m$, all $\beta=1$, and all $b,c,\mu,\nu,\xi\in\{0,1\}$.

$$A''{}^{(\alpha-2/3)bc}{}_{[k]\pi(i),\mu,\nu,\xi} = A^{(\alpha-1)bc}{}_{[k]\mu\square\pi(i),\nu,\xi} + [\sigma''{}^{(\alpha-2/3)bc}{}_{[k]\mu,\nu,\xi}]G$$

$$B''{}^{(\alpha-2/3)bc}{}_{[k]\pi(i),\mu,\nu,\xi} = B^{(\alpha-1)bc}{}_{[k]\mu\square\pi(i),\nu,\xi} + [\sigma''{}^{(\alpha-2/3)bc}{}_{[k]\mu,\nu,\xi}](Y^b{}_{[i]} + Y^c{}_{[j]} + Z)$$

$$C''{}^{(\alpha-2/3)\beta bc}{}_{[k]\pi(i),\mu,\nu,\xi} = C^{(\alpha-1)bc}{}_{[k]\mu\square\pi(i),\nu,\xi} + [\tau''{}^{(\alpha-2/3)\beta bc}{}_{[k]\mu,\nu,\xi}]G$$

$$D''{}^{(\alpha-2/3)\beta bc}{}_{[k]\pi(i),\mu,\nu,\xi} = D^{(\alpha-1)\beta bc}{}_{[k]\mu\square\pi(i),\nu,\xi} + [\tau''{}^{(\alpha-2/3)\beta bc}{}_{[k]\mu,\nu,\xi}](Y^b{}_{[i]} + Y^c{}_{[j]} + Z)$$

$$A''{}^{(\alpha-1/3)bc}{}_{[k]\pi(j),\mu,\nu,\xi} = A^{(\alpha-2/3)bc}{}_{[k]\mu,\nu\square\pi(j),\xi} + [\sigma''{}^{(\alpha-1/3)bc}{}_{[k]\mu,\nu,\xi}]G$$

$$B''{}^{(\alpha-1/3)bc}{}_{[k]\pi(j),\mu,\nu,\xi} = B^{(\alpha-2/3)bc}{}_{[k]\mu,\nu\square\pi(j),\xi} + [\sigma''{}^{(\alpha-1/3)bc}{}_{[k]\mu,\nu,\xi}](Y^b{}_{[i]} + Y^c{}_{[j]} + Z)$$

$$C''{}^{(\alpha-1/3)\beta bc}{}_{[k]\pi(i)\mu,\nu,\xi} = C^{(\alpha-2/3)\beta bc}{}_{[k]\mu,\nu\square\pi(j),\xi} + [\tau'{}^{(\alpha-1/3)\beta bc}{}_{[k]\mu,\nu,\xi}]G$$

$$D''{}^{(\alpha-1/3)\beta bc}{}_{[k]\pi(j)\mu,\nu,\xi} = D^{(\alpha-2/3)\beta bc}{}_{[k]\mu,\nu\square\pi(j),\xi} + [\tau''{}^{(\alpha-1/3)\beta bc}{}_{[k]\mu,\nu,\xi}](Y^b{}_{[i]} + Y^c{}_{[j]} + Z)$$

$$A''{}^{(\alpha)bc}{}_{[k]\pi(k)\mu,\nu,\xi} = A^{(\alpha-1/3)bc}{}_{[k]\mu,\nu\square\pi(j),\xi} + [\sigma''{}^{(\alpha)bc}{}_{[k]\mu,\nu,\xi}]G$$

$$B''{}^{(\alpha)bc}{}_{[k]\pi(k)\mu,\nu,\xi} = B^{(\alpha-1/3)bc}{}_{[k]\mu,\nu\square\pi(j),\xi} + [\sigma''{}^{(\alpha)bc}{}_{[k]\mu,\nu,\xi}](Y^b{}_{[i]} + Y^c{}_{[j]} + Z)$$

$$C''{}^{(\alpha)\beta bc}{}_{[k]\pi(k)\mu,\nu,\xi} = C^{(\alpha-1/3)\beta bc}{}_{[k]\mu,\nu\square\pi(j),\xi} + [\tau''{}^{(\alpha)\beta bc}{}_{[k]\mu,\nu,\xi}]G$$

$$D''{}^{(\alpha)\beta bc}{}_{[k]\pi(k)\mu nu,\xi} = D^{(\alpha-1/3)\beta bc}{}_{[k]\mu,\nu\square\pi(j),\xi} + [\tau''{}^{(\alpha)\beta bc}{}_{[k]\mu,\nu,\xi}](Y^b{}_{[i]} + Y^c{}_{[j]} + Z)$$

Furthermore, with respect to all $k=m+1,\ldots,m+n$, all $\beta=1,\ldots,\lambda$, and all $b, \xi\in\{0,1\}$, $s'{}^{(\alpha)b}{}_{(k)\xi}, t'{}^{(\alpha)b}{}_{[k]\xi}$ is uniquely and randomly selected from $Z/qZ$.

With respect to all $k=m+1,\ldots,m+n$ and all $b,\xi,\in\{0,1\}$, the following data is generated.

$$A''{}^{(\alpha)b}{}_{[k](k),\xi} = A^{(\alpha-1)b}{}_{[k]\xi\square\pi(k)} + [s'{}^{(\alpha)b}{}_{[k]\xi}]G$$

$$B''{}^{(\alpha)b}{}_{[k]\pi(k),\xi} = B^{(\alpha-1)b}{}_{[k]\xi\square\pi(k)} + [s'{}^{(\alpha)b}{}_{[k]\xi}](Y^{-b}{}_{[k]} + Z)$$

$$C''{}^{(\alpha)\beta b}{}_{[k]\pi(k)\xi} = C^{(\alpha-1)\beta b}{}_{[k]\xi\square\pi(k)} + [t'{}^{(\alpha)\beta b}{}_{[k]\xi}]G$$

$$D''{}^{(\alpha)\beta b}{}_{[k]\pi(k)\xi} = D^{(\alpha-1)\beta b}{}_{[k]\xi\square\pi(k)} + [t'{}^{(\alpha)\beta b}{}_{[k]\xi}](Y^{-b}{}_{[k]} + Z)$$

Then, the following data is uniquely and randomly selected from $Z/qZ$ with respect to all $k=1,\ldots,I$ and all $b, \xi\in\{0,1\}$.

$$s^{\dagger'(\alpha)b}{}_{[k]\xi}$$

With respect to all $k=1,\ldots,I$ and all $b,\xi\in[0,1]$ the following data is generated.

$$A^{\dagger'(\alpha)b}{}_{[k]\pi(k)\xi} = A^{\dagger(\alpha-1)b}{}_{[k]\xi\square\pi(k)} + [s^{\dagger'(\alpha)b}{}_{[k]\xi}]G$$

$$B^{\dagger'(\alpha)b}{}_{[k]\pi(k)\xi} = B^{\dagger(\alpha-1)b}{}_{[k]\xi\square\pi(k)} + [s^{\dagger'(\alpha)b}{}_{[k]\xi}](Y^b{}_{[k]} + Z)$$

With respect to all $k=1,\ldots,m$ and all $h=2/3, 1/3, 0$, the following data is uniquely and randomly selected from $Z/qZ$.

$$\theta^{(\alpha)}{}_{[k]\pi(i)\square 1}.$$

With respect to all $k=1,\ldots,m$, all $\beta=1,\ldots,\lambda$, and all $b,c,\mu,\nu,\xi\in[0,1]$, the following data is uniquely and randomly selected from $Z/qZ$.

$$\sigma'''{}^{(\alpha-2/3)bc}{}_{[k]\pi(i)\square 1,\mu,\nu,\xi}, \sigma'''{}^{(\alpha-1/3)b/c}{}_{[k]\pi(j)\square 1,\mu,\nu,\xi}, \sigma'''{}^{(\alpha)bc}{}_{[k]}$$

$$\pi(k)\square 1, \mu, \nu, \xi, \tau'''{}^{(\alpha-2/3)\beta bc}{}_{[k]\pi(i)\square 1,\mu,\nu,\xi}, \tau'''{}^{(\alpha-1/3)\beta bc}{}_{[k]}$$

$$\pi(j)\square 1, \mu, \nu, \xi, \tau'''{}^{(\alpha)\beta bc}{}_{[k]\pi(k)\square 1,\mu,\nu,\xi}$$

Next, with respect to all $k-m+1,\ldots,m+n$, all $\beta=1,\ldots,\lambda$, and all $b, \xi\in\{0,1\}$, the following data is uniquely and randomly selected from $Z/qZ$.

$$s'''{}^{(\alpha)b}{}_{[k]\pi(k)\square 1,\xi}, t'''{}^{(\alpha)\beta b}{}_{[k]\pi(k)\square 1,\xi}$$

Next, with respect to all $k=1,\ldots,I$ and all $b,\xi\in[0,1]$, the following data is uniquely and randomly selected from $Z/qZ$.

$$s^{\dagger'''(\alpha)b}{}_{[k]\pi(k)\square 1,\xi}, t^{\dagger'''(\alpha)b}{}_{[k]\pi(k)\square 1,\xi}$$

Next, with respect to all $k=1,\ldots,m$, all $\beta=1,\ldots,\lambda$, and all $b, c, \mu, \nu, \xi\in[0,1]$, the following data is generated.

$$A''{}^{(\alpha-2/3)bc}{}_{[k]\pi(i)\square 1,\mu,\nu,\xi} = [\sigma'''{}^{(\alpha-2/3)bc}{}_{[k]\pi(i)\square 1,\mu,\nu,\xi}]G - [\theta^{(\alpha)}{}_{[k]\pi(i)\square 1}]A^{(\alpha-1)bc}{}_{[k]\mu\square\pi(i),\nu,\xi}$$

$$B''{}^{(\alpha-2/3)bc}{}_{[k]\pi(i)\square 1,\mu,\nu,\xi} = [\sigma'''{}^{(\alpha-2/3)bc}{}_{[k]\pi(i)\square 1,\mu,\nu,\xi}](Y^b{}_{[i]} + Y^c{}_{[j]} + Z) - [\theta^{(\alpha)}{}_{[k]\pi(i)\square 1}]B^{(\alpha-1)bc}{}_{[k]\mu\square\pi(i),\nu,\xi}$$

$$C''{}^{(\alpha-2/3)\beta bc}{}_{[k]\pi(i)\square 1,\nu,\nu,\xi} = [\tau'''{}^{(\alpha-2/3)\beta bc}{}_{[k]\pi(i)\square 1,\mu,\nu,\xi}]G - [\theta^{(\alpha)}{}_{[k]\pi(i)\square 1}]C^{(\alpha-1)\beta bc}{}_{[k]\mu\square\pi(i),\nu,\xi}$$

$$D''{}^{(\alpha-2/3)\beta bc}{}_{[k]\pi(i)\square 1,\mu,\nu,\xi} = [\tau'''{}^{(\alpha-2/3)\beta bc}{}_{[k]\pi(i)\square 1,\mu,\nu,\xi}](Y^b{}_{[i]} + Y^c{}_{[j]} + Z) - [\theta^{(\alpha)}{}_{[k]\pi(i)\square 1}]D^{(\alpha-1)\beta bc}{}_{[k]\mu\square\pi(i),\nu,\xi}$$

$$A''{}^{(\alpha-1/3)bc}{}_{[k]\pi(j)\square 1,\mu,\nu,\xi} = [\sigma'''{}^{(\alpha-1/3)bc}{}_{[k]\pi(j)\square 1,\mu,\nu,\xi}]G - [\theta^{(\alpha)}{}_{[k]\pi(j)\square 1}]A^{(\alpha-2/3)bc}{}_{[k]\mu,\nu\square\pi(j),\xi}$$

$$B''{}^{(\alpha-1/3)bc}{}_{[k]\pi(j)\square 1,\mu,\nu,\xi} = [\sigma'''{}^{(\alpha-1/3)bc}{}_{[k]\pi(j)\square 1,\mu,\nu,\xi}](Y^b{}_{[i]} + Y^c{}_{[j]} + Z) - [\theta^{(\alpha)}{}_{[k]\pi(j)\square 1}]B^{(\alpha-2/3)bc}{}_{[k]\mu,\nu\square\pi(j),\xi}$$

$$C''{}^{(\alpha-1/3)\beta bc}{}_{[k]\pi(j)\square 1,\mu,\nu,\xi} = [\tau'''{}^{(\alpha-1/3)\beta bc}{}_{[k]\pi(j)\square 1,\mu,\nu,\xi}]G - [\theta^{(\alpha)}{}_{[k]\pi(j)\square 1}]C^{(\alpha-2/3)\beta bc}{}_{[k]\mu,\nu\square\pi(j),\xi}$$

$$D''{}^{(\alpha-1/3)\beta bc}{}_{[k]\pi(j)\square 1,\mu,\nu,\xi} = [\tau'''{}^{(\alpha-1/3)\beta bc}{}_{[k]\pi(j)\square 1,\mu,\nu,\xi}](Y^b{}_{[i]} + Y^c{}_{[j]} + Z) - [\theta^{(\alpha)}{}_{[k]\pi(j)\square 1}]D^{(\alpha-2/3)\beta bc}{}_{[k]\mu,\nu\square\pi(j),\xi}$$

$$A''{}^{(\alpha)bc}{}_{[k]\pi(k)\square 1,\mu,\nu,\xi} = [\sigma'''{}^{(\alpha)bc}{}_{[k]\pi(k)\square 1,\mu,\nu,\xi}]G - [\theta^{(\alpha)}{}_{[k]\pi(k)\square 1}]A^{(\alpha-1/3)bc}{}_{[k]\mu,\nu,\xi\square\pi(k)}$$

$$B''{}^{(\alpha)bc}{}_{[k]\pi(k)\square 1,\mu,\nu,\xi} = [\sigma'''{}^{(\alpha)bc}{}_{[k]\pi(k)\square 1,\mu,\nu,\xi}](Y^b{}_{[i]} + Y^c{}_{[j]} + Z) - [\theta^{(\alpha)}{}_{[k]\pi(k)\square 1}]B^{(\alpha-1/3)bc}{}_{[k]\mu,\nu,\xi\square\pi(k)}$$

$$C''{}^{(\alpha)\beta bc}{}_{[k]\pi(k)\square 1,\mu,\nu,\xi} = [\tau'''{}^{(\alpha)\beta bc}{}_{[k]\pi(k)\square 1,\mu,\nu,\xi}]G - [\theta^{(\alpha)}{}_{[k]\pi(k)\square 1}]C^{(\alpha-1/3)\beta bc}{}_{[k]\mu,\nu,\xi\square\pi(k)}$$

$$D''{}^{(\alpha)\beta bc}{}_{[k]\pi(k)\square 1,\mu,\nu,\xi} = [\tau'''{}^{(\alpha)\beta bc}{}_{[k]\pi(k)\square 1,\mu,\nu,\xi}](Y^b{}_{[i]} + Y^c{}_{[j]} + Z) - [\theta^{(\alpha)}{}_{[k]\pi(k)\square 1}]D^{(\alpha-1/3)\beta bc}{}_{[k]\mu,\nu,\xi\square\pi(k)}$$

Next, with respect to all $k=m+1,\ldots,m+n$, all $\beta=1,\ldots,\lambda$, and all $b,\xi\in[0,1]$, the following data is generated.

$$A''{}^{(\alpha)b}{}_{[k]\pi(i)\square 1,\xi} = [s'''{}^{(\alpha-1)b}{}_{[k]\pi(i)\square 1,\xi}]G - [\theta^{(\alpha)}{}_{[k]\pi(i)\square 1}]A^{(\alpha-1)b}{}_{[k]\pi(i)}$$

$$B''{}^{(\alpha)b}{}_{[k]\pi(i)\square 1,\xi} = [s'''{}^{(\alpha-1)b}{}_{[k]\pi(i)\square 1,\xi}](Y^b{}_{[k]} + Z) - [\theta^{(\alpha)}{}_{[k]\pi(i)\square 1}]B^{(\alpha-1)b}{}_{[k]\pi(i)}$$

$$C''{}^{(\alpha)\beta b}{}_{[k]\pi(i)\square 1,\xi} = [t'''{}^{(\alpha-1)\beta b}{}_{[k]\pi(i)\square 1,\xi}]G - [\theta^{(\alpha)}{}_{[k]\pi(i)\square 1}]C^{(\alpha-1)\beta b}{}_{[k]\xi\square\pi(i)}$$

$$D''{}^{(\alpha)\beta b}{}_{[k]\pi(i)\square 1,\xi} = [t'''{}^{(\alpha-1)\beta b}{}_{[k]\pi(i)\square 1,\xi}](Y^b{}_{[k]} + Z) - [\theta^{(\alpha)}{}_{[k]\pi(i)\square 1}]D^{(\alpha-1)\beta b}{}_{[k]\xi\square\pi(i)}$$

Next, with respect to all k=1, . . . ,I and all b,ξ∈[0,1] the following data is generated.

$$A^{\dagger''(\alpha)b}_{[k]\pi(i)\pi(i)\square 1,\xi} = [\dagger''^{(\alpha-1)b}_{[k]\pi(i)\square 1,\xi}]G - [\theta^{(\alpha)}_{[k]\pi(i)\square 1}]A^{\dagger(\alpha-1)b}_{[k]\xi\square\pi(i)}$$

$$B^{\dagger''(\alpha)b}_{[k]\pi(i)\square 1,\xi} = [s^{\dagger''(\alpha-1)b}_{[k]\pi(i)\square 1,\xi}](Y^b_{[k]}+Z) - [\theta^{(\alpha)}_{[k]\pi(i)\square 1}]B^{\dagger(\alpha-1)b}_{[k]\xi\square\pi(i)}$$

Next, the following data is generated.

$S=\{E,G,$ $\{A^{(\alpha-h)bc}_{[k]\mu,v,\xi}, B^{(\alpha-h)bc}_{[k]\mu,v,\xi}, C^{(\alpha-h)\beta bc}_{[k]\mu,v,\xi}, D^{(\alpha-h)\beta bc}_{[k]\mu,v,\xi},$
$A''^{(\alpha-h)bc}_{[k]\zeta,\mu,v,\xi}, B''^{(\alpha-h)bc}_{[k]\zeta,\mu,v,\xi}, C''^{(\alpha-h)\beta bc}_{[k]\zeta,\mu,v,\xi}, D''^{(\alpha-h)\beta bc}_{[k]\zeta,\mu,v,\xi}$
$k=1,\ldots,m; h=2/3,1/3,0; \beta=1,\ldots,\lambda; b,c,\mu,v,\xi,\zeta \in \{0,1\}\}.$ $\{A^{(\alpha)b}_{[k]\xi}, B^{(\alpha)b}_{[k]\xi}, C^{(\alpha)\beta b}_{[k]\xi}, D^{(\alpha)\beta b}_{[k]\xi},$
$A''^{(\alpha)b}_{[k]\zeta,\xi}, B''^{(\alpha)b}_{[k]\zeta,\xi}, C''^{(\alpha)\beta b}_{[k]\zeta,\xi}, D''^{(\alpha)\beta b}_{[k]\zeta,\xi}\cdot k=$
$m+1,\ldots,m+n;\beta=1,\ldots,\lambda; b,\xi,\zeta \in\{0,1\}\}$ $\{A^{\dagger(\alpha)b}_{[k]\xi}, B^{\dagger(\alpha)b}_{[k]\xi},$
$A^{\dagger''(\alpha)b}_{[k]\zeta,\xi}, B^{\dagger''(\alpha)b}_{[k]\zeta,\xi}\cdot k=$
$1,\ldots,l; b,\xi,\zeta \in\{0,1\}\}$ Next, each verifier uα generates the following data with respect to all k=1, . . . ,m+n.

$\theta^{(\alpha)}_{[k]}=Hash(E,G,k,S)$

Next, with respect to all k=1, . . . ,m+n, the following data is generated.

$\theta^{(\alpha)}_{[k]\pi(i)}=\theta^{(\alpha)}_{[k]\pi\pi(i)\square 1}$

Next, with respect to all k=1, . . . ,m, all β=1, . . . ,λ, all h=⅔, ⅓, 0, and all b,c,μ,v,ξ∈{0,1}, the following data is generated.

$$\sigma'''^{(\alpha-h)bc}_{[k]\pi(i),\mu,v,\xi} = \theta^{(\alpha)}_{[k]\pi(i)}\sigma^{(\alpha-2/3)bc}_{[k]\mu,v,\xi} + \sigma^{(\alpha-2/3)bc}_{[k]\mu,v,\xi} \bmod q$$

$$\tau'''^{(\alpha-h\beta bc}_{[k]\pi(i),\mu,v,\xi} = \theta^{(\alpha)}_{[k]\pi(i)}\tau^{(\alpha-2/3)\beta bc}_{[k]\mu,v,\xi} + \tau^{(\alpha-2/3)\beta bc}_{[k]\mu,v,\xi} \bmod q$$

Next, with respect to all k=m+1, . . . ,m+n, all β=1, . . . ,λ, and all b, ξ∈[0,1], the following data is generated.

$$s'''^{(\alpha)b}_{[k]\pi(i)\xi} = \theta^{(\alpha)}_{[k]\pi(i)}s^{(\alpha-1)b}_{[k]\xi} + s''^{(\alpha-1)b}_{[k]\xi} \bmod q$$

$$t'''^{(\alpha)\beta b}_{[k]\pi(i)\xi} = \theta^{(\alpha)}_{[k]\pi(i)}t^{(\alpha-1)\beta b}_{[k]\xi} + t''^{(\alpha-1)b}_{[k]\xi} \bmod q$$

Next, with respect to all k=1, . . . ,I and b, ξ∈[0,1], the following data is generated.

$$s^{\dagger'''(\alpha)b}_{[k]\pi(i)\xi} = \theta^{(\alpha)}_{[k](i)}s^{\dagger(\alpha-1)b}_{[k]\xi} + s^{\dagger''(\alpha-1)b}_{[k]\xi} \bmod q$$

Finally, the following data is set as proofs.

$A^{(\alpha-h)bc}_{[k]\mu,v,\xi}, B^{(\alpha-h)bc}_{[k]\mu,v,\xi}, C^{(\alpha-h)\beta bc}_{[k]\mu,v,\xi},$
$D^{(\alpha-h)\beta bc}_{[k]\mu,v,\xi}.$ $A''^{(\alpha-h)bc}_{[k]\xi,\mu,v,\xi}, B''^{(\alpha-h)bc}_{[k]\xi,\mu,v,\xi}, C''^{(\alpha-h)\beta bc}_{[k]\xi,\mu,v,\xi},$
$D''^{(\alpha-h)\beta bc}_{[k]\xi,\mu,v,\xi}.$ $\sigma'''^{(\alpha)b}_{[k]\xi,\xi}, \tau'''^{(\alpha)\beta b}_{[k]\xi,\xi}.$ $A^{(\alpha)b}_{[k]\xi}, B^{(\alpha)b}_{[k]\xi}, C^{(\alpha)\beta b}_{[k]\xi}, D^{(\alpha)\beta b}_{[k]\xi},$ $A''^{(\alpha)b}_{[k]\zeta,\xi}, B''^{(\alpha)b}_{[k]\zeta,\xi}, C''^{(\alpha)\beta b}_{[k]\zeta,\xi}, D''^{(\alpha)\beta b}_{[k]\zeta,\iota},$ $s'''^{(\alpha-h)bc}_{[k]\xi,\mu,v,\xi}, t'''^{(\alpha-h)\beta b}_{[k]\xi,\mu,v,\xi},$ with respect to all k=m+1, . . . ,m+n; β=1, . . . ,λ; b, ξ, ζ∈[0,1].

$A^{\dagger(\alpha)b}_{[k]\xi}, B^{\dagger(\alpha)b}_{[k]\xi}$ $A^{\dagger''(\alpha)b}_{[k]\zeta,\xi}, B^{\dagger''(\alpha)b}_{[k]\zeta,\xi}$ $s^{\dagger'''(\alpha-h)bc}_{[k]\zeta,\mu,v,\xi}$ with respect to all k=1, . . . ,I;b, ξ, ζ∈[0,1].

$\theta^{(\alpha)}_{[k]\zeta}$ with respect to all k=1, . . . ,m+n

The verification method for the above-mentioned proof is as follows.

The verifier generates the following data.

$S=[E,G,$ $\{A^{(\alpha-h)bc}_{[k]\mu,v,\xi}, B^{(\alpha-h)bc}_{[k]\mu,v,\xi}, C^{(\alpha-h)\beta bc}_{[k]\mu,v,\xi}, D^{(\alpha-h)\beta bc}_{[k]\mu,v,\xi},$
$A''^{(\alpha-h)bc}_{[k]\zeta,\mu,v,\xi}, B''^{(\alpha-h)bc}_{[k]\zeta,\mu,v,\xi}, C''^{(\alpha-h)\beta bc}_{[k]\zeta,\mu,v,\xi}, D''^{(\alpha-h)\beta bc}_{[k]\zeta,\mu,v,\xi}$
$]k=1,\ldots,m; h=2/3,1/3,0; \beta=1,\ldots,\lambda; b,c,\mu,v,\xi,\zeta \in\{0,1\}\}.$ $\{A^{(\alpha)b}_{[k]\xi}, B^{(\alpha)b}_{[k]\xi}, C^{(\alpha)\beta b}_{[k]\xi}, D^{(\alpha)\beta b}_{[k]\xi},$
$A''^{(\alpha)b}_{[k]\zeta,\xi}, B''^{(\alpha)b}_{[k]\zeta,\xi}, C''^{(\alpha)\beta b}_{[k]\zeta,\xi}, D''^{(\alpha)\beta b}_{[k]\zeta,\xi}\cdot k=$
$m+1,\ldots,m+n;\beta=1,\ldots,\lambda; b,\xi,\zeta\in\{0,1\}\}$ $\{A^{\dagger(\alpha)b}_{[k]\xi}, B^{\dagger(\alpha)b}_{[k]\xi}$
$A^{\dagger''(\alpha)b}_{[k]\zeta,\xi}, B^{\dagger''(\alpha)b}_{[k]\zeta,\xi}\cdot k=$
$1,\ldots,l; b,\xi,\zeta\in\{0,1\}\}$ Each verifier uα generates the following data with respect to all k=1, . . . ,m+n.

$\theta^{(\alpha)}_{[k]}=Hash(E,G,k,S)$

It is checked whether or not the following expression is established with respect to all k=1, . . . ,m.

$\theta^{(\alpha)}_{[k]0}+\theta^{(\alpha)}_{[k]1}=\theta^{(\alpha)}_{[k]}$

Next, with respect to k=1, . . . ,m;h=⅔,⅓,0;β=1, . . . ,λ;b,c, μ, v, ξ, ζ∈[0,1],
the verifier checks whether the following expressions are established.

$[\sigma'''^{(\alpha-2/3)bc}_{[k]\zeta,\mu,v,\xi}]G=[\theta^{(\alpha)}_{[k]\zeta}]$
$(A^{(\alpha-2/3)bc}_{[k]\mu,v,\xi}-A^{(\alpha-1)bc}_{[k]\mu\square\zeta,v,\xi})-$
$A''^{(\alpha-2/3)bc}_{[k]\zeta,\mu,v,\xi}$ $[\sigma'''^{(\alpha-2/3)bc}_{[k]\zeta,\mu,v,\xi}](Y^b_{[l]}+Y^c_{[J]}+Z)=[\theta^{(\alpha)}_{[k]\zeta}]$
$(B^{\alpha-2/3bc}_{[k]\mu,v,\xi}-B^{(\alpha-1)bc}_{[k]\mu\square\zeta,v,\xi})-$
$B^{(\alpha-2/3)bc}_{[k]\zeta,\mu,v,\xi}$ $[\tau'''^{(\alpha-2/3)\beta bc}_{[k]\zeta,\mu,v,\xi}]G=[\theta^{(\alpha)}_{[k]\zeta}](C^{(\alpha-2/3)bc}_{[k]\mu,v,\xi}-$
$C^{(\alpha-1)\beta bc}_{[k]\mu\square\zeta,v,\xi})-C^{(\alpha-2/3)bc}_{[k]\zeta,\mu,v,\xi}$ $[\gamma'''^{(\alpha-2/3)\beta bc}_{[k]\zeta,\mu,v,\xi}](Y^b_{[l]}+Y^c_{[J]}+Z)=[\theta^{(\alpha)}_{[k]\zeta}](D^{(\alpha-2/3)}$
$\beta bc_{[k]\mu,v,\xi}-D^{(\alpha-1)\beta bc}_{[k]\mu\square\zeta,v,\xi})-$
$D''^{(\alpha-2/3)\beta bc}_{[k]\zeta,\mu,v,\xi}$ $[\sigma'''^{(\alpha-1/3)bc}_{[k]\zeta,\mu,v,\xi}]G=[\theta^{(\alpha)}_{[k]\zeta}](A^{(\alpha-1/3)bc}_{[k]\mu,v,\xi}-A$
$(\alpha-2/3)bc_{[k]\mu\square\zeta,v,\xi})-A''^{(\alpha-1/3)bc}_{[k]\zeta,\mu,v,\xi}$ $[\sigma'''^{(\alpha-1/3)bc}_{[k]\zeta,\mu,v,\xi}](Y^b_{[l]}+Y^c_{[J]}+Z)=[\theta^{(\alpha)}_{[k]\zeta}]$
$(B^{\alpha-2/3bc}_{[k]\mu,v,\xi}-B^{(\alpha-2/3)bc}_{[k]\mu\square\zeta,v,\xi})-$
$B''^{(\alpha-1/3)bc}_{[k]\zeta,\mu,v,\xi}$ $[\tau'''^{(\alpha-1/3)\beta bc}_{[k]\zeta,\mu,v,\xi}]G=[\theta^{(\alpha)}_{[k]\zeta}](C^{(\alpha-1/3)\beta bc}_{[k]\mu,v,\xi}-$
$C^{(\alpha-2/3)\beta bc}_{[k]\mu\square\zeta,v,\xi})-C''^{(\alpha-1/3)\beta bc}_{[k]\zeta,\mu,v,\xi}$ $[\tau'''^{(\alpha-1/3)\beta bc}_{[k]\zeta,\mu,v,\xi}](Y^b_{[l]}+Y^c_{[J]}+Z)=[\theta^{(\alpha)}_{[k]\zeta}]$
$(D^{\alpha-1/3\beta bc}_{[k]\zeta,\mu,v,\xi})$ $[\sigma'''^{(\alpha)bc}_{[k]\zeta,\mu,v,\xi}]G=[\theta^{(\alpha)}_{[k]\zeta}]$
$(A^{(\alpha)bc}_{[k]\zeta,v,\xi}-A^{(\alpha-1/3)bc}_{[k]\mu\square\zeta,v,\xi})-A''^{(\alpha)bc}_{[k]\zeta,\mu,v\xi}$ $[\sigma'''^{(\alpha)bc}_{[k]\zeta,\mu,v,\xi}](Y^b_{[l]}+Y^c_{[J]}+Z)=[\theta^{(\alpha)}_{[k]\zeta}]$
$(B^{(\alpha-1/3)bc}_{[k]\mu,v,\xi}-B^{(\alpha-2/3)bc}_{[k]\mu\square\zeta,v,\xi})-$
$B''^{(\alpha)bc}_{[k]\zeta,\mu,v,\xi}$ $[\tau'''^{(\alpha)\beta bc}_{[k]\zeta,\mu,v,\xi}]G=[\theta^{(\alpha)}_{[k]\zeta}]$
$(C^{(\alpha)\beta bc}_{[k]\mu,v,\xi}-C^{(\alpha-1/3)\beta bc}_{[k]\mu\square\zeta,v,\xi})-$
$C^{(\alpha)\beta bc}_{[k]\zeta,\mu,v,\xi}$ $[\tau'''^{(\alpha)\beta bc}_{[k]\zeta,\mu,v,\xi}](Y^b_{[l]}+Y^c_{[J]}+Z)=[\theta^{(\alpha)}_{[k]\zeta}]$
$(D^{(\alpha)\beta bc}_{[k]\mu,v,\xi}-D^{(\alpha-1/3)\beta bc}_{[k]\mu\square\zeta,v,\xi})-$
$D''^{(\alpha)\beta bc}_{[k]\zeta,\mu,v,\xi}$ Next, with respect to k=m+1, . . . m+n; β=1, . . . , λ; b, ξ, ζ∈{0,1}, the verifier checks whether or not the following expressions are established.

$$[s'''^{(\alpha)b}_{[k]\bar{\zeta},\xi}]G=[\theta^{(\alpha)}_{[k]\bar{\zeta}}](A^{(\alpha)b}_{[k]\xi}-A^{(\alpha-1)b}_{[k]\xi\square\bar{\zeta}})-A^{(\alpha)b}_{[k]\bar{\zeta},\xi}$$

$$[s'''^{(\alpha)b}_{[k]\bar{\zeta},\xi}](Y^{-b}_{[k]}+Z)=[\theta^{(\alpha)}_{[k]\bar{\zeta}}](B^{(\alpha)b}_{[k]\xi}-B^{(\alpha-1)b}_{[k]\xi\square\bar{\zeta}})-B^{(\alpha)b}_{[k]\bar{\zeta},\xi}$$

$$[t'''^{(\alpha)\beta b}_{[k]\bar{\zeta},\xi}]G=[\theta^{(\alpha)}_{[k]\bar{\zeta}}](C^{(\alpha)\beta b}_{[k]\xi}-C^{(\alpha-1)\beta b}_{[k]\xi\square\bar{\zeta}})-C^{(\alpha)\beta b}_{[k]\bar{\zeta},\xi}$$

$$[t'''^{(\alpha)\beta b}_{[k]\bar{\zeta},\xi}](Y^{-b}_{[k]}+Z)=[\theta^{(\alpha)}_{[k]\bar{\zeta}}](D^{(\alpha)\beta b}_{[k]\xi}-D^{(\alpha-1)\beta b}_{[k]\xi\square\bar{\zeta}})-D^{(\alpha)\beta b}_{[k]\bar{\zeta},\xi}$$

Next, with respect to $k=1,\ldots,I$; $b,\xi,\zeta\in\{0,1\}$, the verifier checks whether or not the following expressions are established.

$$[s^{\dagger'''(\alpha)b}_{[k]\bar{\zeta},\xi}]G=[\theta^{(\alpha)}_{[k]\bar{\zeta}}](A^{\dagger(\alpha)b}_{[k]\xi}-A^{\dagger(\alpha-1)b}_{[k]\xi\square\bar{\zeta}})-A^{\dagger(\alpha)b}_{[k]\bar{\zeta},\xi}$$

$$[s^{\dagger'''(\alpha)b}_{[k]\bar{\zeta},\xi}](Y^b_{[k]}+Z)=[\theta^{(\alpha)}_{[k]\bar{\zeta}}](B^{\dagger(\alpha)b}_{[k]\xi}-B^{\dagger(\alpha-1)b}_{[k]\xi\square\bar{\zeta}})-B^{\dagger(\alpha)b}_{[k]\bar{\zeta},\xi}$$

[Separate Description F]

Regarding the certifier (calculator), with respect to all $k=1,\ldots,m+n$ and all $b,c\in\{0,1\}$, all the certifiers (calculators) $[u_\alpha]_{\alpha=1,\ldots,\lambda}$ uniquely and randomly generate $Z'^{(\alpha)}\in_R Z/qZ$ and generate $Z'^{(\alpha)}=[z'^{(\alpha)}]G$. With respect to all $k=1,\ldots,m$, all $b,c\in\{0,1\}$, and all $\beta=1,\ldots,\lambda$, the following date is generated.

$$A'^{(\lambda)\alpha bc}_{[k]000}=[z'^{(\alpha)}]A^{(\lambda)bc}_{[k]000}$$

$$C'^{(\lambda)\alpha\beta bc}_{[k]000}=[z'^{(\alpha)}]C^{(\lambda)\alpha bc}_{[k]000}$$

With respect to all $k=m+1,\ldots,m+n$, all $b\in\{0,1\}$, and all $\beta=1,\ldots,\lambda$, the following date is generated, $$A'^{(\lambda)\alpha b}_{[k]0}=[z'^{(\alpha)}]A^{(\lambda)b}_{[k]0}$$

$$C'^{(\lambda)\alpha\beta b}_{[k]0}=[z'^{(\alpha)}]C^{(\lambda)\alpha b}_{[k]0}$$

With respect to all $k=1,\ldots,I$ and all $b\in\{0,1\}$, the following date is generated.

$$A^{\dagger'(\lambda)\alpha b}_{[k]0}=[z'^{(\alpha)}]A^{\dagger(\lambda)b}_{[k]0}$$

Then, the following date is generated.

$$S=\{[A^{(\lambda)bc}_{[k]000}\cdot C^{(\lambda)\beta bc}_{[k]000'}\}_{k=1,\ldots,m;b,c=0,1;\beta=1,\ldots,\lambda'}$$

$$\{A^{(\lambda)b}_{[k]0}\cdot C^{(\lambda)\beta b}_{[k]0}\}_{k=m+1,\ldots,m+n;b=0,1;\beta=1,\ldots,\lambda'}$$

$$\{A^{\dagger(\lambda)b}_{[k]0}\}_{k=1,\ldots,I;b=0,1'}$$

$$\{A^{\ddagger(\lambda)\alpha bc}_{[k]000}\cdot C^{\ddagger(\lambda)\alpha\beta bc}_{[k]000}\}_{k=1,\ldots,m;b,c0,1;\beta=1,\ldots,\lambda'}$$

$$\{A^{\ddagger(\lambda)\alpha b}_{[k]0}\cdot C^{\ddagger(\lambda)\alpha beta\, b}_{[k]0k=m+1,\ldots,m+n;b=0,1;\beta=1,\ldots,\lambda'}$$

$$[A^{\dagger\ddagger(\lambda)\alpha b}_{[k]0}]_{k=1,\ldots,I;b=0,1'}$$

$$[Z'^{(\alpha)}],$$

$$\{A'^{(\lambda)\alpha bc}_{[k]000}\cdot C'^{(\lambda)\alpha\beta bc}_{[k]000}\}_{k=1,\ldots,m;b,c=0,1;\beta=1,\ldots,\lambda'}$$

$$\{A'^{(\lambda)\alpha b}_{[k]0}\cdot C'^{(\lambda)\alpha\beta b}_{[k]0}\}_{k=m+1,\ldots,m+n;b=0,1;\beta=1,\ldots,\lambda'}$$

$$\{A^{\dagger'(\lambda)\alpha b}_{[k]0}\}_{k=1,\ldots,I;b=0,1'}\}$$

Furthermore, the following date is generated.

$$\theta=\text{Hash}(E,G,S)\bmod q$$

In addition, the following date is generated.

$$z'^{(\alpha)}=z^{(\alpha)}\theta+z'^{(\alpha)}\bmod q$$

The certifier sets the following data as the proof.

$$Z'^{(\alpha)},[A'^{(\lambda)\alpha bc}_{[k]000}\cdot C^{(\lambda)\alpha\beta bc}_{[k]000}]_{k=1,\ldots,m;b,c=0,1;\beta=1,\ldots,\lambda'}$$

$$[A'^{(\lambda)\alpha b}_{[k]0'}C'^{(\lambda)\alpha\beta b}_{[k]0}]_{k=m+1,\ldots,m+n;b=0,1;\beta=1,\ldots,\lambda'}$$

$$[A^{\dagger'(\lambda)\alpha b}_{[k]0}]_{k=1,\ldots,I;b=0,1'}$$

$$z''^{(\alpha)}$$

The verification method for the above-mentioned proof is as follows. The verifier generates the following data.

$$S=\{[A^{(\lambda)bc}_{[k]000}\cdot C^{(\lambda)\beta bc}_{[k]000'}]_{k=1,\ldots,m;b,c=0,1;\beta=1,\ldots,\lambda'}$$

$$[A^{(\lambda)b}_{[k]0}\cdot C^{(\lambda)\beta b}_{[k]0}]_{k=m+1,\ldots,m+n;b=0,1;\beta=1,\ldots,\lambda'}$$

$$[A^{\dagger(\lambda)b}_{[k]0}]_{k=1,\ldots,I;b=0,1'}$$

$$[A^{\ddagger(\lambda)\alpha bc}_{[k]000}\cdot C^{\ddagger(\lambda)\alpha\beta bc}_{[k]000}]_{k=1,\ldots,m;b,c=0,1;\beta=1,\ldots,\lambda'}$$

$$[A^{\ddagger(\lambda)\alpha b}_{[k]0}\cdot C^{\ddagger(\lambda)\alpha\beta b}_{[k]0}]_{k=m+1,\ldots,m+n;b=0,1;\beta=1,\ldots,\lambda'}$$

$$[A^{\dagger\ddagger(\lambda)\alpha b}_{[k]0}]_{k=1,\ldots,I;b=0,1'}$$

$$[Z'^{(\alpha)}],$$

$$[A'^{(\lambda)\alpha bc}_{[k]000}\cdot C'^{(\lambda)\alpha\beta bc}_{[k]000}]_{k=1,\ldots,m;b,c=0,1;\beta=1,\ldots,\lambda'}$$

$$[A'^{(\lambda)\alpha b}_{[k]0}\cdot C'^{(\lambda)\alpha\beta b}_{[k]0}]_{k=m+1,\ldots,m+n;b=0,1;\beta=1,\ldots,\lambda'}$$

$$[A^{\dagger'(\lambda)\alpha b}_{[k]0}]_{k=1,\ldots,I;b=0,1'}\}$$

Then, $\theta=\text{Hash}(E,G,S)\bmod q$ is calculated to obtain the following expression.

$$[z''^{(\alpha)}]G=Z'^{(\alpha)}+[\theta]Z^{(\alpha)}$$

After that, the following expressions are checked. With respect to all $k=1,\ldots,m$, $b,c\in[0,1]$, $\beta=1,\ldots,\lambda$, $$[z''^{(\alpha)}]A^{(\lambda)bc}_{[k]000}=A'^{(\lambda)\alpha bc}_{[k]000}+[\theta]A^{\ddagger(\lambda)\alpha bc}_{[k]000}$$

$$[z''^{(\alpha)}]C^{(\lambda)\beta bc}_{[k]000}=C'^{(\lambda)\alpha\beta bc}_{[k]000}+[\theta]C^{\ddagger(\lambda)\alpha\beta bc}_{[k]000}$$

With respect to all $k=m+1,\ldots,m+n$, $b\in[0,1]$, $\beta=1,\ldots,\lambda$, $$[z''^{(\alpha)}]A^{(\lambda)b}_{[k]0}=A'^{(\lambda)\alpha b}_{[k]0}+[\theta]A^{\ddagger(\lambda)\alpha b}_{[k]0}$$

$$[z''^{(\alpha)}]C^{(\lambda)\beta b}_{[k]0}=C'(\lambda)\alpha\beta b_{[k]0}+[\theta]C^{\ddagger(\lambda)\alpha\beta b}_{[k]0}$$

With respect to all $k-1,\ldots I$, $b\in[0,1]$, $$[z''^{(\alpha)}]A^{\dagger(\lambda)b}_{[k]0}=A^{\dagger'(\lambda)\alpha b}_{[k]0}+[\theta]A^{\dagger\ddagger(\lambda)\alpha b}_{[k]0}$$

[Separate Description G]

The calculator $u^{(\alpha)}$ uniquely and randomly generates $z'^{(\alpha)}\in_R Z/qZ$ and generates $A^{\dagger'}_{[k]}=[z'^{(\alpha)}]A^{\dagger b[k]}_{[k]}$ with respect to $k=1,\ldots,I$. The certifier generates the following data.

$$S=[[A^{\dagger b[k]}_{[k]}]_{k=1,\ldots,I'}$$

$$[A^{\dagger\ddagger}_{[k]}]_{k=1,\ldots,I'}$$

$$[A^{\dagger'}_{[k]}]_{k=1,\ldots,I}]$$

Then, the certifier generates the following data.

$$\theta=\text{Hash}(E,G,S)\bmod q$$

The certifier generates the following data.

$$z''^{(\alpha)}=\theta z^{(\alpha)}+z'^{(\alpha)}\bmod q$$

The certifier sets the following data as the proof.

$$[A^{\dagger\ddagger}_{[k]}]_{k=1,\ldots,I'}z''^{(\alpha)}$$

The verification method for the above-mentioned proof is as follows. The certifier generates the following data.

$$S = [[A^{\dagger b[k]}{}_{[k]}]_{k=1,\ldots,I'}$$

$$[A^{\dagger\ddagger}{}_{[k]}]_{k=1,\ldots,I'}$$

$$[A^{\dagger}{}_{[k]}]_{k=1,\ldots,I}]$$

The certifier generates the following data.

$$\theta = \text{Hash}(E, G, S) \bmod q$$

When the certifier confirms the following data, the certifier receives the proof.

$$[z^{\prime\prime(\alpha)}]^{\dagger b[k]}{}_{[k]} = A^{\dagger}{}_{[k]} + [\theta] A^{\dagger\ddagger}{}_{[k]}$$

Second Embodiment

A second embodiment of the present invention will be described with reference to FIGS. 14 to 18.

Figure 14:
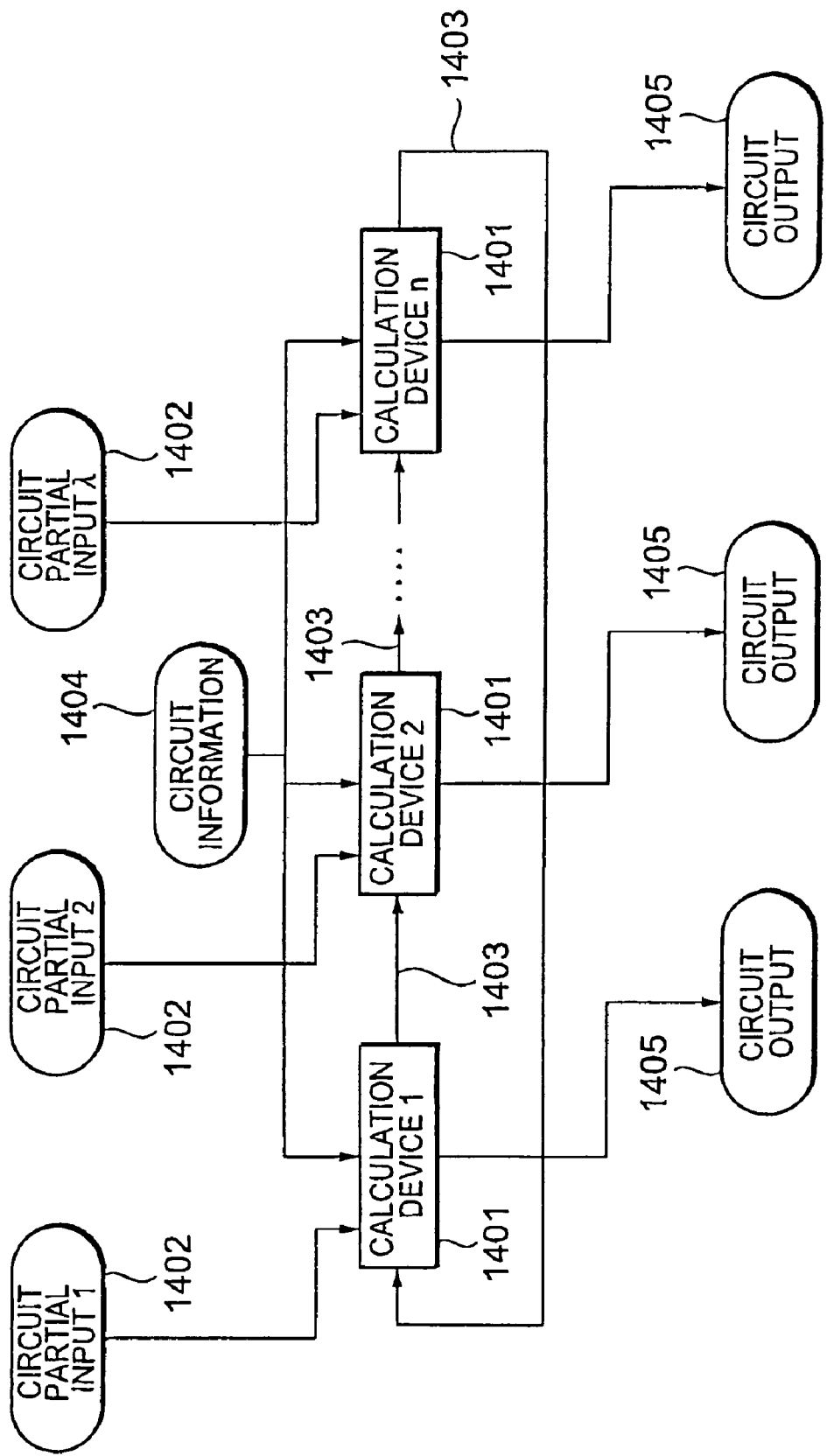
FIG. 14 is a block diagram showing a relation among devices according to a second invention.

In this embodiment, as shown in FIG. 14, each of N calculation devices 1401 has a calculation device 1403. Hereinafter, these calculation devices are referred to as U1, ..., UN in order. For the sake of notation, UN is also referred to as U0.

[Method Outline]
[Data Flow]

Figure 16:
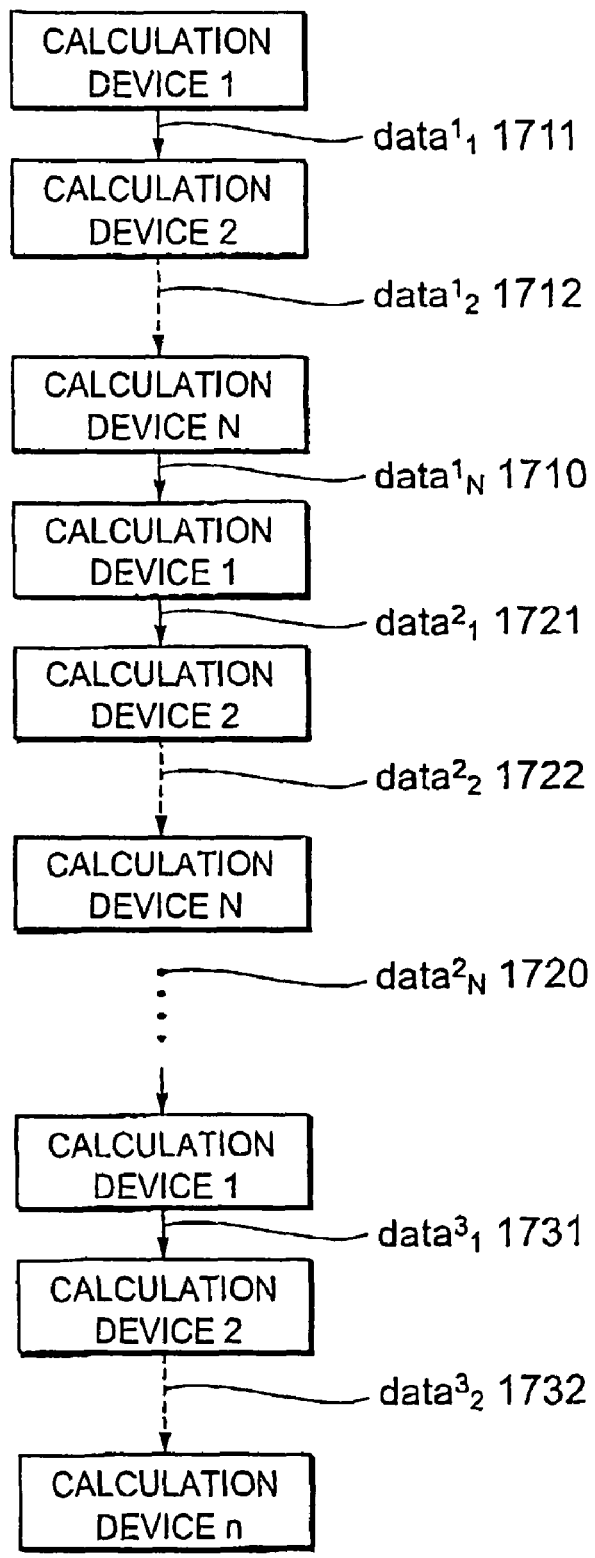
FIG. 16 shows a data flow according to the second invention.

A data flow according to the second embodiment will be described with reference to FIG. 16.

First of all, U1 of the calculation device 1401 calculates DATA00. This is referred to as "a calculation of the zero-th cycle" (1701).

Next, "a calculation of the first cycle" is performed.

U1 calculates $DATA_1^1$ from $DATA_0^0$ to transmit DATA11 to U2 (1711).

Next, U2 calculates $DATA_1^2$ from DATA11 to transmit DATA12 to U3 (1712).

Hereinafter, the data is transmitted in turn. UN calculates $DATA_1^N$ from $DATA1^{N-1}$ to transmit DATA1N to U1 (1710). At this point, the calculation of the first cycle is ended.

Next, "a calculation of the second cycle" is performed.

U1 calculates $DATA_2^1$ from DATA1N to transmit DATA21 to U2 (1721).

Next, U2 calculates $DATA_2^2$ from DATA21 to transmit DATA21 to U3 (1722).

Hereinafter, the data is transmitted in turn. UN calculates $DATA_2^N$ from $DATA_2^{N-1}$ to transmit DATA2N to U1 (1720). At this point, the calculation of the second cycle is ended.

Next, "a calculation of the third cycle" is performed.

U1 calculates $DATA_3^1$ from DATA2N to transmit DATA21 to U2 (1731).

Hereinafter, the data is transmitted in turn. The protocol is completed when UN completes the calculation of DATA3N from $DATA_3^{N-1}$.

[Input and Output of the Respective Calculation Devices 1401]

Next, input and output of data exchanged among the respective calculation devices 1401 will be described with reference to FIG. 14.

Circuit information 1404 and a circuit partial input 1402 are input to the respective calculation devices 1401.

Herein, a case will be described in which the number of fan-ins of elements other than input elements represented by the circuit information 1404 is 2.

An input bw to an input element w of the circuit is secretly owned by one of U1, ..., UN. U1 is also referred to as UN+1.

A combination of input bits secretly owned by UI corresponds to the circuit partial input 1402.

A circuit in which input elements i of the circuit represented by the circuit information 1404 are regarded as elements for outputting bw when any input is received is hereinafter expressed as C[1].

The number of fan-in of all gates of C[1] is 2.

Fan-ins at the upper left and the lower right are referred to as L(w) and R(w).

When the circuit information 1404 and the circuit partial input 1402 are input to the respective calculation devices 1401, U1 firstly performs the calculation of the zero-th cycle while following a procedure to be described later.

The input and output in the calculations of the first to third cycles have the same data configuration. Data to be transmitted to UI+1 in the calculation of an i-th cycle by the user with respect to i=1,2,3 is hereinafter expressed as DATAiI. DATAi−1N is also referred to as DATAi0.

The result of the calculation performed by U1 in the calculation of the zero-th cycle is referred to as DATA01.

$DATA_I^I$ has a format of $DATA_I^I = DATA_I^I \| BODY_i^I \| PROOF_1^I \| SIG_I^I$.

DATAiI−1 is a message sent from UI−1. BODYiI is a main body of the message. PROOFiI is a validity proof text of BODYiI. SIGiI is a signature of UI for DATAiI−1∥BODYiI∥PROOFiI.

The outline of the calculation of the first to third cycles will be described.

In the calculation of the i-th cycle, first of all, UI receives DATAiI−1 from UI−1 (1501).

(Only U1 of the first cycle exceptionally uses DATA01 made by itself).

When receiving $DATA_i^{I-1}$, UI verifies all validity proof texts PROOF11, ..., PROOFI−11 (1502). Next, UI verifies all signature text $SIG_I^1$, ..., SIGI−11 (1503).

Only in the case of the first cycle and also I=1, the calculation of 1504 is performed. Next, UI performs random number generation (1505). Then, UI uses the random number to perform the main calculation to generate BODYiI (1506). After the main calculation is completed, UI generates a validity proof text PROOFiI of BODYiI (1507). Then, UI generates a signature text SIGiI with respect to DATAiI−1∥BODYiI∥PROOFiI (1508).

Finally, UI transmits DATAiI=DATAiI−1∥BODYiI∥PROOFiI∥SIGiI to UI+1 (1509).

[Symbol]

Hereinafter, symbols used in this specification will be described.

[Encryption Method E[27]]

G[1] denotes an abelian group with a difficult DDH problem (for example, an ellipse curve group on an infinite distance on an ellipse curve group on a finite field), p denotes an order of G[1], and O denotes a zero element of G[1].

η is treated as a symbol and the following symbols are defined. It should be noted that with respect to P[|0|]∈G[1], (P[|0|],0) is abbreviated to be simply expressed as P[|0|] and regarded as the following.

$$F_p \subset B[12], G[1] \subset G[12B]$$

Then, a sum on G[12B] is defined by a sum for each component to obtain the following.

$$W[12] = B12^\kappa \text{ is set, establishing}$$

$$G[12W] = G[12B]^\kappa$$

$$W[2] \in W[12]$$

α component of w[2] ... is expressed as [2|α|]. A sum and a product on W[12] are defined by a sum and a product for each component. Then, a sum and a scalar multiple on G[12W] are defined by a sum and a scalar multiple for each component.

$B[12]=F_p[\eta]/(\eta^2-1)$,
$\phi[24](1)=1, \phi[24](0)=\eta$,
$G[12B]=G[1]^2$,
$aP[2]=(a[|0|]P[|0|]+a[|1|]P[|1|]), aa[|0|]Pa[|1|]+a[|1|]Pa[|0|])$
$W[12]=B[12]^\eta$
$e[|i|]=(0, \ldots 0,1,0, \ldots, 0)$ (only i-th is 1)
$\phi[2]: F_D \to W[12]$ is set as $x \to \Sigma_\alpha \phi[2](x[|\alpha|])e[|\alpha|]$
Wherein
  $P[2]=(P[|0|],P[|1|])$, $P[23]=(P[3|0|],P[3|1|])\in G[12B]$,
  $a=a[|0|]+a[|1|]\eta \in B[12]$ $P[2]=(P[|0|], P[|1|])\in G[12B]$,
  κ: the number of bits of p.
  $x=x[|k-1|]\| \ldots \|x[|0|]$,
  $G[12W]=G[12B]^\kappa$, The encryption method E[27] is a resemblance of an ellipse ElGamal encryption in G[12W].

A secret key space is denoted by Fp, a public key space is denoted by G[12W]2, a plaintext space is denoted by G[12W], and a random number space is denoted by W[12].

In order to generate a key, a key satisfying P[|0|],P[|1|]·O if P=P[|0|]+ηP[|1|] is arbitrarily selected. By randomly selecting $a \in F_p$, Q=aP is satisfied. a denotes a secret key and (P,Q) denotes a public key. In order to cipher a plain text M, r∈B[12] is uniquely and randomly selected to calculate a cipher text (P[3],Q[3])=(rP,M+rQ). In order to decipher (P[3],Q[3]), Q[3]−aP[3] may be calculated.

[Encryption Methods E[2],E[25]]

The following data is defined:
$K[1]=\{|x[|wWh|]|\}(w\in C[1], W\in \{L,R\}, h\in \{0,1\}_{are\ run\ through})| x[|wWh|] \in F_F$
$A[12]=\{I\ a[2|wWijk|]|\ (|w\in C[1], W\in \{L,R\}, i, j, k\in\{0,1\}_{are\ run\ through})|a[$
$A[125]=\{\{A[25|wWijk|i[6]j[6]k[6]]\}(\{w\in C[1], W\in \{L,R\}, i,i[6],j,j[|A[25|wWijk|i[6]j[6]k[6]]\in W[12])$
$G[1|K|]=\{\{P[|wWh|]\}(\{w\in C[1], W\in \{L,R\}, h\in \{0,1\}\}_{are\ run\ through})|P[|wWh|$
$G[12|A|]=\{\{P[2|wWijk|]\}(w\in C[1], W\in \{L,R\}, i,j,k\in\{0,1\})|P[2|wWi$.
$G[124|A|]=\{\{P[24|wWijk|i[6]j[6]k[6]]\}|$
  $(|w\in C[1],\ W\in \{L,R\},\ i,\ j,\ k,\ i\ [6],\ j[6,\ k[6\in \{0,1\}]_{are\ run\ through})$
  $IP[24|wWijk|i[6]j[6]k[6]\in G[12W]$.
$aA=(aA[|1|],aA[|2|])$
$a[5]A[5]=(a[5]A[5|1|],a[5]A[5|2|])$
Wherein
  $a\in A[12]$
  $A=(a[|1|],A[|2|])\in G[12|A|]^2$
  $a[5]\in A[125]$
  $A[5]=(A[5|1|],A[5|2|])\in G[124|A|]^2$ A wWh component of the original x of κ is referred to as x[|wWh|]. A wWijk component of the original x[2] of A[12] is referred to as x[|wWijk|]. A component of the original A[25] of A[125] is referred to as x[|wWijk|i[6]j[6]k[6]].

A sum, a product, and a scalar multiple of a multiple sequence alignment are defined by a sum and a product for each component. However, exceptionally, only a product of the originals of A[125] and a scalar multiple of the original of A[125] of the original of G[124|A|] are defined as follows.

$a[25]*b[25]=\Sigma_{i[7],j[7],k[7]}$
  $a[25|wWijk|i[7]j[7]k[7]]$
  $b[25|wWi[7]j[7]k[7]|i[6]j[6]k[6]]$, $a[25]*P[24]=\Sigma\ a[25|wWijk|i[7]j[7]k[7]]$
  $P[24|wWi[7]j[7]k[7]|i[7]j[7]k[7]]$
  (A sum related to i[7], j [7], k[7])

The following symbols are defined.

$E[25]\ [(Z[2]|s[25])](M[25])$
  =
  $|E[27][(Z[2]|s[25|wWijk|i[6]j[6]k[6]])]$
  $(M[25|wWijk|i[6]j[6]k[6]])|$
$E[25][(Y[2]|s[25])](M[25])$
  =
  $E[25][(s[25]|Z[25])](M[25])$
$E[2][(x[2]|r[2])](M[2])$
  =
  $|E[27][(x[2|wWijk|]|r[2|wWijk|])](M[2|wWijk|])$
$E[2][(Y[2]|r[2])](M[2])$
  =
  $E[2][(x[2]|r[2])](M[2])$ Wherein
$M[25]=\{M[25|wWijk|i[6]j[6]k[6]]\}$,
  $M[25|wWijk|i[6]j[6]k[6]]\in G[12W]$
$Z[2]=\{Z[25|wWijk|i[6]j[6]k[6]]\}$,
  $(Z[25|wWijk|i[6]j[6]k[6]]\in G[12W]^2)$
$s[25]|s[25|wWijk|i[6]j[6]k[6]]|\in A[125]$
$Y[2]=(P[2], r[2])=\in G[12W]$,
$Z[25]=|Y[2]|[|wWijk|i[6]j[6]k[6]]$
$M[2]=\{M[2|wWijk|]\}[|wWijk|]$ $(M[2|wWijk|]\in G[12W])$
$x[2]=(P[2],Q[2])=(|P[2|wWijk|]|, \{Q[2][|wWijk|]\})$
  $(P[2|wWijk|], Q[2|wWijk|]\in G[12W])$,
  $r[2]=|r[2|wWijk|]), r[2|wWijk|]\in \}W[12]$ The encryption methods E[2], E[25] are referred to as a multiple sequence alignment ElGamal encryption on a true value group ring and an extended multiple sequence alignment ElGamal encryption on the true value group ring, respectively.

[Other Symbol]
$h[:|w|](ijk))=(i\square[|w|])i)\bigcirc k$
$F[25:I|\lambda[|1|], \lambda[|2|], \lambda[|2|]|]|(x[2])=$
  $|x[2:I|wh[|w|](ijk)|$
  $\delta(i,i[6]\bigcirc \lambda[|1w|])$,
  $\delta(j,j[6]\bigcirc \lambda[|2w|])$,
  $\delta(k,k[6]\bigcirc \lambda[|3w|])|$
(A field related to wWij[6]jj[6]kk[6])
$J[2](x[2])\in A[12]=J[2](x[2])=\{x[2|W(w)i[W]|]$,
$\pi[2](a[25])=\{\Sigma a[25|wWijk|i[6]j[6]k[6]]\}[|ijk|]\}$
(The sum is a sum related to i[6], j[6], k[6])
Wherein the following is defined.
$\lambda[|1|]=\{\lambda[|1w|]\}, \lambda[|2|]=\{\lambda[|2w|]\}$,
$\lambda[|3|]=\{\lambda[|3w|]\}$: A field of bit (A field related to w∈C [1])
$x[2]=\{x[2|wWh|]\}x[2|wWh|]\in W[12]$,
[$\bigcirc$]: An exclusive OR for each bit
[$\square[|w|]$]: An operator for a calculation with an element w
  (It should be noted that when w is the input element, $b_w$ is owned by one of $i\square[|w|]j=1$ (if $b_w$ is $U_1, \ldots U_{I-1}$, $i\square[|w|]j=0$ (otherwise)
$\delta(i, i[6])$: Kronecker delta
$i[W]=i$ (if w=L), $i[W]=j$ (if w=R),
$a[25]=\{a[25|wWijk|i[6]j[6]k[6]]\}\in =A[125]$ From a simple calculation, it is understood that the following is established:
$(a[25]*b[25])c[25]=a[25]*(b[25]*c[25])$,
$(a[25]*b[25])P[2]=a[25]*(b[25]\{\ \}P[2])$,
$F[25:I|\lambda[3|1|], \lambda(3|2|, \lambda[3|3|]|](1)$
  $*F[25:I|\lambda[|1|], \lambda[|2|], \lambda[|3|]|]|(x[2])$
  =

$F[25:I|\lambda[3|1|]\bigcirc\lambda[1|1|],\lambda[3|2|]\bigcirc\lambda[2|],\quad \lambda[3|3|]\bigcirc\lambda[|3\overset{\vee}{\vee}|]](x[2])$ $F[25:I|\lambda[1|1|],\lambda[|2|],\lambda[|3|]|](x[2])$ $*F[25:I|0,0,0|](x[23])=F[25I\lambda[1|1|],\lambda[|2|],\lambda[|3|]|](x[2]\bigcirc x[23])$ Wherein $a[25], b[25], c[25] \in A[125]$, $a[2], b[2] \in A[12]$, $x[2], x[23] \in \kappa$ $\lambda[1|1|] = \{\lambda[|1w|]\}, \lambda[|2|] = \{\lambda[|2w|]\}$ $\lambda[|3|] = \{\lambda[|3w|]\}$, $\lambda[3|1|] = \{\lambda[|1w|]\}$, $\lambda[3|2|] = \{\lambda[|2w|]\}$, $\lambda[3|3|] = \{\lambda[|3w|]\}$: Bit array $|\in\{1,\ldots,N\}$

[Detail of the Calculation of the Zero-th Cycle]

A detail of the calculation of the zero-th cycle will be described.

A description will be given of a method in which U1 calculates BODY10.

U1 calculates the following expressions.

$x[:0|wWh|]=0$, $x[2:0|wWh|]$ $= \phi[2](x[:0|wWh|])$, $x[:0]$ $= \{x[:0|wWh|]\}$, $x[2:0]$ $= \{x[2:0|wWh|]\}$ $\lambda[:0]=\{\lambda[:0|w|]=\{0\}$, $\lambda[L:0]=\{\lambda[:0|L(w)|]=|0|$, $\lambda[R:0]=\{\lambda[:0|R(w)|]=\{0\}$, $r[2:0]=\{r[2:0|wWijk|]=\{0\}$ (A field related to wWijk)

$y[:0]=0$, $r[2:0]=y[:0]P[2](=O), Y[2:0]=(P[2], r[2:0])$ $s[2:0|S|]=\{(s[2:0|S|])[|wWijk|i[6]j[6]k[6]]\}$ $=[0][|wWijk|i[6]j[6]k[6]]$, $s[2:0|T|]=\{(s[2:0|T|])[|wWijk|i[6]j[6]k[6]]\}$ $=[0][|wWijk|i[6]j[6]k[6]]$, $s25U:0]=\{(s[25U:0|wWijk|i[6]j[6]k[6]]\}$ $=\{0\}[|wWijk|i[6]j[6]k[6]]$, $(s[2:0]T[2:0], U[25:0])=(E[2][(Y[2:0]|s[2:0|S|])](r[2:0]P[2])$ $E[2][(Y[2:0]|s[2:0|T|])](r[2:0]0[2:0])$, $E[25][(Y[2:0]|s[25R:0])](F[25:I|\lambda[L:0],\lambda[R:0],\lambda[:0]|](x[2:0])P[2])$ $\mathrm{BODY}_1^0=$ $(Q[2:0],r[2:0])\|(s[2:0],T[2:0],U[25:0])$.

Wherein $w\in\{\ \}C[1], W\in\{L,R\}, h\in[0,1], i, j, k\in\{0,1\}$

[Detail of Calculation of the First Cycle]

A multi party calculation of the first cycle will be described. The description will be given with reference to FIG. 15.

[Detail of Data Obtainment 1501]

Each U1 receives data DATA1I-1 from UI-1. (Only U1 calculates data DATA1I-1=DATA10 by its own exceptionally).

[Detail of Validity 1502 of the Proof Text in Data]

When DATA1I-1∥BODY1I-1∥PROOF1I-1∥SIG1I-1∥ is sent from UI-1, UI checks the validity of $\mathrm{PROOF}_1^1,\ldots,\mathrm{PROOF}_1^{I-1}$. A detail of this validity check will be described later.

[Detail of Validity 1503 of the Signature Text in Data]

UI checks the validity of SIG1, ..., SIG1I-1. Furthermore, a hash value P of RAND is calculated to check $P[2]=(e[|0|]+\ldots+e[|\kappa-1|])(1+\eta)P$.

[Detail of Calculation Performed Only by U1]

U1 first select a random number RAND to set a hash value of RAND as follows.

$P \in G[1]$

Then, $P[2]=(e[|0|]+\ldots+e[|\kappa-1|])P[2B]$ is set to establish BODY1-1=RAND∥P[2]. After that, BODY10 is generated by itself while following a procedure to be described later and further PROOF10=SIG10=ϵ is set, thereby establishing DATA10=RAND∥BODY10∥PROOF10∥SIG10.

[Detail of Random Number Generation]

U1 randomly selects the following (but the selection is made while descriptions in brackets are satisfied):

$\{x[\#I|wh|]\}(x[\#I|w[t]0|]\}=0$, $x[0\#I|w[t]0|=]=1$, $x[\#I|wh|]\in K[I]$, The most significant bit of each $x[\#I|wh|]$ is 1).

$\{x[|wWh|]\}, x[|wWh|]\in\{0,1\}\quad (x[\#I|wLh|]\bigcirc x[\#I|wRh|]=x[\#I|wh|])\ \{w\in C[1], W\in\{L,R\}, h\in[0,1]\}$ $r[2]=|r[2|wWijk|]\}\in A[12]$, $r[2|wWijk|]\in F_P\kappa\subset\beta[12]\kappa=W[12]$, $s[2|S|]=\{(s[2|S|])[|wWijk|]\}\in A[12]$, $s[2|T|]=\{(s[2|T|])[|wWijk|]\}\in A[12]$, $s[25U]=\{s[25U|wWijk|i[6]j[6]k[6]]\}\in A[125]$.

$\lambda[\#I]=\{\lambda[\#I|\{w\}]\}$ (Field of the bit, $\lambda[|w[t]|]=0$)

Wt: output element

With respect to the input element w, $x[\#I|L(w)0|]=x[\#I|R(w)1|]=0$ is defined for form's sake.

The following symbols are defined.

$x[:I|wWh|]=\bigcirc x[\#\gamma|wWh|]$, (An exclusive OR in the range of $\gamma\leq I$ is taken).

$x[:I]=\{x[:I|wWh|]\}$.

$x[2\#I|wWh|]=\phi[2](x[\#I|wWh|])$, $x[2\#I]=\{x[2\#I|wWh|]\}$, $x[2:I|wWh|]=\phi[2:I](x[|WWh|])$, $x[2:I]=\{x[2:I|wWh|]\}$, $\lambda[\#I]=\{\lambda[\#I|w|]\}$, $\lambda[L\#I]=\{\lambda[\#I|L(w)|]\}$, $\lambda[R\#I]=\{\lambda[\#I|R(w)|]\}$, $\lambda[:I|w|]=\Sigma\lambda[\#\gamma|W|]$, (A sum in the range of $\gamma\leq I$ is taken)

$\lambda[:I]=\{\lambda[:I|w|]\}$, $\lambda[L:I]=\{\lambda[:I|L(w)|]\}$, $\lambda[R:I]=\{\lambda[:I|R(w)|]\}$, $Y[2:I]=(P[2],\gamma[:I]P[2])$, $y[:I]=y[\#I]$, (A sum in the range of $\gamma\leq I$ is taken)

The following fact regarding the proposed method can be mentioned. When the users comply with the protocol, the data BODY1I sent by each UI satisfies the following.

$\mathrm{BODY}1I=(Q[2:I],r[2:I])\|(s[2:I],T[2:I],U[25:I])$, $(Q[2:I],r[2:I])=J[2](x[2:I])P[2],y[:i]P[2])$, $(s[2:I],T[2:I],\ U[25:I])=(E[2][(Y[2:I]|s[2]|S:I])](r[2:I]P[2])$, $E[2][(Y[2:I]|s[2:I|T|])](r[2:I]Q[2:I])$, $E[25][(Y[2:I]|s[25U:I])](F[25:I|\lambda[L:I],\lambda[R:I],\lambda[:I]|](x[2:I])P[2])$ Wherein $s[2:I|S|]$ $= \Sigma s[2\#\gamma|S|]$ (A sum in the range of $\gamma\leq I$ is taken);

$s[2:I|T|]$ $= \Sigma s[2\#\gamma|T|]$, $s[25U:I]=[235U:I]+s[25U\#I]$, s[235U:I]
= F[25:I|λ[L#I], λ[R#I], λ[#I]I](1)
*s[25U:I−1]
*F[25:I|0,0,0|](x[2#I]),

[Detail of Mail Calculation 1506]

Figure 17:
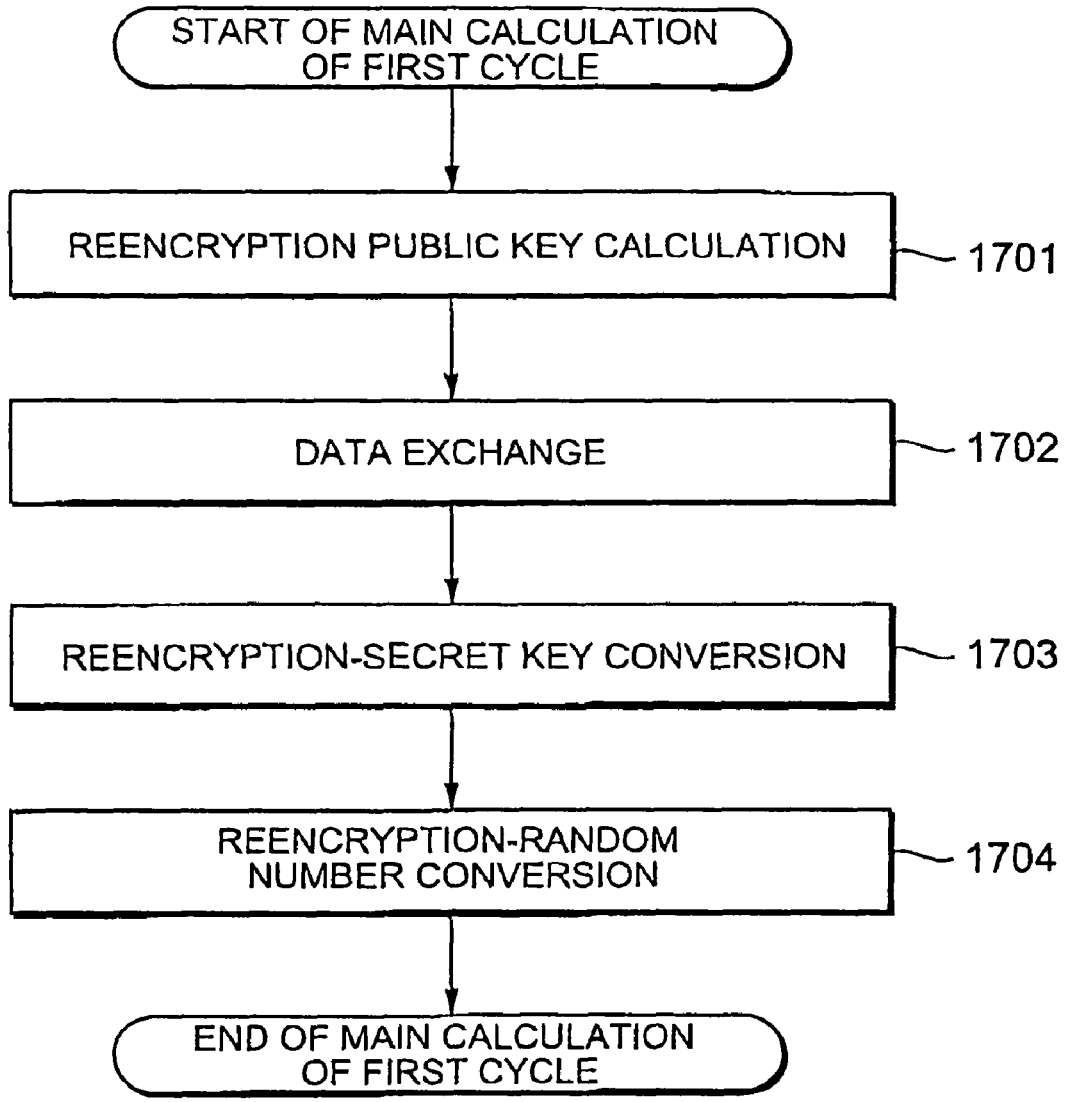
FIG. 17 is a flowchart for main calculation of the first cycle.

A mail calculation 1506 of the multi party calculation of the first cycle will be described with reference to FIG. 17.

A description will be given of a method in which UI calculates BODY1I.

[Detail of Mail Calculation 1701]

First of all, UI calculates the following expressions.
Q[2:I]=J[2]x[2#I])Q[2:I−1]
r[2:I]=y[#I]P[2]+r[2:I−1]

[Data Exchange 1702]

Then, the following expressions are calculated.
S[23:I]=r[2#I]s[2:I−1]
T[23:I]=r[2#I]J[2](x[2#I])T[2:I−1]
U[235:I]=F[25:I|λ[L#I],λ[R#I],λ[#I]I](1)*U[25:I−1]*F[25:I|0,0,0|](x[2#I])

It should be noted that the following can be satisfied:
Q[2:I]=J[2](x[2:I])P[2],
r[2:I]=y[:I]P[2],
S[23:I]=E[2][(Y[2:I−1]|s[2:I−1|S|])](r[2:I]P[2]),
T[23:I]=E[2][(Y[2:I−1]|s[2:I−1|T|])](r[2:I]Q[2:I]),
U[235:I]=E[25][(Y[2:I−1]|s[235U:I])](F[25:I|λ[L:I],λ[R:I],λ[:I]|](x[2:I])P[2]).

Wherein
s[235U:I]=F[25:I|λ[L#I],λ[R#I],λ[#I]|](1)
*s[25U:I−1]*F[25:I|0,0,0|](x[2#I])

[Reencryption-Secret Key Conversion 1703, Reencryption-Random Number Conversion 1704, Validity Proof Text Generation 1507, Signature Text Generation 1508, Data Transmission 1509]

Finally, UI calculates the following expressions. (Reference numerals in figures are in parentheses).

(1703)s[233:I]=S[23:I|1|], S[23:I|2|]+y[#I]s[2:I|1|]),
T[233:I]=T[23:I|1|],T[23:I|2|]+y[#I]T[2:I|1|]),
T[2335:I]=(U[235:I|1|],U[235:I|2|]+y[#I]U[25:I|1|]), (1704)
s[2:I]=s[233:I]+E[2][(Y[2:I]|s[2#1|S|])](∘),
T[2:I]=T[233:I]+E[2][(Y[2:I]|s[2#1|T|])](∘)
U[235:I]=(U[235:I|1|],U[235:I|2|]),
U[25:I]=T[2335:I]+E[25][(Y[2:I]|s[25U#I])](∘), (s[2:I],T[2:I],U[25:I])
=(E[2][(Y[2:I]|s[2:I|S|])](r[2:I]P[2]),
E[2][(Y[2:I]|s[2:I|T|])](r[2:I]Q[2:I]),
E[25][(Y[2:I]|s[25U:I])]
(F[25:I][(λ[L:I],λ[R:I],λ[:I]|])(x[2:I]P[2]),
(1507)
(1508)
A signature of BODY1I=s[2:I] DATA1I−1||BODY1I−1||PROOF1I−1 SIG1I is generated.
(1509) DATA1I=DATA1I−1||BODY1I||PROOF1I||SIG1IDATA1I is set as UI+1
Wherein
S[23:I]=E[2][(Y[2:I−1]|s[2:I−1|S|])](r[2:I]P[2]),
T[23:I]=E[2][(Y[2:I−1]|s[2:I−1|T|])](r[2:I]P[2]),
U[235:I]=E[25][(Y[2:I−1]|s[25U:I−1])](r[25:I]P[2]),
S[23:I]=(S[23:I|1|],S[23:I|2|]),
T[23:I]=(T[23:I|1|],T[23:I|2|]),
T[23:I]=(T[23:I|1|],T[23:I|2|]), A detail of the validity proof text is long so the description will be given later.

DATA1I=(Q[2:I],r[2:I])||(s[2:I],T[2:I],U[25:I]) is sent to UI+1.

It should be noted that the following fact can be mentioned:
S[233:I]=E[2][(Y[2:I]|s[2:I−1|S|])](r[2:I]P[2]),
s[2:I]=E[2][(Y[2:I]|s[2:I|S|])](r[2:I]P[2]).

[Detail of Calculation of the Second Cycle]

Figure 15:
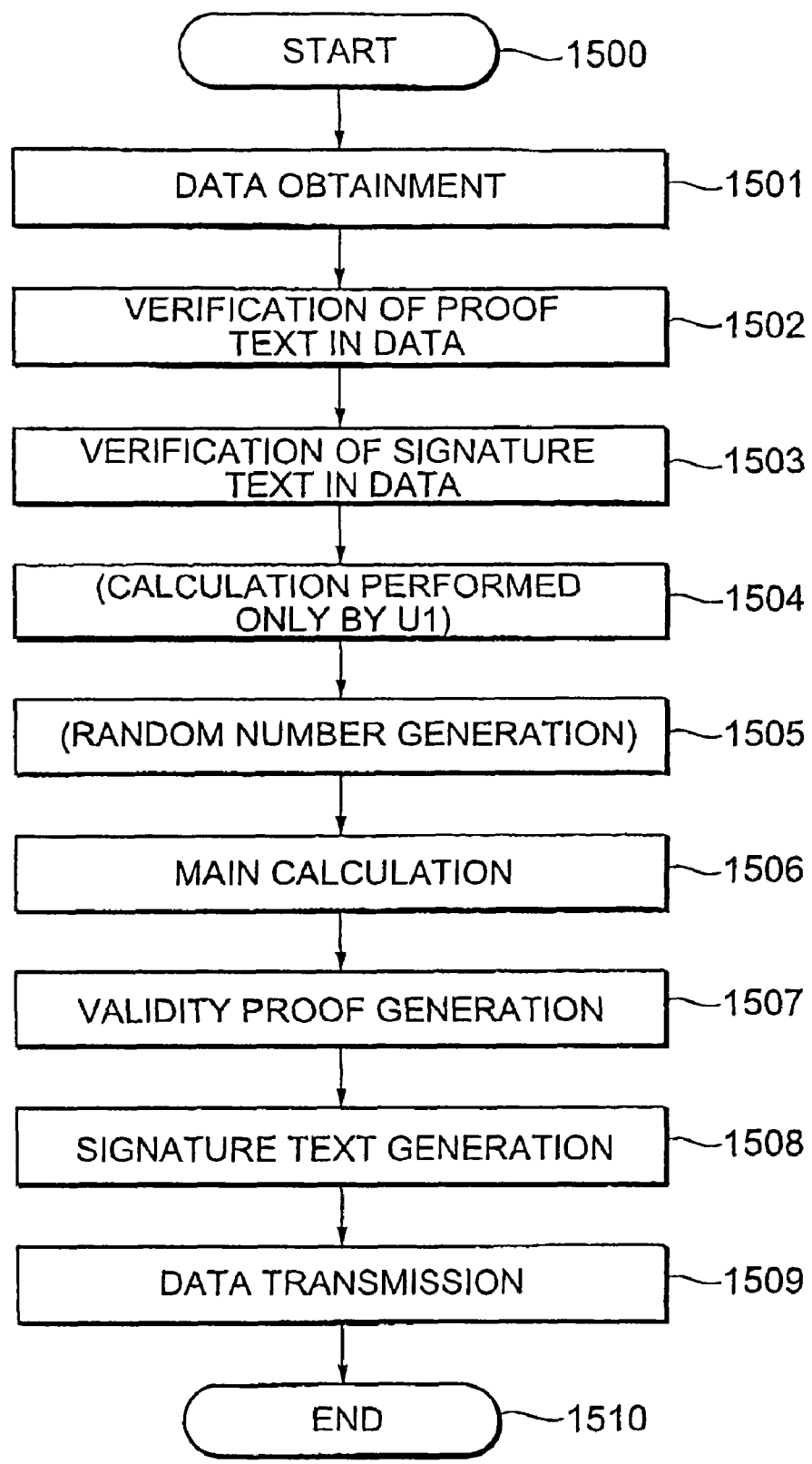
FIG. 15 is a flowchart for calculation performed by the respective calculation devices of each cycle from first to third cycles according to the second invention.

A detail of the calculation of the second cycle will be described with reference to FIG. 15.

[Detail of the Data Obtainment 1501]

Each UI receives data DATA2I−1=DATA2I−2||BODY2I−1||PROOF2I−1||SIG2I−1 from UI−1.

[Verification 1502 of Proof Text in Data, Verification 1503 of Signature Text in Data, Calculation 1504 Performed Only by UI, Detail of Random Number Generation 1505, Cipher Calculation 1801 on Fp]

Calculations described below are performed.

(1502) Validity verification of PROOF21|| . . . ||PROOF2I−1 (the detail will be described below)
(1503) Validity verification of SIG21|| . . . ||SIG2I−1
(1504) No process is performed.
(1505) No process is performed.

[Detail of the Main Calculation 1506]

Figure 18:
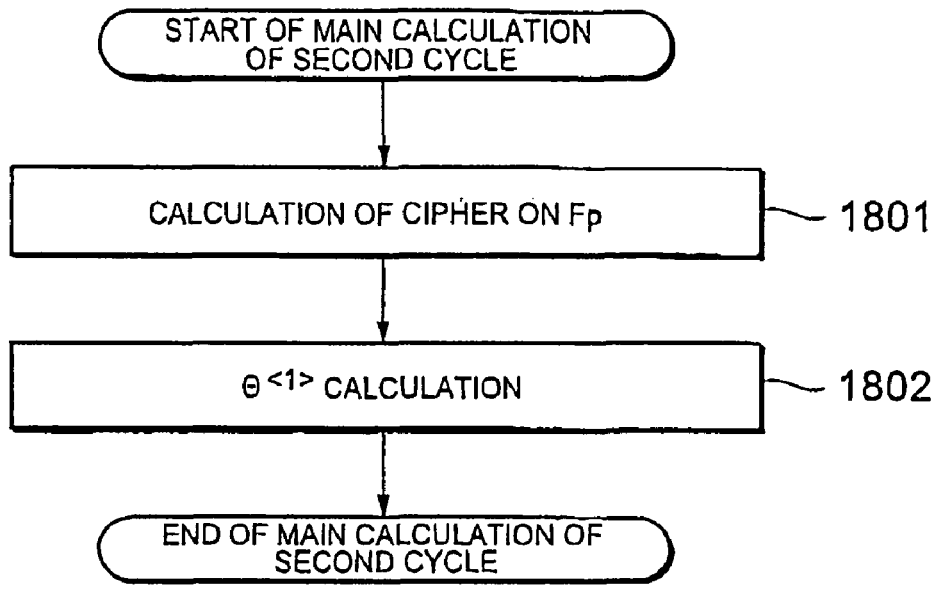
FIG. 18 is a flowchart for main calculation of the second cycle.
Figure 19:
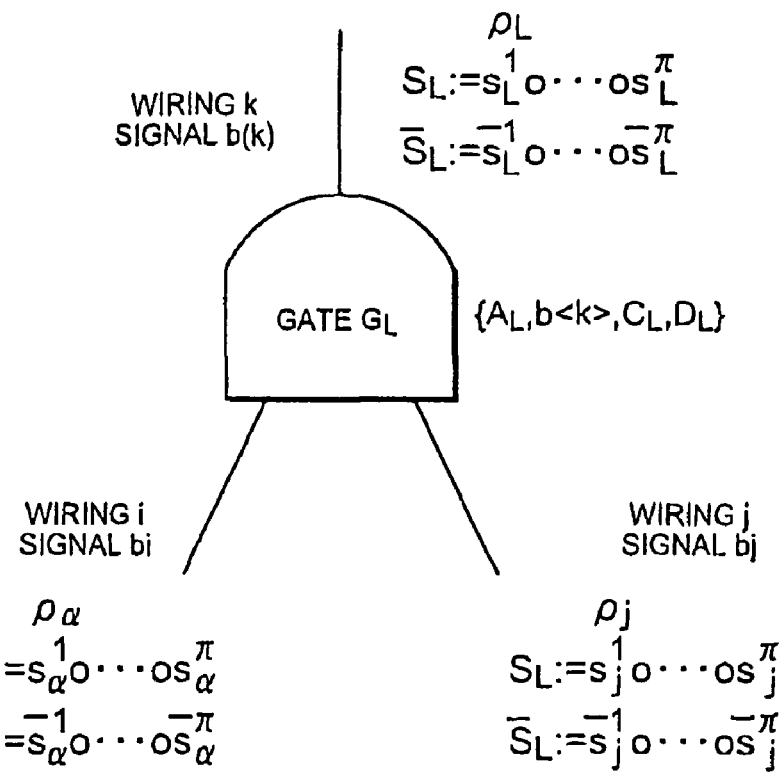
FIG. 19 is a drawing for facilitating understanding of data that is calculated with respect to each gate in the prior art.

A detail of the main calculation in the calculation of the second cycle will be described with reference to FIG. 18.

[Calculation of Ciphers on Fp 1801]

Hereinafter, this section omits the additional character ⌈:N⌋.

UI performs the following calculations:
s[2U]=π[2](s[25U]),
m[2S]=r[2],
m[2T]=r[2]J[2](x[2]),
m[2U]=F[25|λ[L],λ[R],λ|](x[2]),
U[2]=π[2](U[25])
(s[2],T[2],U[2])
=E[2][(Y[2]|s[2|S|])](m[2S]P[2]),
E[2][(Y[2]|s[2|T|])](m[2T]P[2]),
E[2][(Y[2]|s[2U])](m[2U]P[2])

Wherein
X={(P,x[|wh|]P)}, Y={(P,yP)},
E[1][(r|x)](A)={E[7][(r[|wWijk|]|X)](A[|wWijk|]P)}
E[7]: An encryption function of an ellipse ElGamal encryption method.

Then, the following calculations are performed.
(s[24V|wWijk|]=Σs[2V|αwWijk|], (A sum related to α is taken)
(m[24V|wWijk|]=Σ2$^\alpha$m[2V])[|αwWijk|), (A sum related to α is taken)
(s[24V|wWijk|]P(2B|]=Σ2$^\alpha$s[2VI α wWijk|]P[2]), (A sum related to α is taken)
s[24V]P[2B]=(s[4V|0,wWijk|]P,s[4V|1,wWijk|]P),
(m[24V|wWijk|]+(s[24V|wWijk|]y)P[2B]
=
Σ2$^\alpha$m[2V|αwWijk|]+s[2V|αwWijk|]γP[2B](A sum related to α is taken)

Wherein
(s[2V|wWijk|]
=
Σs[2V|αwWijk|]e[α] (A sum related to α is taken)
(s[24V|wWijk|]=((s[V|0,wWijk|], (s[V])[(|1,wWijk|])
(m[2V(wWijk|]=m[2V|wWijk|]
=
Σm[2Vα|wWijk|]e[|α|], (A sum related to α is taken)
m[24V|wWijk|]=(m[4V|0, wWijk|],m[4V|1,wWijk|]),
P[2]
=
Σe[|α|]P[2B] (A sum related to α is taken)
P[2B]=(P,P), P∈{ }G[1],
V[2]
=

E[2][(Y[2]|s[2V])](r[2]P[2])
=
(s[2V]P[2],m[2V]P[2]+s[2V]r[2]),
s[2V|wWijk|]P[2]
=
Σ(s[2Vα|wWijk|]e[|α|]P[2B], (A sum related to α is taken)
(m[2V|wWijk|]+s[2V|wWijk|]−y)P[2B]ϵW[12]
=
Σ(((m[2V])[|α|])[|wWijk|]+s[2V|α||wWijk|]yP[2B]e[|α|]$_o$
(A sum related to α is taken)
(m[24V|wWijk|]+s[24V|wWijk|]y)P[2B]
=
(m[4V|0,wWijk|]+s[V|0,wWijk|]y)P.
(m[4V|1,wWijk|]+s[V|0,wWijk|]y)P
Thus, UI can obtain the following:
s[V|0,wWijk|]P, s[V|1,wWijk|]P,
m[4V|0,wWijk|]+s[V|0,wWijk|]y)P,
m[4V|1,wWijk|]+s[V|0,wWijk|]y)P,
Moreover, the following calculations are performed.
R=yP, Y=(P,R)
(s[V|0,wWijk|]P,
(m[4V|0,wWijk|]+s[V|0,wWijk|]y)P
=E[(s[V|0,wWijk|]|Y)](m[4V|0,wWijk|]P),
(S,T+U)
=(E[3][(s[4S0],s[4T0]+s[4U0]|Y)],E[1][(r[40]|J(X))](F[|λ[L],λ[R],λ|](x))
{(Θ[|wWijk|],Θ'[|wWijk|])}
=E[3][(s[4S0],s[4T0]+s[4U0]|Y)],E[1][(r[40]|J(X))](F[|λ[L],λ[R],λ|](x))
Θ[&0]={(Θ[|wWij0|],Θ'[|wWij0|])}
R[&0]=R0
Wherein
r[2]=R[|0|]+R[|1|]n

[Calculation of Θ[&1] 1802, Detail of the Validity Verification Text Generation 1507, Detail of the Signature Text Generation 1508, Detail of the Data Transmission 1509]

Furthermore, the following calculations are performed:
(1802)
Θ(&1=Θ[&I−1]−(Θ[|0|][&I−1],Θ[|1|][&I−1]−y[&I]Θ[|0|][&I−1]),
BODY2I=Θ[&I].
Wherein
BODY2I−1=Θ[&I−1],
Θ[&I−1]=(Θ[&I−1][0],Θ[&I−1|1|])
(1508)
(1803)
BODY2I=s[2:I]
SIG2I: A signature is given to DATA2I−1∥BODY2I∥PROOF2I
Then, DATA2I=DATA2I−1∥BODY2I∥PROOF2I∥SIG2I is transmitted to UI+1 (1509).

[Detail of the Calculation of the Third Cycle]

A detail of the calculation of the third cycle will be described with reference to FIG. 15.

When DATA$_3^{I−1}$=DATA3I−2∥BODY3I∥PROOF3I∥SIG3I is sent from U$^{I−1}$ (1501), firstly, the validity of PROOF$_3^1$,..., PROOF3I−1, SIG3I,..., SIG3I−1 is checked (1502,1503). (1504) and (1505) are not the calculations of the third cycle. BODY3I=ϵ is established (1506) and PROOF3I=ϵ is established (1507). Then, a signature SIG3I for DATA3I−1∥BODY3I∥PROOF3I is generated (1508) and DATA3I=DATA3I—1∥BODY3I∥PROOF3I∥SIG3I is established to send DATA3I to UI (1509).

[Method of Obtaining C[1]({b[|w|]}) 1405]

A method of obtaining C[1]({b[|w|]}) will be described.

First, as x[#I|L(w)0|]=x[#I|R(w)1|]=0 is established with respect to the input element w, {E[1][(|{X[|W(w)i[|W|]|]{)]x[|wWh[3](ij0)|])} is solved entirely to obtain Xx[|wWh[3](ij0)|]=x[|wWμ[w]|]. Then, x[3|w|]=x[|wμ[w]|]=x[|wLμ[w]|]o{ }x[|wRμ[w]|] is calculated to establish μ[w]=h[3](ij0).

Incidentally, with respect to each element w from the bottom to the stage of u−1, x[|μ[|w|]|] is found out.

The following calculations are performed to find out x[|μ[|w|]|] at the u stage.
E[1][(|X[|L(w)μ[|L(w)|]|])](x[|(wWh[3](μ[|L(w)|]j0)}|]),
E[1][(|X[|R(w)μ[|R(w)|]|])](x[|wWh[3](iμ[|R(w)0)|]|]) (i,j=0, 1)
are solved with use of x[|W(w)μ[|W(w)|]|].
x[|wh[3]μ[|L(w)|]μ[|R(w)0|]|]=
ox[|wWh[3]μL(w)μ[|R(w)0|]|]
(An exclusive OR with respect to W)
Wherein
h[3](ijk)=h[|w|]((ioλ[|L(w)|])(joλ[|R(w)|])(koλ[|w|]))
μ[w]=b[|w|]oλ[|w|] are set
b[|w|]: The output of the element w
x[3|w|]=x[|wμ[w]|]
x[|μ[|w[|t|]|]|]=μ[|w[|t|]|]]=b[|[w[|t|]|]|]=C[1]({b[|w|]}) is finally output.

[Validity Proof for the Calculation of the First Cycle]
[Detail of the Validity Proof Generation 1507 for the Calculation of the First Cycle]
The following symbols are defined.
A[12|F$_p$|]={{a[2|wWijk|]}|a[2|wWijk|]ϵF$_p$},
F[25:I|a[|0|]b[(|0|]c[|0|]|a[|1|]b[|1|]c[|1|]] (u[2])ϵA[12] is set as
F[25:I|abc|a[|6|]b[|6|]c[|6|]](u[2])
=
[x[2|h[:I|wa[|i○i[6|]|b[|j○j[6|]|c[|k○k[6|]|]|]|](ijk)]
Wherein
w: element
z[2]ϵK[12],
a[2]ϵA[12],
a[25]ϵA[125],
a[|0|],a[|1|],b[|0|],b[|1|],c[|0|],c[|1|],ϵF$_p$,
u[2]ϵK[12],
In this section, the additional character ⌈:I−1⌋ is omitted for the sake of simplicity.

The knowledge is proved through the following method.
First of all, a random number is put in a hash function to generate the following.
P[6]ϵG[1]
The following calculations are performed.
P[26B]=(1+η)P,
P[26]=ΣP[26B]e[|a|], (A sum related to α is taken)
NOT(λ)={NOT(λ[|w|])}
UI generates PROOF1I in a procedure described below.
The following data is randomly and uniquely selected.
x[26#I]ϵα,
ρ[26#I|S[23]I]ϵA[12]$^2$,
ρ[26#I|S[233]∥2|]ϵA[12].
ρ[26T[2&1]#I]ϵA[12]$^2$,
ρ[26T[233]#I]ϵA[12]$^2$,
ρ[26T[233]#I|2|]ϵA[12],
ρ[246#I|T[233]∥2|]ϵA[12]$^2$,
ρ[256#I|U[25&1]|]ϵA[125]$^2$,
ρ[256#I|λ|]ϵA[125],
ρ[256#I|U[25&2]|]ϵA[125],
ρ[256#I|U[25&3]|]ϵA[125],
β[256#I|U[235:I]I]ϵA[125]
ρ[256#I|T[2335:I]∥2|]ϵA[12].

Then, the following calculations are performed.

C[2x[2]#I|[|αwWh|]|]=x[2#I|αwWh|]P[2B]+(x[26#I|αwWh|]P[26B],C[2x[2]#I]={Σe[|α|]C[2x[2]#I][|αwWh|]|]}[|wWh|], (A sum related to α is taken)

C[2#I|S[23]|]=S[23:I]+ρ[26S[23]#I]P[26],T[S[23]#I]=ρ[26S[23]#I],

C[2S[23]#I]=(C[2S[23]#I|1|],(C[2S[23]#I])[|2|]) is described as (C[2S[23]#I|1|],C[2S[23]#I|2|]).

C[y,C[2S[23]#I|1|]
=
yC[2S[23]#I|1|]+ρ[26S[233]#I|2|]P[26|]|{A[12]},

C[2S[233]#I]=(C[2S[23]#I|1|],C[2S[233]#I|2|]),

C[2S[233]#I|2|]=C[2S[23]#I|2|]+C[2y,C[2S[23]#I]#I|1],

τ[S[233]#I]=(τ[S[23]#I|1|],

τ[S[23]#I|2|]+yτ[S[23]#I|1|]+ρ[26S[233]#I]).

Wherein (τ[S[23]#I|1|], τ[S[23]#I|2|])=(τ[S[23]#I]).

C[2T[2&1]#I]=T[2&1:I]+ρ[26T[2&1]#I]P[26] is set as,

τ[T[2&1]#I]=ρ[26T[2&1]#I],

C[2T[233]#I]=T[233:I]+ρ[26T[233]#I]P[26],τ[T[233]#I]=ρ[26T[233]#I],

C[2T[23:I]#I]=(C[2T[23:I]#I|1|],C[2T[23:I]#I|2|]) is described as (C[2T[23:I]#I|1|],C[2T[23:I]#I|2|]).

C[y,C[2T[23:I]]#I|1|]=yC[2T[23:I]#I|1|]+ρ[26T[233]#I|2|]P[26A[12]],

C[2T[233]#I]=(C[2T[23:I]#I|1|],C[2T[233]#I|2|]),

C[2T[233]#I|2|]=C[2T[23:I]#I|2|]+C[2y,C[2T[23:I]]#I|1|].

τ[T[233]#I]=(τ[T[23:I]#I|1|],

τ[T[23:I]#I|2|]+yτ[T[23:I]#I|1|]+ρ[26T[233]#I]).

Wherein (τ[T[23:I]#I|1|], τ[T[23:I]#I|2|])=τ[T[23:I]#I].

K[2y,C[2T[233]]#I|1|]=y[4#I]C[2T[23:I]]+ρ[246T[233]#I|1|]P[26], c[25U[25&1]#I]=U[25&1:I]+ρ[256#I|U[25&1]|]P[26],τ[U[25&1]#I]=ρ[256#I|U[25&1]|].

C[2λ#I]=λ[#I]P[2]+ρ[256#I|λ|]P,

ρ[256NOT(λ)#I]=−ρ[256λ#I],C[2NOT(λ)#I]=P[2]−C[2λ#I],

C[2U[25&2]#I]=F[25:I|λ[L]{ }00|NOT(λ)[L]00](u[2])C[2U[25&1]#I]+ρ[256#I|U[25&2]|]P[26].

Wherein NOT(λ)[L]={NOT(λ)[|L(w)|]}.

τ[U[25&2]#I]=F[25:I|λ[L]{ }00|NOT(λ)[L]00](u[2])τ[U[25&1]#I]+ρ[256#I|U[25&2]|],

C[2U[25&3]#I]=F[25:I|0λ[R]0|0NOT(λ)[R]0](u[2])C[2U[25&2]#I]+ρ[256U[25&3]#I]P[26],

Wherein
NOT(λ)[R]={NOT(λ)[R|R(w)|]}.

τ[U[25&3]#I]=F[25:I|0λ[R]0|0NOT(λ)[R]0](u[2])τ[U[25&2]#I]+ρ[256U[25&3]#I].

C[2U[235:I]#I]=F[25:I|00λ|00NOT(λ)](u[2])C[2U[25&3]#I],

τ[U[235:I]#I]=F[25:I|00λ|00NOT(λ)](u[2])τ[U[25&3]#I]),

C[2U[235:I]#I]=((C[2U[235:I]#I])[|1|],(C[2U[235:I]#I])[|2|]) is described as (C[2U[235:I]#I|1|],C[2U[235:I]#I|2|]).

C[y,C[2U[235:I]]#I|1|]=yC[2U[235:I]#I|1|]+ρ[256#I|T[2335:I]|||2|]P[26A[12]],

C[2T[2335:I]#I]=(C[2U[235:I]#I|1|],C[2T[2335:I]#I|2|]),

C[2T[2335:I]#I|2|]=C[2U[235:I]#I|2|]+C[2y,C[2U[235:I]]#I|1|],

τ[T[2335:I]#I]=(τ[U[235:I]#I|1|],

τ[U[235:I]#I|2|]+Yτ[U[235:I]#I|1|]+ρ[256T[2335:I]#I]),

Wherein (τ[U[235:I]#I|1|], τ[U[235:I]#I|2|])=τ[U[235:I]#I].

Furthermore, the following expressions are calculated.

In the case of x[2|αwWh|]P[2B]=1

With respect to each αwWh, x[246&1|αwWh|]∈B[1] is randomly selected to calculate K[2&1|αwWh|]=x[246&1|αwWh|]P[26]

Randomly,
x[29&η|αwWh|],
c[2&η|αwWh|]∈B[1] is selected to calculate K[2&η|αwWh|]
=
x[29&η|αwWh|]P[26]
−c[2&η|αwh|](C[2x[2]|αwWh|]−ηP[2B])

In the case of x[2|αwWh|]P[2B]=η.

With respect to each αwWh, x[246&η|αwwh|]∈B[1] is randomly selected to calculate K[2&η|αwWh|]=x[246&η|αwWh|]P[26B]

Randomly,
x[29&1|αwwh|], c[2&1|αwWh|]
∈B[1] is selected to calculate
K[2&1|αwWh|]=x[29&1|αwWh|]P[26]
−c[2&1|αwWh|] (C[2x[2]|αwWh|]−P[2B])
and
(K[2&1|αwWh|],
(K[2&η|αwWh|]

Moreover, the following data is uniquely and randomly selected.

x[24#I], x[246#I]∈A[12],
γ[4#I]∈$F_p$,
r[24#I]∈A[12$F_p$],
ρ[246S[23]#I]∈A[12]$^2$,
ρ[246S[233]#I|2|]∈A[12]$^2$,
s[24S#I]∈A[125], τ[4S[233]#I]∈A[125]$^2$,
r[24#I]∈A[12$F_p$],
ρ[246T[2&1]#I]∈A[12]$^2$,
ρ[246T[233]#I]∈A[12]$^2$,
s[24T#I]∈A[125], τ[4T[233]#I]∈A[125]$^2$,
ρ[2456U[25&1]#I]
∈A[125]$^2$,
ρ[2456λ#I]∈A[125],
λ[4#I]∈$F_p$,
NOT(λ)[4#I],
=
{NOT(λ)[4#I|w|]}.
NOT(λ)[#I|w|]
∈$F_p$,
ρ[2456U[25&2]#I]∈A[125],
ρ[2456T[2335:I]#I|2|]∈A[12]$^2$,
s[245U#I]∈A[125], τ[4T[2335:I]#I]∈A[125]$^2$,

Then, the following expressions are calculated.

K[2x[2]#I]=x[24#I]P[2]+x[246#I]P[26],

K[2J[2](x),Q[2]#I]=J[2](x[24])Q[2],

K[2y#I]a=y[4#I]P∈$F_p$ ⊂ B[1],

K[2r[2],s[2]#I]=r[24#I]s[2]+ρ[246S[23]#I]P[26],

K[2y, C[2S[233]]#I|1|]=y[4#I]C[2S[23]]+ρ[246S[233]#I|1|]P[26],

K[2s[24S]#I]=s[24S#I]Y[2]−τ[4S[233]#I]P[26],

K[2r[2],T[2]#I]=r[24#I]T[2]+ρ[246T[2&1]#I]P[26],

K[2J[2](x[2]),T[2&1]#I]=J[2](x[24#I])T[2&1]+ρ[246T[233]#I]P[26],

K[2s[24T]#I]=s[24T#I]Y[2]−τ[4T[233]#I]P[26],

K[25U[25&1]#I]=U[25:I−1]*F[25:I|0,0,0|](x[24#I])+ρ[2456U[25&1]#I]P[26],

K[2λ,P[2]#I]=λ[4#I]P[2]+ρ[2456λ#I]P[26],K[2λ, C[2λ]#I]=λ[4#I]C[2λ#I]+ρ[2456λ#I]P[26],

λ[4L#I]={λ[4#I|L(w)|]},NOT(λ)[4L#I]={NOT(λ)[4#I|L(w)|]}, K[2U[25&2]#I]=F[25:I|λ[4L]00|NOT(λ)[4L]00](1)*U[25&1]+ρ[2456U[25&2]#I]P[26], $\lambda[4R\#I]=\{\lambda[4\#I|R(w)|]\}$, $NOT(\lambda)[4R\#I]=\{NOT(\lambda)[4R(w)\#I]\}$, $K[2U[25\&3]\#I]=F[25:I|0\lambda[4R]0|0NOT(\lambda)[4R]0](1)*U[25\&2]+\rho[2456U[25\&3]\#I]P[26]$, $\lambda[4R\#I]=\{\lambda[4R(w)\#I]\}$, $NOT(\lambda)[4R\#I]=\{NOT(\lambda)[4R(w)\#I]\}$, $K[2U[235:I]\#I]=F[25:I|00\lambda[4]|00NOT(\lambda)[4]](1)*U[25\&3]$, $K[2y,C[2T[2335:I]]\#I|1|]=y[4\#I]C[2U[235:I]]+p[2456T[2335:I]\#I|]P[26]$, $K[2s[245U]\#I]=s[245U\#I]Y[2]-\tau[4T[2335:I]\#I]P[26]$, Furthermore, the following expressions are calculated.

$c[\#I]=Hash(DATA1I-1, BODY1I,C[2x[2]\#I], C[2S[23]\#I], (C[2S[23]\#I|1|],C[2S[23]\#I|2|]),C[y,C[2S[23]]\#I|1|],C[2T[2\&1]\#I], C[2T[233]\#I],(C[2T[23:I]\#I|1|],C[2T[23:I]\#I|2|]),C[2T[233]\#I], K[2s[24T]\#I]=s[24T\#I]Y[2]c[25U[25\&1]\#I],C[2\lambda\#I],C[2NOT(\lambda)\#I], C[2U[25\&2]\#I],C[2U[25\&3]\#I],C[2U[235:I]\#I],(C[2U[235:I]\#I|1|],C[2U[235:I]\#I|2|]),C[y,C[2U[235:I]]\#I|1|],C[2T[2335:I]\#I|2|],$
$K[2\&1|\alpha wWh|], K[2\&\eta|\alpha wwh|], K[2x[2]\#I], K[2J[2](x),Q[2]\#I], K[2y\#I],K[2r[2],s[2]\#I],K[2y,C[2S[233]]\#I|1|], K[2s[24S]\#I],K[2r[2],T[2]\#I], K[2J[2](x[2]),T[2\&1]\#I], K[25U[25\&1]\#I], K[2\lambda, P[2]\#I], K[2\lambda,C[2\lambda\#I],K[2U[25\&2]\#I], K[2U[25\&3]\#I],K[2U[235:I]\#I], K[2y,C[2T[2335:I]]\#I|1|], K[2s[245U]\#I],)$.

Wherein Hash denotes a Fp value hash function.
Then, the following expressions are performed,
In the case of $x[2|\alpha wWh|]P[2B]=1$.

With respect to each $\alpha wwhc$, $[2\&1|\alpha wWh|]=c[\#I]-c[2\&\eta|\alpha wWh|]$ is set to calculate $x[29\&1|\alpha wWh|]=c[2\&1|\alpha wWh|](x[26|\alpha|])[|wWh|]+x[246\&1|\alpha wWh|]$.

In the case of $x[2|\alpha wWh|]P[2B]=\eta$.

With respect to each $\alpha wWh$, $c[2\&\eta|\alpha wWh|]=c[\#I]-c[2\&1|\alpha wWNh|]$ is set to calculate $x[29\&\eta|\alpha wWh|]=c[2\&\eta|\alpha wWh|](x[26|\alpha|])[|wWh|]+x[246\&\eta|\alpha wWh|]$, establishing $(c[\#I]c[2\&1|\alpha wWh|],x[29\&1|\alpha wWh|]),c[2\&\eta|\alpha wWh|],x[29\&\eta|\alpha wWh|]))$.

Moreover, the following expressions are performed.

$x[28\#I]=c[\#I]x[2\#I]+x[24\#I],x[268\#I]=c[\#I]x([26\#I]+x[246\#I])$, $y[8\#I]=c[\#I]y[\#I]+y[4\#I]$, $r[28\#I]=c[\#I]r[2\#I]+r[24\#I],\rho[268S[23]\#I]=c[\#I]\rho[26S[23]\#I]+\rho[246S[23]\#I]$, $r[8\#I]=c[\#I]r[2\#I]+r[24\#I],\rho[268S[233]\#I|2|]=c[\#I]\rho[26I|S[233]|||2|]+\rho[246S[233]\#I|2|]$, $s[28S\#I]=c[\#I]s[24S\#I]+s[24S\#I], \tau[8S[233]\#I]=c[\#I]\tau[S[233]\#I]+\tau[4S[233]\#I]$, $r[28\#I]=c[\#I]r[2\#I]+r[24\#I],\tau[268T[2\&1]\#I]=c[\#I]\rho[26T[2\&1]\#I]+\rho[246T[2\&1]\#I]$, $\rho[268T[233]\#I]=c[\#I]\rho[26T[233]\#I]+\rho[246T[233]\#I]$, $r[8\#I]=c[\#I]r[2\#I]+r[24\#I],\rho[268T[233]\#I|2|]=c[\#I]\rho[26T[233]\#I|2|]+\rho[246\#I|T[233]|||2|]$, $s[28T\#I]=c[\#I]s[24T\#I]+s[24T\#I], \tau[8T[233]\#I]=c[\#I]\tau[T[233]\#I]+\tau[4T[233]\#I]$, $\rho[2568U[25\&1]\#I]=c[\#I]\rho[256U[25\&1]\#I]+\rho[2456U[25\&1]\#I]$, $\lambda[8\#I]=c[\#I]\lambda[\#I]+\lambda[4\#I],\rho[2568\lambda\#I]=c[\#I]\rho[256\lambda\#I]+\rho[2456\lambda\#I]$, $NOT(\lambda)[8\#I]=c[\#I]NOT(\lambda)[\#I]+NOT(\lambda)[4\#I]$, $\rho[2568U[25\&2]\#I]=c[\#I]\rho[256U[25\&2]\#I]+\rho[2456U[25\&2]\#I]P[26]$, $\rho[2568U[25\&3]\#I]=c[\#I]\rho[256U[25\&3]\#I]+\rho[2456U[25\&3]\#I]P[26]$, $r[8\#I]=c[\#I]r[2\#I]+r[24\#I],\rho[2568T[2335:I]\#I|2|]=c[\#I]\rho[256T[2335:I]\#I|2|]+\rho[2456T[2335:I]\#I|2|]$, $s[258U\#I]=c[\#I]s[245U\#I]+s[245U\#I]$, $\tau[8T[2335:I]\#I]=c[\#I]\tau[T[2335:I]\#I]+\tau[4T[2335:I]\#I]$.

Then, the following expressions are established.

$PROOF1I=(C[2x[2]\#I],C[2S[23]\#I],(C[2S[23]]\#I|1|],C[2S[23]\#I|2|]),C[y,C[2S[23]]\#I|1|],C[2T[2\&1]\#I],C[2T[233]\#I],(C[2T[23:I]\#I|1|],C[2T[23:I]\#I|2|]),C[2T[233]\#I],c[25U[2 \; 5\&1]\#I], C[2\lambda\#I],C[2NOT(\lambda)\#I],C[2U[25\&2]\#I], C[2U[25\&3]\#I], C[2U[235:I]\#I], (C[2U[2 \; 35:I]\#I|1|],C[2U[235:I]\#I|2|]),C[y,C[2U[235:I]]\#I|1|],C[2T[2335:I]\#I|2|],K[2\&1|\alpha wWh|], K[2\&\eta|\alpha wWh|], K[2x[2]\#I], K[2J[2](x),Q[2]\#I],K[2y\#I], K2r[2],s[2]\#I],K[2y,C[2S[233]]\#I|1|],K[2s[24S]\#I],K[2r[2],T[2]\#I], K[2J[2](x[2]),T[2\&1]\#I], K[2s[24T]\#I], K[25U[25\&1]\#I ],K[2\lambda,P[2]\#I],K[2\lambda,C[C2\lambda]\#I], K[2U[25\&2]\#I],K[2U[25\&3]\#I],K[2U[235:I]\#I, K[2y,C[2T[2335:I]]\#I|1|],K[2s[245U]\#I],c[\#I],x[29\&1|\alpha wWh|]),x[29\&\eta|\alpha wWh|])),x[28\#I],x[268\#I],y[8\#I], r[28\#I],\rho[268S[23]\#I]r[8\#I]\rho[268S[233]\#I|2|]s[28S\#I]r[28\#I]\rho[268T[2\&1]\#I]\rho[268T[233]\#I]r[8\#I]\rho[268T[233]\#I|2|]\rho[2568U[25\&1]\#I],\lambda[8\#I],\rho[2568\lambda\#I],NOT(\lambda)[8\#I \; ], \rho[2568U[25\&2]\#I],\rho[2568U[25\&3]\#I], r[8\#I]\rho[2568T[2335:I]\#I|2|]s[258U\#I])$.

[Detail of the Validity Proof Verification 1502 for the Calculation of the First Cycle]

After receiving PROOF1I, UI+1 checks the following data.

$c[\#I]=Hash(DATA1I-1, BODY1I,C[2x[2]\#I], C[2S[23]\#I], (C[2S[23]\#I|1|],C[2S[23]\#I|2|]),C[y,C[2S[23]]\#I|1|],C[2T[2\&1]\#I],C[2T[233]\#I], (C[2T[23:I]\#I|1|],C[2T[23:I]\#I|2|]),C[2T[233]\#I],K[2s[24T \; ]\#I]c[25U[25\& \; 1]\#I],C[2\lambda\#I],C[2NOT(\lambda)\#I],C[2U[25\&2]\#I],C[2U[25\&3]\#I],C[2U[235:I]\#I],(C[2U[235:I]\#I|1|],C[2U[235:I]\#I|2|]),C[y,C[2U[235:I]]\#I|1|],C[2T(2335:I)\#I|2|],K[2\&1|\alpha wWh|], K[2\&\eta|\alpha wWh|], K[2x[2]\#I], K[2J[2](x),Q[2]\#I], K[2y\#I],K[2r[2],s[2]\#I],K[2y,C[2S[233]]\#I|1|], K[2s[24S]\#I],K[2r[2],T[2]\#I], K[2J[2](x[2]),T[2\&1]\#I], K[25U[25\&1]\#I],K[2\lambda,P[2]\#I],K[2\lambda,C[2\lambda]\#I], K[2U[25\&2]\#I], K[2U[25\&3]\#I],K[2U[235:I]\#I],K[2y,C[2T[2335:I]]\#I|1|], K[2s[245U]\#I],)$, With respect to each $\alpha wWh$, the following expressions are established.

$c[\#I]=c[2\&1|\alpha wWh|]+c[2\&\eta|\alpha wWh|],x[29\& \; 1|\alpha wWh|]$
$P[6B]=c[2\&1|\alpha wWh|](C[2x[2]|\alpha wWh|]-P[2B])+K[2\&1|\alpha wWh|],x[29\&1|\alpha wWh|]P[6B]=c[2\&\eta|\alpha wWh|](C[2x[2]|\alpha wWh|]-\eta P[2B])+K[2\&\eta|\alpha wWh|]$ It is checked whether or not the following expressions are established.

$x[28\#I]P[2]+x[28\#I]P[26]=$
$c[\#I]C[2x[2]\#I]+K[2x[2]\#I]$,
$J[2](x[28\#I])0[2\#I]=J[2](c[\#I])0[2\#I]+K[2J[2](x),0[2]\#I]$,
$y[8\#I]\epsilon F_p$,
$y[8\#I]P[2]=c[\#I](r[2:I]-r[2])+K[2y\#I]$.
$y[8\#I]\epsilon F_p$,
$r[28\#I]s[2:I-1]$
$+$
$\rho[268S[23]\#I]P[26]$
$=$
$c[\#I]C[2S[23]\#I]+K[2r[2],s[2]\#I]$,
$c[\#I]C[2y,C[2S[23]]\#I|1|]$
$+$
$K[2y,C[2S[23]]\#I|1|]$
$=$
$y[8\#I]C[2S[23]\#I|2|]$
$+$
$\rho[268S[233]\#I|2|]P[26A[12]]$,
$c[\#I] \; (s[2\#I]-C[2S[233]\#I])$
$+$
$K[2s[24S]\#I]$
$=$
$s[28S\#I]Y[:I]$ $\tau[8S[233]\#I]P[2],$
$r[28\#I]T[2:I-I]$
$+$
$\rho[268T[2\&1]\#I]P[26]$
$=$
$c[\#I]C[2T[2\&1]\#I]+K[2r[2],T[2]\#I],$
$J[2](x[28\#I])T[2\&1:I-1]$
$+$
$\rho[268T[233]\#I]P[26]$
$=$
$c[\#I]C[2T[233]\#I]+K[2r[2],T[2\&1]\#I],$
$c[\#I]C[2y,C[2T[23:I]]\#I|1|]+$
$K[2y,C[2T[23:I]]\#I|1|]$
$=$
$y[8\#I]C[2T[23:I]\#I|2|]$
$+$
$\rho[268T[233]\#I|2|]P[26A[12]],$
$c[\#I](T[2\#I]-C[2T[233]\#I])$
$+$
$K[2s[24T]\#I]=$
$s[28T\#I]Y[:I]$
$-$
$\tau[8T[233]\#I]P[2],$
$r[28\#I]\epsilon A[12F_p],$
$U[25:I-1]*F[25:I|0,0,0|](x[28\#I])$
$+$
$\rho[2568U[25\&1]\#I]P[26]$
$=$
$c[\#I]c[25U[25\&1]\#I]$
$+$
$K[25U[25\&1]\#I],$ With respect to each wWijk, i[6], j[6], k[6]
$\lambda[8\#I|wWijk|i[6], j[6], k[6]]\epsilon F_p$ is established.
$\lambda[8\#I]P[2]+\rho[2568\lambda\#I]P[26]=c[\#I]C[2\lambda\#I]+K[2\lambda,P[2]\#I],\lambda[8\#I]C[2\lambda\#I]+\rho[2568\lambda\#I]P[2\ 6]=c[\#I]C[2\lambda\#I]+K[2\lambda,C[2\lambda]\#I],$
$C[2NOT(\lambda)\#I]=P[2]-C[2\lambda\#I],$
$c[\#I]C[2U[25\&2]\#I]+K[2U[25\&2]\#I]=F[25:I|\lambda[8L]00|NOT(\lambda)[8L]00](1)*U[25\&1]+\rho[2\ 568U[25\&2]\#I]P[26],$
$c[\#I]C[2U[25\&3]\#I]+K[2U[25\&3]\#I]=F[25:I|\lambda[8R]00|NOT(\lambda)[8R]00](1)*U[25\&2]+\rho[2568U[25\&3]\#I]P[26],$
$c[\#I]C[2U[235:\ \ \ \ I]\#I]+K[2U[235:I]\#I]=F[25:I|\{00\lambda[8]|00NOT(\lambda)[8]\}(1)*U[25\&3],$
$c[\#I]C[2y,C[2U[235:I]]\#I|1|]+K[2y,C[2U[235:I]]\#I|]=y[8\#I]C[2U[235:I]\#I|2|]+\rho[256\ 8T[2335:I]\#I|2|]P[26A[12]],$
$c[\#I](U[2\#I]-C[2T[2335:I]\#I])+K[2s[245U]\#I]=s[258U\#I]Y[:I]-\tau[8T[2335:I]\#I]P[2].$

[Validity Proof for the Calculation of the Second Cycle]
[Detail of the Validity Proof Verification 1507 for the Calculation of the Second Cycle]
UI randomly selects the following.

$y[4\&I]\epsilon F_p$

Then, PROOF2I is calculated as follows.
$P[4\&I]=y[4\&I]P, \Theta[4\&I|1|]=y[4\&I]\Theta[\&I|1|],$
$c[\&I]=Hash(DATA2I-1\|BODY2I-1\|P[4\&I]\|\Theta[4\&I]),$
$y[8\&I]=c[\&I]y[\&I]+y[4\&I],$
$PROOF2I=P[4\&I]\|\Theta[4\&I]\|c[\&I]\|y[8\&I].$

[Detail of the Validity Proof Verification 1502 for the Calculation of the Second Cycle]
When receiving PROOF1I, UI+1 checks the following.
$y[8\&I]P=c(R[:I]-R[:I-1])+P[4]$
$y[8\&I]\Theta[8\&I-1|0|]=c(\Theta[\&I-1|0|]-\Theta[\&I|0|])+\Theta[4\&I-1|0|]$

INDUSTRIAL APPLICABILITY

The present invention is effective at an electronic bidding, an electronic auction, or the like in the case in which the bidder and the bidding price are desired to be determined while bidding prices of bidders other than a successful bidder are kept secret and, and at the same time there is a necessity in that a third party can verify that the determination is appropriately performed, or in the case in which a third party can verify that a voting count is appropriately performed in an electronic election while anonymity is kept.

This is because with use of the present invention, if results of the above-mentioned bidding, auction, and election are made by a plurality of calculation devices, no one can newly obtain information other than the calculation result at the same time the calculation validity can be verified by every one. Then, this calculation is more effectively performed as compared with the prior art. In addition, the number of communications performed among the calculation devices is low, so the time spent by the calculation devices to secure the communication lines is also low, which leads to the high efficiency.

The invention claimed is:
1. A method of calculating a value of a given function by using an apparatus including a plurality of computers, comprising:
   an input process;
   an ElGamal cipher text preparation process;
   a sequential substitution reencryption process; and
   a result output process,
   characterized in that the input process comprises an information input step of inputting to the plurality of computers information on a circuit including a plurality of gates and the information, and a dispersion input step of inputting to each of the computers each one of plural pieces of partial data which are obtained by dispersing input data of the given function into plural pieces by the number of the computers,
   the ElGamal cipher text preparation process comprises an ElGamal cipher text preparation step in which at least one of the computers generates a set of ElGamal cipher texts corresponding to inputs of the gates of the circuit that realizes the given function,
   the sequential substitution reencryption process comprises a step of allowing each of the computers to perform a substitution reencryption process one after another, and the substitution reencryption process comprises a cipher text obtaining step of allowing the computer in turn to receive the set of ElGamal cipher texts from the computer in the previous turn, a cipher text substitution and reencryption step of changing an order of the set of ElGamal cipher texts received in the cipher text obtaining step for substitution and subjecting those cipher texts to reencryption, a step of disclosing the data generated in the cipher text substitution and reencryption step to at least the computer in next order, and a step of stopping the sequential substitution reencryption process when all of the computers have performed the sequential substitution reencryption process, and the result output process comprises a partial decryption step of deciphering or partially deciphering a part of the cipher texts generated in the cipher text substitution and reencryption step, a decryption step of deciphering a cipher text that enciphers data corresponding to the input to the circuit in the cipher texts generated in the cipher text substitution and reencryption step, and an evaluation step of evaluating an output of the circuit by using the data deciphered in the decryption step and the data partially deciphered in the partial decryption step.

2. The calculation method according to claim 1,
characterized in that the set of ElGamal cipher texts corresponding to the inputs of the gates is a set of ElGamal cipher texts of a secret key, corresponding to each of the inputs of the gates, generated by each of the computers, and
a public key used for generating the ElGamal cipher texts is a sum of public keys corresponding to gates for generating two signal inputs to the gate.

3. The calculation method according to claim 1,
characterized in that the input process further comprises a step of inputting an area variable of an ElGamal encryption method to each of the computers,
the ElGamal cipher text preparation process further comprises a gate secret key generating step of generating a secret key of the ElGamal cipher texts corresponding to the inputs of the gates of the circuit by each of the computers,
each of the computers performs:
a gate public key generating step of generating a gate public key corresponding to the secret key generated in the gate secret key generating step;
a gate public key validity proof generating step of generating a gate public key validity proof for the public key generated in the gate public key generating step;
a gate public key validity proof disclosing step of disclosing the gate public key validity proof generated in the gate public key validity proof generating step;
an input gate secret key generating step of generating a secret key of the ElGamal cipher texts corresponding to the inputs of the gates where an input is directly made to the circuit of the gates of the circuit;
an input gate public key generating step of generating an input gate public key corresponding to the secret key generated in the input gate secret key generating step;
an input gate public key validity proof generating step of generating a validity proof for the input gate public key generated in the input gate public key generating step;
an input gate public key validity proof disclosing step of disclosing the input public key validity proof generated in the input gate public key validity proof generating step;
a gate public key obtaining step of obtaining gate public keys generated by other respective computers;
a gate public key integration step of integrating the gate public keys obtained in the gate public key obtaining step;
a gate public key encryption step of enciphering the gate secret key cipher text with the gate public key integrated in the gate public key integration step;
a gate secret key cipher text disclosing step of disclosing a gate secret key cipher text generated in the gate public key encryption step;
a gate secret key cipher text validity proof generating step of generating a validity proof for the gate secret key cipher text;
a gate secret key cipher text validity proof disclosing step of disclosing the gate secret key cipher text validity proof generated in the gate secret key cipher text validity proof generating step;
an input cipher text generating step of generating a cipher text corresponding to a part of the input to the circuit that is input to each of the computers;
an input cipher text validity proof generating step of generating a validity proof for the cipher text corresponding to the part of the input of the circuit generated in the input cipher text generating step;
an input cipher text validity proof disclosing step of disclosing the proof generated in the input cipher text validity proof generating step; and
an output cipher text generating step of generating and disclosing a cipher text corresponding to an output of the gate,
the sequential substitution reencryption process comprises:
a gate secret key cipher text substitution and reencryption step of changing an order of a set of the gate secret key cipher texts with one substitution randomly selected on the basis of a predetermined permitted substitution method for reencryption;
an input cipher text substitution and reencryption step of changing an order of a set of the input cipher texts with one substitution randomly selected on the basis of a predetermined permitted substitution method for reencryption;
an output cipher text substitution and reencryption step of changing an order of a set of the output cipher texts with one substitution randomly selected on the basis of a predetermined permitted substitution method for reencryption; and
a gate secret key cipher text, input cipher text, and output cipher text substitution and reencryption validity proof generating and disclosing step of generating and disclosing validity proofs for the substitution and reencryption performed in the gate secret key cipher text substitution and reencryption step, the input cipher text substitution and reencryption step, and the output cipher text substitution and reencryption step,
the partial decryption step of the result output process comprises:
a gate secret key partial decryption step of partially deciphering the gate secret key cipher texts by mutually performing communication and calculation by the computers;
an input cipher text partial decryption step of partially deciphering the input cipher texts by mutually performing communication and calculation by the computers;
an output cipher text partial decryption step of partially deciphering the output cipher texts by mutually performing communication and calculation by the computers; and
a gate secret key, input cipher text, and output cipher text partial decryption step validity proof generating and disclosing step of generating and disclosing the validity proofs for the partial decryption performed in the gate secret key partial decryption step, the input cipher text partial decryption step, and the output cipher text partial decryption step, and
the calculation method further comprises a step of verifying various validity proofs disclosed by other computers.

4. A calculation system for evaluating a function, comprising:

a plurality of computers;
communication means for performing communication with the plurality of computers;
input process means;
ElGamal cipher text preparation means;
sequential substitution reencryption means; and
result output means,
characterized in that the input means inputs information on a circuit whose output is desired to be obtained, information on the plurality of computers, and information on which part of an input to the circuit each of the computers has,
the ElGamal cipher text preparation means prepares ElGamal cipher texts for generating a set of ElGamal cipher texts corresponding to inputs of gates of the circuit that realizes the function,
the sequential substitution reencryption means comprises cipher text obtaining means for allowing the computer in turn to receive the set of ElGamal cipher texts from the computer in the previous turn, cipher text substitution and reencryption means for changing an order of the set of ElGamal cipher texts received by the cipher text obtaining means for substitution and subjecting those cipher texts to reencryption, means for disclosing the data generated by the cipher text substitution and reencryption means to at least the computer in next order, and means for stopping operation of the sequential substitution reencryption means when the sequential substitution reencryption means has been performed with all of the computers, and
the result output means comprises partial decryption means for deciphering or partially deciphering a part of the cipher texts generated by the cipher text substitution and reencryption means, decryption means for deciphering encryption related to itself of a cipher text that enciphers data corresponding to the input to the circuit in the cipher texts generated by the cipher text substitution and reencryption means, and evaluation means for evaluating an output of the circuit while using the data deciphered by the decryption means by the plurality of computers and the data partially deciphered by the partial decryption means by the plurality of computers.

* * * * *